US012409446B2

(12) United States Patent
Shen et al.

(10) Patent No.: US 12,409,446 B2
(45) Date of Patent: Sep. 9, 2025

(54) ELECTRICALLY HEATED SUBSTRATES, ASSEMBLIES, SYSTEMS, AND PROCESSES FOR CATALYTIC, CHEMICAL, AND SORBENT APPLICATIONS

(71) Applicant: SUSTEON INC., Cary, NC (US)

(72) Inventors: Jian Ping Shen, Morrisville, NC (US); Raghubir Prasad Gupta, Morrisville, NC (US); Vasudev Pralhad Haribal, Morrisville, NC (US); Andrew Tong, Morrisville, NC (US); Jonathan Edwin Peters, Morrisville, NC (US); Monica Jayne Abdallah, Morrisville, NC (US); Ryan Patrick Zelinsky, Morrisville, NC (US)

(73) Assignee: SUSTEON INC., Morrisville, NC (US)

( * ) Notice: Subject to any disclaimer, the term of this patent is extended or adjusted under 35 U.S.C. 154(b) by 0 days.

(21) Appl. No.: 18/810,367

(22) Filed: Aug. 20, 2024

(65) Prior Publication Data
US 2025/0058308 A1  Feb. 20, 2025

Related U.S. Application Data

(60) Provisional application No. 63/520,637, filed on Aug. 20, 2023.

(51) Int. Cl.
| | | |
|---|---|---|
| B01J 20/20 | (2006.01) | |
| B01J 21/04 | (2006.01) | |
| B01J 21/18 | (2006.01) | |
| B01J 23/08 | (2006.01) | |
| B01J 23/745 | (2006.01) | |
| B01J 23/755 | (2006.01) | |
| B01J 29/70 | (2006.01) | |
| B01J 35/33 | (2024.01) | |
| B01J 35/56 | (2024.01) | |
| B01J 37/08 | (2006.01) | |
| B01J 37/18 | (2006.01) | |
| C01B 3/04 | (2006.01) | |
| C01B 3/26 | (2006.01) | |
| C01B 3/38 | (2006.01) | |
| C01B 32/205 | (2017.01) | |
| C01B 32/40 | (2017.01) | |

(52) U.S. Cl.
CPC ............... *B01J 35/33* (2024.01); *B01J 20/20* (2013.01); *B01J 21/04* (2013.01); *B01J 21/18* (2013.01); *B01J 23/08* (2013.01); *B01J 23/745* (2013.01); *B01J 23/755* (2013.01); *B01J 29/7065* (2013.01); *B01J 35/56* (2024.01); *B01J 37/084* (2013.01); *B01J 37/18* (2013.01); *C01B 3/047* (2013.01); *C01B 3/26* (2013.01); *C01B 3/384* (2013.01); *C01B 32/205* (2017.08); *C01B 32/40* (2017.08); *C01P 2002/82* (2013.01); *C01P 2006/40* (2013.01)

(58) Field of Classification Search
CPC .......... C01B 32/205; C01B 32/40; B01J 20/20
See application file for complete search history.

(56) References Cited

U.S. PATENT DOCUMENTS

| | | | | |
|---|---|---|---|---|
| 5,750,026 A | * | 5/1998 | Gadkaree | B01J 35/56 |
| | | | | 502/87 |
| 6,097,011 A | * | 8/2000 | Gadkaree | B01J 20/28042 |
| | | | | 428/116 |
| 6,964,695 B2 | | 11/2005 | Place et al. | |
| 7,317,871 B2 | | 1/2008 | Tennison et al. | |
| 7,759,276 B2 | | 7/2010 | Wolff | |
| 8,231,712 B2 | | 7/2012 | Wojtowicz et al. | |
| 8,492,307 B2 | | 7/2013 | Meisner et al. | |

(Continued)

FOREIGN PATENT DOCUMENTS

| | | | |
|---|---|---|---|
| EP | 2740146 B1 | 10/2018 | |
| EP | 3182794 B1 | 12/2020 | |

(Continued)

OTHER PUBLICATIONS

Ishimaru, K., et al., "Characterization of sp2- and sp3-bonded carbon in wood charcoal", J. Wood Sci., 2007, pp. 442-448, vol. 53.
Smith, P.B., et al., "Enabling 3D printing of carbons by polyethylene precursors", MRS Communications, 2024, pp. 717-724, and Supporting Information; https://doi.org/10.1557/s43579-024-00619-3, vol. 14.

*Primary Examiner* — Stuart L Hendrickson
(74) *Attorney, Agent, or Firm* — HULTQUIST, PLLC; Steven J. Hultquist

(57) ABSTRACT

An article for joule heating is described, including a three-dimensional substrate on and/or in which a pyrolyzate of a phenolic resin or polymer forms an electrically conductive carbon network. Such articles may be incorporated in structured materials applications, which may include support, sorbent, and or catalyst components. Also described are methods of fabricating such articles and structured materials, and apparatus comprising same, and methods of use of such articles and structured materials and apparatus for conducting material transformation processes requiring input of heat for their performance, such as $CO_2$ adsorption, methane pyrolysis for hydrogen and carbon production, hydrogen-assisted conversion of $CO_2$ to hydrocarbons, including catalytic conversion of $CO_2$ to olefins, catalytic conversion of $CO_2$ to propane (liquefied petroleum gas), and catalytic conversion of $CO_2$ to renewable natural gas, reverse water gas shift reaction, steam ethane cracking, propane cracking, steam methane reforming, and dry methane reforming.

30 Claims, 20 Drawing Sheets

(56) References Cited

U.S. PATENT DOCUMENTS

| | | |
|---|---|---|
| 8,496,734 B2 | 7/2013 | Gadkaree et al. |
| 8,846,135 B2 | 9/2014 | Molenda et al. |
| 9,610,562 B2 | 4/2017 | Olesik et al. |
| 9,714,173 B2 * | 7/2017 | Wiesner ................ C01B 32/30 |
| 10,232,342 B2 | 3/2019 | Ghosh et al. |
| 10,283,779 B2 | 5/2019 | Neumann et al. |
| 11,427,471 B2 | 8/2022 | Choi et al. |
| 11,814,296 B2 | 11/2023 | Spahr et al. |
| 2004/0097371 A1 | 5/2004 | Jangbarwala |
| 2006/0084568 A1 | 4/2006 | Filimonov et al. |
| 2013/0319599 A1 | 12/2013 | Huang |
| 2014/0060602 A1 | 3/2014 | Aoai et al. |
| 2015/0099175 A1 | 4/2015 | Kitagawa et al. |
| 2018/0083285 A1 | 3/2018 | Yamashita et al. |
| 2019/0262762 A1 * | 8/2019 | Gadkaree ............. B01J 20/3007 |
| 2020/0107408 A1 | 4/2020 | Torrico et al. |
| 2021/0077983 A1 | 3/2021 | Chang et al. |
| 2021/0363013 A1 | 11/2021 | Spanu et al. |
| 2022/0095498 A1 | 3/2022 | Liu et al. |
| 2023/0111972 A1 | 4/2023 | Echigo et al. |
| 2023/0191364 A1 * | 6/2023 | Qiang ................ B01J 20/28095 502/420 |
| 2024/0075457 A1 | 3/2024 | Lanigan-Atkins et al. |
| 2024/0139705 A1 | 5/2024 | Gupta et al. |
| 2024/0234834 A1 | 7/2024 | Alexander |

FOREIGN PATENT DOCUMENTS

| | | |
|---|---|---|
| JP | 2022067481 A | 5/2022 |
| SK | 288563 B6 | 6/2018 |
| WO | 2022013042 A1 | 1/2022 |
| WO | 2022192408 A2 | 9/2022 |
| WO | 2022201061 A1 | 9/2022 |
| WO | 2024086036 A1 | 4/2024 |

* cited by examiner

Effect of Pyrolysis Temperature on Resistance

Effect of carbon loading on resistance

Front to Back Contact

Side to Side Contact

ELECTRICALLY HEATED SUBSTRATES, ASSEMBLIES, SYSTEMS, AND PROCESSES FOR CATALYTIC, CHEMICAL, AND SORBENT APPLICATIONS

CROSS-REFERENCE TO RELATED APPLICATION

The priority of U.S. Provisional Patent Application 63/520,637 filed Aug. 20, 2023 in the names of Jian Ping Shen, Raghubir Prasad Gupta, Andrew Shih Tong, Vasudev Pralhad Haribal, and Jonathan Edwin Peters for ELECTRICALLY HEATED SUBSTRATES FOR CATALYTIC AND SORBENT APPLICATIONS is hereby claimed, and the disclosure thereof is hereby fully incorporated herein by reference, in its entirety, for all purposes.

STATEMENT OF FEDERALLY FUNDED RESEARCH

This invention was partially made with Government support under DE-SC0020795 awarded by U.S. Department of Energy. The Government has certain rights in this invention.

FIELD

The present disclosure generally relates to a method of forming an electrically conductive carbon network on a three-dimensional substrate and systems for its application, as well as electrically heatable substrates produced by such method and process equipment utilizing same. The method involves pyrolyzing a phenolic resin or a polymer that has been dispersed on or in a three-dimensional substrate to form the electrically conductive carbon network. Electrical energy inputted to the electrically conductive carbon network is effective to produce localized heating throughout the three-dimensional substrate coated with the electrically conductive carbon network. Systems for the application of the three-dimensional substrate coated with the electrically conductive carbon network include systems for carrying out any processes that requires controlled and localized thermal energy input, including for example endothermic chemical reactions, decomposition/regeneration of sorbents, and fluid heating.

DESCRIPTION OF THE RELATED ART

There exists an enormous number of physical, chemical, and other processes that require controlled and localized thermal energy input for their performance.

By way of specific examples, a wide variety of chemical reactions are endothermic, requiring thermal management and modulation of inputted thermal energy in order for the reaction to take place at the desired rate and extent of completion. In many fluid heating operations, a specific controlled flux of heating of the working fluid is necessary. Similar thermal management is essential in numerous processes in which a setpoint temperature or narrow temperature range must be maintained to effect the desired transformation of materials, including transformations involving phase changes, decomposition, molecular self-assembly, solubilization, aggregation, plasmonics, precipitation, antigen retrieval, magnetopyroelectric effects, macroautophagy, dissociation, extraction, crystallization, and dehydration, among others.

In many such processes requiring thermal management and modulated heat input, it is desirable that a closely controlled and precise input of heat is achieved at a locus at which the material or medium requiring heating is present, in such manner that the heat input is not distorted or otherwise adversely affected by dead zones, hot or cold spots, or hydrodynamic or distributive phenomena that would negatively impact the heating operation.

SUMMARY

The present disclosure generally relates to methods and apparatus for forming electrically heatable substrates, and to electrically heatable substrates produced using such methods and apparatus, and to articles, structures, assemblies, and subassemblies comprising electrically conductive carbon networks.

In one aspect, the disclosure relates to an article for joule heating, comprising a three-dimensional substrate on and/or in which a pyrolyzate of a phenolic resin or polymer forms an electrically conductive carbon network.

In another aspect, the disclosure relates to an apparatus for transformation of a material, comprising: a vessel adapted for disposing a transformable material therein; and an article for joule heating, which may be of any suitable type as variously described herein, disposed in such vessel and arranged for contact therein with the transformable material.

A further aspect of the disclosure relates to a method of producing a joule heatable article, comprising: providing a phenolic resin or polymer on and/or in a three-dimensional substrate; and pyrolyzing the phenolic resin or polymer on and/or in the three-dimensional substrate to form an electrically conductive carbon network on and/or in the three-dimensional substrate.

Yet another aspect of the disclosure relates to a method of fabricating an apparatus for transformation of a material, comprising: disposing an article for joule heating, which may be of any suitable type as variously described herein, in a vessel constructed and arranged for introducing a transformable material therein; and coupling the article disposed in said vessel with an energy source arranged to deliver energy to the electrically conductive carbon network to mediate electrical current flow in the electrically conductive carbon network.

Another aspect of the present disclosure relates to a method of conducting a material transformation process requiring input of heat for its performance, comprising: energizing the electrically conductive carbon network of an article for joule heating, which may be of any suitable type variously described herein, to produce joule heating; and transmitting heat from the joule heating to the material in the material transformation process. The material transformation process may be of any suitable type and may for example comprise a process selected from the group consisting of: hydrogen-assisted conversion of $CO_2$ to hydrocarbons; methane pyrolysis for hydrogen and carbon production; reverse water gas shift reaction; steam ethane cracking; propane cracking; steam methane reforming; and dry methane reforming.

The disclosure in another aspect relates to a structured material assembly comprising a structural substrate on and/or in which is provided a heating material comprising an electrically conductive carbon network that is electrically energizable to provide Joule heating, the structured material assembly further comprising an active material positioned in the structured material assembly to be heated by the Joule heating provided by the electrically conductive carbon network when the electrically conductive carbon network is electrically energized, wherein the active material comprises a sorbent in response to the Joule heating changes its sorptive capacity and/or a catalyst that in response to the Joule heating changes its catalytic activity.

In a further aspect, the disclosure relates to a process system for adsorption of $CO_2$ and catalytic reaction of the $CO_2$ to produce hydrocarbon product, the process system comprising the structured material assembly of the present disclosure, wherein the active material comprises a $CO_2$-selective sorbent, and a catalyst for reaction of $CO_2$ to produce hydrocarbon product.

The disclosure relates in another aspect to a process system for conducting reverse water gas shift reaction, the process system comprising the structured material assembly of the present disclosure wherein the active material comprises a catalyst for the water gas shift reaction.

A further aspect of the disclosure relates to a process system for conducting methane pyrolysis reaction to produce hydrogen, the process system comprising the structured material assembly of the present disclosure wherein the active material comprises a catalyst for the methane pyrolysis reaction.

Another aspect of the disclosure relates to a process for adsorption of $CO_2$ and catalytic reaction of the $CO_2$ to produce hydrocarbon product, the process comprising adsorbing $CO_2$ from a $CO_2$-containing gas, desorbing the adsorbed $CO_2$, and catalytically reacting the desorbed $CO_2$ to produce the hydrocarbon product, using the structured material assembly of the present disclosure.

In another aspect, the disclosure relates to a process for conducting reverse water gas shift reaction, the process comprising conducting the reverse water gas shift reaction in the structured material assembly of the present disclosure wherein the active material comprises a catalyst for the water gas shift reaction.

Another aspect of the disclosure relates to a process for conducting methane pyrolysis reaction to produce hydrogen, the process comprising pyrolyzing methane in the structured material assembly of the present disclosure wherein the active material comprises a catalyst for the methane pyrolysis reaction.

In one aspect, the disclosure relates to a joule heating structure, comprising a three-dimensional structure having an electrically conductive carbon network therein and/or thereon, wherein the electrically conductive carbon network has a G/D Raman spectral intensity ratio in a range of from 0.5 to 3, and a resistivity in a range of from 0.01 Ω-m to 300 Ω-m.

Another aspect of the disclosure relates to a joule heating structured material assembly, comprising a porous monolith channelized with a multiplicity of substantially aligned channels extending therethrough to open ends at opposite faces of the porous monolith, wherein each channel is bounded by channel walls defining interior wall surfaces of the channel, wherein the channel walls have an electrically conductive carbon network therein and/or thereon, and wherein the electrically conductive carbon network has a G/D Raman spectral intensity ratio in a range of from 0.5 to 3, and a resistivity in a range of from 0.01 Ω-m to 300 Ω-m.

A further aspect of the disclosure relates to an apparatus for conducting a heat-mediated transformation of a material, comprising a vessel having an inlet to receive the material in an interior volume of the vessel, and an outlet for discharging a product of the heat-mediated transformation of the material, and a joule heating structure disposed in the interior volume of the vessel, the joule heating structure comprising a three-dimensional structure having an electrically conductive carbon network therein and/or thereon, wherein the electrically conductive carbon network has a G/D Raman spectral intensity ratio in a range of from 0.5 to 3, and a resistivity in a range of from 0.01 Ω-m to 300 Ω-m, and is arranged to provide joule heat for the heat-mediated transformation of the material upon flow of electrical current through the electrically conductive carbon network.

Another aspect of the disclosure relates to a process for carrying out a heat-mediated transformation of a material, comprising: flowing electrical current through an electrically conductive carbon network to cause the electrically conductive carbon network to responsively generate joule heating; and transmitting joule heat from the joule heating to effect the heat-mediated transformation of the material, wherein the electrically conductive carbon network has a G/D Raman spectral intensity ratio in a range of from 0.5 to 3, and a resistivity in a range of from 0.01 Ω-m to 300 Ω-m.

Other aspects, features and embodiments of the disclosure will be more fully apparent from the ensuing description and appended claims.

DETAILED DESCRIPTION

Figure 1:
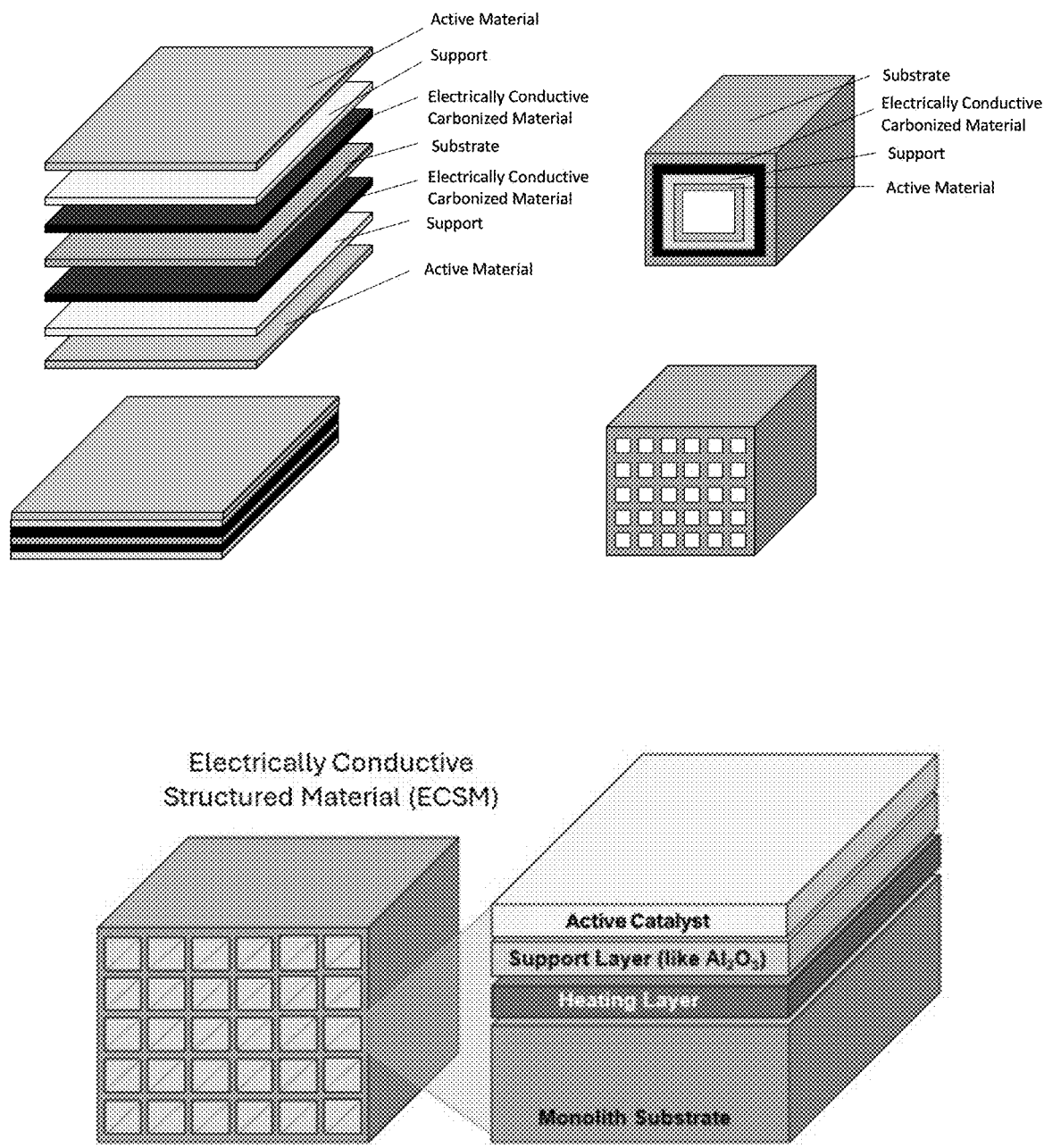
FIG. 1 is a schematic depiction of electrically heatable structures according to additional illustrative embodiments of the present disclosure.

The present disclosure generally relates to methods and apparatus for forming electrically heatable substrates, and to electrically heatable substrates produced using such methods and apparatus, and to articles, structures, assemblies, and subassemblies comprising electrically conductive carbon networks.

The present disclosure in various aspects relates to a method of forming a macroscopically continuous electrically conductive carbon network on a three-dimensional substrate. The method involves coating a carbon product or carbon precursor on and/or in the three-dimensional substrate and thermally heat treating to form the electrically conductive carbon network therein and/or thereon. Electrical energy input into the electrically conductive carbon network can produce localized heating throughout the three-dimensional substrate coated with the conductive carbon network or at a selected portion or portions of the substrate at which the electrically conductive carbon network is provided.

The disclosure also relates to a method of forming an integrated structured material with at least a three-dimensional substrate and an electrically conductive carbon network formed therein and/or thereon. The method involves dispersing a carbon or carbon precursor dispersed on and/or in the three-dimensional substrate and thermally heat treating to form the electrically conductive carbon material. The integrated structured material may further comprise a support, a sorbent, a catalyst, or combinations including two or more thereof. In various embodiments, the integrated structured material may constitute and be referred to as an electrically conductive structured material (ECSM). The ECSM may be used in systems that require thermal energy input that may include, without limitation, $CO_2$ adsorption and conversion of $CO_2$ to hydrocarbons (e.g., conversion of $CO_2$ to desired products, such as natural gas (renewable natural gas, RNG), propane and liquefied petroleum gas (LPG), methanol, and olefins), endothermic chemical reactions such as hydrocarbon cracking to olefins, conversion of $CO_2$ to various chemicals, cracking of ammonia to produce hydrogen, methane reforming to produce syngas, reverse water gas shift reaction to convert $CO_2$ into CO, and methane/hydrocarbon pyrolysis to produce carbon and $H_2$.

$CO_2$ is a greenhouse gas (GHG) and a highly stable molecule, requiring energy input to process it to form higher value/usable chemicals. $CO_2$ is produced from combustion of hydrocarbon fuels, and such $CO_2$ is desirably removed from combustion products gases or otherwise efficiently utilized so that it does not contribute to increases in $CO_2$ in the ambient atmospheric environment. The methods and systems described herein serve as efficient and cost-effective means for utilizing carbon-free electricity to provide localized thermal energy required for the adsorption and conversion of $CO_2$ to usable products. In various embodiments, the ECSM supports the electrification of chemical production, which can reduce $CO_2$ emissions through the use of renewable, low carbon emissions electricity for meeting thermal energy requirements in the chemical industry.

As used herein and in the appended claims, the singular forms "a", "an", and "the" include plural referents unless the context clearly dictates otherwise.

As used herein, the terms "about" and "approximately" generally mean an acceptable degree of error for the quantity measured given the nature or precision of the measurements. Exemplary degrees of error are within 20-25 percent (%), typically, within 10%, and more typically, within 5% of a given value or range of values. The terms "about" and "approximately" include the recited value being modified; for example, "about 1.5" includes the recited value 1.5, as well as an acceptable degree of error around the recited value 1.5.

As used herein, the term "electrically conductive carbon network" refers to an extended continuous network of electrically conductive carbon through which electrical current can be flowed, and which responds to such electrical current flow with joule heat generation throughout the extended continuous network.

The electrically conductive carbon that is effective to generate joule heating in the electrically conductive carbon network may comprise carbon black, graphitic carbon, graphene, carbon nanotubes, pyrolyzed carbon, and carbon in the form of carbide compounds of metalloids (e.g., silicon carbide) or metals, as well as combinations of two or more of the foregoing.

The electrically conductive carbon network advantageously has a G/D Raman spectral intensity ratio in a range of from 0.5 to 3, and a resistivity in a range of from 0.01 $\Omega$-m to 300 $\Omega$-m.

The electrically conductive carbon network may be provided as a joule heat source in and/or on a three-dimensional structure, to constitute a joule heating structure. The three-dimensional structure may be or comprise. When electrical current is flowed through the electrically conductive carbon network, joule heat is generated, which may be utilized to heat active species associated with the three-dimensional structure to effect heat-mediated transformations, such as heating of sorbents to effect desorption, heating of catalysts to facilitate and enhance their catalytic activity, heating of chemical compounds to mediate reaction, or to achieve other heat-mediated actions or results.

As used herein, the terms "structured material assembly" or "SMA" refers to a structural assembly that includes an electrically conductive carbon network that is arranged to supply joule heating by flow of electrical current therethrough.

In various embodiments, the electrically conductive carbon network may be formed on a surface of the support, carrier, substrate, or continuous phase material by 3D printing of the electrically conductive carbon or precursor thereof on the continuous phase material surface, using a suitable carbon ink formulation of the electrically conductive carbon or precursor thereof. When a precursor is printed, the deposited precursor may then be subjected to curing and/or polymerization and/or other treatment methods to provide the electrically conductive carbon network in operative form.

In other embodiments, the electrically conductive carbon network may be formed on and/or in the support, carrier, substrate, or continuous phase material by vapor deposition techniques in which the electrically conductive carbon or precursor thereof is applied to the support, carrier, substrate, or continuous phase material. Any other suitable techniques may be employed in the broad practice of the present disclosure for forming the electrically conductive carbon network on and/or in the support, carrier, substrate, or continuous phase material.

In the ensuing description, unless otherwise expressly stated, percentages pertaining to gas and fluid compositions are percentages by volume of the total gas or fluid volume, and percentages pertaining to solid compositions are percentages by weight of the total solid composition weight.

The disclosure, as variously set out herein in respect of features, aspects, and embodiments thereof, may be constituted as comprising, consisting, or consisting essentially of, some or all of such features, aspects and embodiments, as well as elements and components thereof being aggregated to constitute various further implementations of the disclosure. The disclosure is set out herein in various embodiments, and with reference to various features and aspects of the disclosure. The disclosure contemplates such features, aspects and embodiments in various permutations and combinations, as being within the scope of the invention. The disclosure may therefore be specified as comprising, consisting, or consisting essentially of any of such combinations and permutations of these specific features, aspects and embodiments, or a selected one or ones thereof.

The electrically conductive carbon network of the present disclosure, when electrically energized, provides Joule heating that may be readily transmitted to a wide variety of active materials that require heat input and elevated temperature to carry out chemical, catalytic, and sorbent operations. The electrically conductive carbon network may be formed by electrically conductive carbon-containing materials, e.g., carbon black, graphitic carbon, graphene, carbon nanotubes, pyrolyzed carbon, and carbon in the form of carbide compounds of metalloids (e.g., silicon carbide) or metals, as well as combinations of two or more of the foregoing, etc., either alone or in combination (blended or embedded) with other materials to form structural materials on and/or in which chemical reactions, catalysts, and sorbents can be loaded as appropriate, to form a structured material assembly (SMA), in which the electrically conductive carbon-containing material provides Joule heating when current is passed through the material.

FIG. 1 is a schematic depiction of electrically heatable structures according to other embodiments of the present disclosure. In the upper left portion of FIG. 1, the layers of one embodiment of the electrically heatable structure are shown in the exploded view, as successively including, from bottom to top layers, a bottom active material layer, a support material layer, an electrically conducted carbonized material layer, a substrate layer, an electrically conductive carbon network layer, a support layer, and an active material top layer, with the layers consolidated as shown in the structure depicted at the lower left portion of FIG. 1, and FIG. 1 at the upper right portion thereof shows an electrically heatable structure including a central passage opening through which fluid may be flowed in the operation of the structure, wherein the central passage opening is circumscribed by a layer of active material, over which is provided a support material layer, over which is provided an electrically conductive carbon network, over which is provided and enclosing substrate layer, and with the lower right portion of FIG. 1 showing an electrically heatable structure of generalized schematic form, in which the multiple passages are circumscribed by the successive layers as in the single passage structure shown in the upper right portion of FIG. 1.

FIG. 1 in the lower portion of such drawing illustrates an electrically conductive structured material (ECSM) of particularly advantageous form, including a monolith substrate having a multiplicity of channels formed therein, of generally square cross-section, on the interior walls of which are provided a heating layer in contact with the wall, such heating layer comprising the electrically conductive carbon network of the present disclosure, a support layer, e.g., of alumina or other suitable material, overlying and in direct contact with the heating layer, and an active layer, the active layer comprising in the illustrated embodiment an active catalyst layer overlying and in direct contact with the support layer.

Each of the channels of the ECSM therefore has the active layer/support layer/heating layer multilayer assembly on its inner walls surfaces. By this construction, a fluid medium can be flowed through the channels of the monolith ECSM and be catalytically modulated by the active catalyst in the outermost active catalyst layer supported on the support layer. Heat is supplied to such catalyst layer on the support layer, to facilitate or enhance the activity of the catalyst, from the heating layer comprising the electrically conductive carbon network, when the electrically conductive carbon network in the heating layer is electrically energized.

The active layer in such ECSM is shown in FIG. 1 as an active catalyst layer, for conducting catalytic operations, but could alternatively comprise sorbent in a corresponding ECSM for carrying out sorbent operations, in which for example the heating layer may be actuated by electrically energizing the electrically conductive carbon network thereof to provide heat to the sorbent for desorption of previously adsorbed sorbate component.

Carbon as the Joule heating component in SMAs may be prepared through any of a wide variety of suitable techniques. The electrically conductive carbon network, or precursor material(s) for forming the electrically conductive carbon network, may be applied in the preparation of the SMA by application processes such as spray coating, dip coating, roller coating, extrusion, precipitation, vapor deposition, etc.

In various embodiments, a conductive layer of carbon is obtained through pyrolysis of a coated carbon precursor comprising compounds such as phenols or organic polymer resins, which are coated on the surface of structural substrates, e.g., by dip coating or spray coating of a solution or slurry containing the phenol or organic polymer resin. Alternatively, structural substrates can be directly coated with carbon in the form of carbon black, graphite, and graphene, as a carbon ink, or the structural substrate can be coated with a suitable carbon-containing material such as silicon carbide (SiC) or modified SiC.

The structural substrate on which the carbon-containing material is coated may be of any suitable type, and may for example comprise monolith substrates formed of cordierite, mullite, silicon dioxide, alumina, zirconia, titania, zeolites, or other appropriate material. In other embodiments, the structural substrate may be a foam material, such as a metal, ceramic, or carbon foam. In still other embodiments, the structural substrate may be a laminate or sheet, formed of ceramic, carbon, or polymer material, such as a non-woven sheet of polymer or other suitable material. The structural substrate in other embodiments may be a support for an active material such as a catalyst or sorbent, in which the support may for example be formed of alumina, silica, aluminosilicate, porous carbon, etc.

Monolith supports may utilize the electrically conductive carbon network formed therein and/or thereon with catalyst of any suitable type, including catalysts for converting $CO_2$ to other products, e.g., hydrocarbon products, such as synthetic natural gas, renewable natural gas, propane/liquid petroleum gas, olefins, sustainable aviation fuel, alcohols such as methanol and ethanol, catalysts for converting ammonia to hydrogen, catalysts for reforming methane to syngas, catalysts for carrying out reverse water gas synthesis reaction, catalysts for converting hydrocarbons to hydrogen (e.g., in methane pyrolysis), catalysts for carrying out reactions such as hydrogenation, alkylation, hydration, syngas production. Monolith supports may utilize the electrically conductive carbon network formed therein and/or thereon with sorbents of any suitable types, such as for example sorbents for $CO_2$ removal from $CO_2$-containing fluids that are contacted with such sorbents. The other mentioned structural substrates (foams, laminates, sheets) may likewise be utilized with such catalysts and sorbents in the SMA with which the electrically conductive carbon network is provided to facilitate or enhance the processing operations that are carried out by the SMA comprising such electrically conductive carbon network.

In other embodiments, the electrically conductive carbon network may be formed in the SMA through an extrusion process, e.g., in which an extrusion composition comprising carbon precursor and/or carbon with inorganic compounds such as metal oxide(s) is extruded, and the extrudate is subjected to a heat process such as pyrolysis. Such extrusion processing may be employed to embed an electrically conductive carbon network in an SMA monolith, foam, or laminate, or other SMA component article. In such applications, the SMA can be provided with a desired level of porosity so that active materials such as catalysts or sorbents can be incorporated in the finished SMA at a desired loading and distribution therein.

The electrically resistive Joule heating structured material of the present disclosure may usefully be employed for electrification of chemical processes, in which heat produced by the electrically conductive carbon network is transmitted to effectuate or enhance the chemical process, e.g., heating the reactants, intermediates, or products of chemical processes, as well as electrification of catalytic processes to provide suitable temperature processing conditions to facilitate or enhance the catalytic process and catalytic activity of the catalyst, and electrification of sorbent processes to provide heat/thermal energy required for sorbent operations and/or endothermic reactions, e.g., provision of heat for desorption. Since the current flow to the electrically conductive carbon network is readily controlled in a precise manner, and the current flow can be initiated or terminated with immediate effect, correspondingly precise temperature control is achievable. Thus, current flow can be modulated to provide a time-varying temperature profile appropriately suited to process needs of specific applications, and can be modulated to provide heat required for endothermic reactions in a controlled manner to achieve a tight product distribution without an excess of side reaction products.

Figure 2:
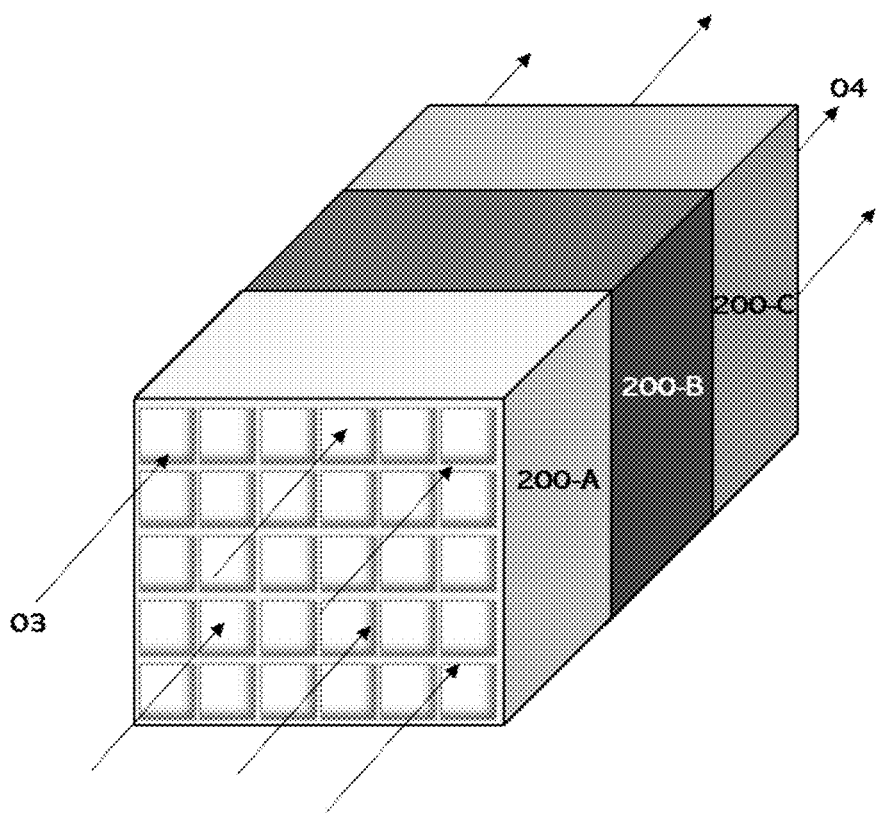
FIG. 2 shows an embodiment of the reactor (shown in FIG. 24) containing a staged heating profile, with varied reaction temperatures ranging from low at the feed (200-A) to high in the middle section (200-B) to medium at product output (200-C).

In one embodiment, in order to enable precise temperature management, from the feed point to the exit, along with optimal conditions for the desired reaction, the heating layer, as shown in FIG. 2, has different thermal properties and compositions along the length of the structured material (like a monolith) allowing for a controlled temperature gradient. This involves the heating layer having varying heat conductivities and capacities. The arrangement of these materials is engineered such that the section the ECSM near the feed point has medium resistance, allowing the feed to preheat, gradually transitioning to more resistance towards the center, and then to low resistance towards the end, for product cooling. This setup induces a temperature gradient, crucial for feed preheat and the target reaction temperature (both exothermic and endothermic) requiring staged heating or different reaction zones. This embodiment demonstrates enhanced reaction efficiency with the ability to optimize the reaction conditions along the path of the reactants and achieve higher yields and selectivity for desired products. This allows for localized heating, in selected sections, reducing the overall energy consumption as heat is not wasted over inactive zones. This thereby leads to an extended catalyst life, since controlled temperatures prevent hot spots that can degrade catalysts prematurely. Another embodiment involves integration of sensors within the ECSM to dynamically adjust temperatures based on real-time reaction conditions, enhancing adaptability and control over the chemical processes. This offers a versatile and efficient solution to limitations in temperature management within reactors for endothermic and exothermic reactions.

Figure 3:
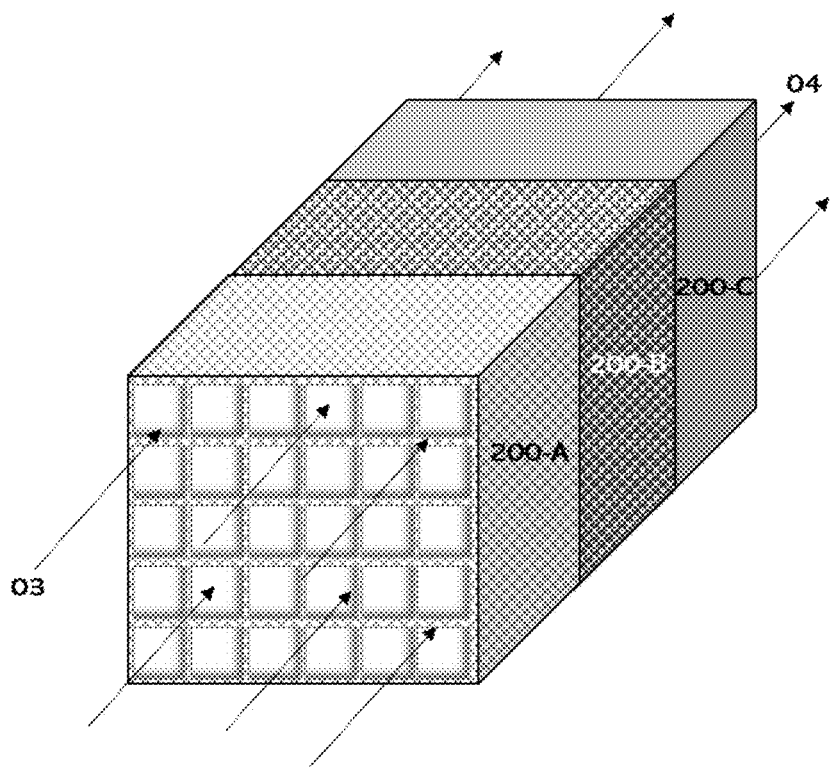
FIG. 3 shows an embodiment of the reactor containing a staged heating profile, with varied reaction temperatures with different active material for corresponding reactor temperature: ranging from low at the feed (200-A) to high in the middle section (200-B) to medium at product output (200-C).

In another embodiment, the ECSM involves a cordierite monolith structured material which is innovatively coated with different compositions of the heating layers and different catalysts (or active material), along its length, as shown in FIG. 3. This embodiment enables a gradient of temperatures across the ECSM, from the feed to the exit, with specific catalysts coated at intervals that are most effective at the corresponding temperatures. Each heating layer of the ECSM has different thermal properties and compositions allowing for a controlled temperature gradient along the length of the monolith. Each layer of the active material has a different catalyst or sorbent, active at the corresponding temperature allowing for a controlled catalytic activity along the length of the ECSM. From the feed point to the exit, the temperature can be precisely managed, along with the activity of the desired reaction at that temperature, enabling optimal conditions for the reaction. This involves the ECSM being coated with different compositions of the heating layer, that have varying heat conductivities and capacities, and varying active material compositions. The arrangement of these materials is engineered such that the section of the ECSM near the feed point has medium resistance, allowing feed to preheat with reaction activity at medium temperatures (<200-600° C.), gradually transitioning to more resistance towards the center with reaction activity at medium to high temperatures (600-1200° C.), and then to low resistance towards the end (200-600° C.), for product cooling. This setup induces a temperature gradient, crucial for feed preheat, and activity for the desired reaction requiring staged heating or different reaction zones. This embodiment demonstrated enhanced reaction efficiency with the ability to optimize the reaction conditions along the path of the reactants and achieve higher yields and selectivity for desired products. This allows for localized heating, in selected sections, reducing the overall energy consumption as heat is not wasted over inactive zones along with increased catalytic activity. This thereby leads to an extended catalyst life, since controlled temperatures prevent hot spots that can degrade catalysts prematurely. Another embodiment involves integration of sensors within the ECSM to dynamically adjust temperatures based on real-time reaction conditions, enhancing adaptability and control over the chemical processes. This offers a versatile and efficient solution to current limitations in temperature management within reactors. This embodiment provides a customizable and efficient solution to complex chemical processes encompassing exothermic and endothermic reactions requiring precise environmental controls.

The present disclosure relates in one aspect to a structured material assembly comprising a structural substrate on and/or in which is provided a heating material comprising an electrically conductive carbon network that is electrically energizable to provide Joule heating, the structured material assembly further comprising an active material positioned in the structured material assembly to be heated by the Joule heating provided by the electrically conductive carbon network when the electrically conductive carbon network is electrically energized, wherein the active material comprises a sorbent in response to the Joule heating changes its sorptive capacity and/or a catalyst that in response to the Joule heating changes its catalytic activity.

In such structured material assembly, the electrically conductive carbon network may as previously described comprise electrically conductive carbon-containing material selected from the group consisting of carbon black, graphitic carbon, graphene, carbon nanotubes, silicon carbide, pyrolyzed carbon, and combinations of two or more of the foregoing. In various embodiments, the structural substrate comprises material selected from the group consisting of cordierite, mullite, silicon dioxide, alumina, zirconia, titania, zeolites. The structural substrate of the structured material assembly in various implementations comprises a foam material, e.g., a metal foam, ceramic foam, carbon foam, or other material foam. The structural substrate of the structured material assembly in other implementations comprises a laminate or sheet-form structure. For example, the structural substrate may comprise a non-woven sheet, which may comprise polymeric, carbon, or cellulosic fibers.

In various embodiments, the structural substrate of the structured material assembly comprises a monolith substrate. The monolith substrate may be channelized with a multiplicity of substantially aligned channels extending therethrough to open ends at opposite faces of the monolith substrate, and each channel on interior surface thereof has the heating material and the active material deposited thereon. Such structured material assembly may further comprise electrical circuitry elements, e.g., electrodes, electrical connectors, electrical wires, etc., as arranged in electrical communication with the electrically conductive carbon network in the heating material in channels of the monolith substrate.

The structured material assembly in other embodiments may comprise a sorbent and a catalyst that are co-located in the structured material assembly to carry out adsorption, and desorption and catalytic reaction of desorbed sorbate that was adsorbed in the adsorption. In various embodiments, the active material may comprise a sorbent that is selective for $CO_2$, as for example, a sorbent selected from oxides, carbonates, and bicarbonates of Group 1 and Group 2 elements such as sodium, calcium, potassium, barium, cesium, lithium, magnesium, and combinations thereof, and a catalyst that is effective to catalytically transform the desorbed sorbate to desired product(s) at the temperature and pressure at which desorption and catalytic reaction is conducted, as for example, a catalyst comprising ruthenium, rhodium, palladium, silver, osmium, iridium, platinum, gold, iron, cobalt, nickel, copper, or zinc.

The disclosure relates in a further aspect to a process system for adsorption of $CO_2$ and catalytic reaction of the $CO_2$ to produce hydrocarbon product, the process system comprising the structured material assembly of the present disclosure as variously described herein, wherein the active material comprises a $CO_2$-selective sorbent, and a catalyst for reaction of $CO_2$ to produce hydrocarbon product. The hydrocarbon product may in various implementations comprise liquefied petroleum gas, propane, olefinic hydrocarbons, methane, or other suitable hydrocarbon product.

The disclosure relates in another aspect to a process system for conducting hydrogenation of $CO_2$ to hydrocarbons such as olefins ($C_2$-$C_{20}$), the process system comprising the structured material assembly according to the present disclosure wherein the active material comprises a catalyst for this $CO_2$ hydrogenation reaction, which includes, but is not limited to, monometallic, bimetallic, or multimetallic supported and promoted catalysts. These categories of catalyst include combinations of (a) active metals which include, but are not limited to, Ni, Fe, Co, Ru, Rh, Pd, Pt, Cu, Mo, W, Au, Ag, Cr, Re, Os, Ir, V, Zn, Mn, Ga, Ce, La, etc., supported on $Al_2O_3$, $SiO_2$, MgO, CaO, $ZrO_2$, $CeO_2$, $TiO_2$, $La_2O_3$, $Cr_2O_3$, $Y_2O_3$, activated carbon, spinels ($MgAl_2O_4$), perovskites ($LaFeO_3$, $SrTiO_3$, etc.), hydrotalcites, zeolites, cordierite, SiC, graphene oxide, metal-organic framework (MOFs), boron nitride, $AlPO_4$, BaO, SrO, etc., promoted by K, Ca, Mg, La, Ce, Ba, Sr, Li, Zn, Cs, Th, W, P, Mn, S, Cl, etc.

The disclosure relates in another aspect to a process system for conducting hydrogenation of $CO_2$ to hydrocarbons like propane and/or LPG (liquid petroleum gas), the process system comprising the structured material assembly according to the present disclosure wherein the active material comprises a catalyst for this $CO_2$ hydrogenation reaction, which includes, but is not limited to active metals like Fe, Co, Ni, Cu, Ru, Pd, Pt, Ga, In, Zn, Rh, Mo etc., supported on ZSM-5, beta zeolite, SSZ-13, USY, MFI Zeolite, $Al_2O_3$, $SiO_2$, MgO, $ZrO_2$, $CeO_2$, $TiO_2$, $La_2O_3$, CNTs, graphene, SiC, activated carbon. etc., promoted by K, Na, Ca, Mg, Ba, Sr, La, Ce, Zn, Mn, Li, Cs, Th, Cu, Ag, Au, P, S, Cl, F, etc.

The disclosure relates in a further aspect to a process system for conducting reverse water gas shift reaction, the process system comprising the structured material assembly according to the present disclosure wherein the active material comprises a catalyst for the water gas shift reaction, which includes, but is not limited to, active metals such as Ni, Fe, Co, Ru, Rh, Pd, Pt, Cu, Mo, W, Au, Ag, Cr, Re, Os, Ir, V, Zn, Mn, Ga, Ce, La, etc., supported on $Al_2O_3$, $SiO_2$, MgO, CaO, $ZrO_2$, $CeO_2$, $TiO_2$, $La_2O_3$, $Cr_2O_3$, $Y_2O_3$, activated carbon, spinels ($MgAl_2O_4$), perovskites ($LaFeO_3$, $SrTiO_3$ etc.), hydrotalcites, zeolites, cordierite, SiC, graphene oxide, metal-organic framework (MOFs), boron nitride, $AlPO_4$, BaO, SrO, etc., promoted by K, Ca, Mg, La, Ce, Ba, Sr, Li, Zn, Cs, Th, W, P, Mn, S, Cl, etc.

In another implementation, the disclosure relates to a process system for conducting methane pyrolysis reaction to produce hydrogen, the process system comprising the structured material assembly according to the present disclosure wherein the active material comprises a catalyst for the methane pyrolysis reaction, which includes, but is not limited to, active metals such as Ni, Fe, Co, Ru, Rh, Pd, Pt, Cu, Mo, W, Cr, Re, Os, Ir, V, Mn, Zn, Ga, Ce, La, Ti, etc., supported on $Al_2O_3$, $SiO_2$, MgO, CaO, $ZrO_2$, $CeO_2$, $TiO_2$, $La_2O_3$, $Cr_2O_3$, $Y_2O_3$, activated carbon, CNTs, graphene and/or graphene oxide, carbon black, graphite, spinels ($MgAl_2O_4$), perovskites ($LaFeO_3$, $SrTiO_3$ etc.), hydrotalcites, zeolites, cordierite, SiC, metal-organic framework (MOFs), boron nitride, BaO, SrO, etc., and promoted by K, Ca, Mg, La, Ce, Ba, Sr, Li, Zn, P, S, Cl, F, etc.

The disclosure relates in one aspect to a process system for conducting the steam methane reforming reaction for syngas and/or hydrogen production, the process system comprising the structured material assembly according to the present disclosure wherein the active material comprises a catalyst for the steam methane reforming reaction, which includes, but is not limited to, active metals such as Ni, Co, Ru, Rh, Pt, Pd, Fe, Cu, Mo, Cr, W, Ir, Os, Re, etc., supported on $Al_2O_3$, $SiO_2$, MgO, CaO, $ZrO_2$, $CeO_2$, $TiO_2$, $La_2O_3$, $Cr_2O_3$, $Y_2O_3$, activated carbon, spinels ($MgAl_2O_4$), perovskites ($LaFeO_3$, $SrTiO_3$ etc.), hydrotalcites, zeolites, cordierite, SiC, graphene oxide, metal-organic framework (MOFs), etc., and promoted by K, Ca, Mg, La, Ce, Ba, Sr, etc.

Steam methane reforming processes may raise mass transfer, heat transfer, and coke deposition issues, and such issues are readily addressed by the Joule heating structures and assemblies of the present disclosure, functionalized with the above-mentioned or other catalysts, in which precision control of the joule heating provided by the electrically conductive carbon network facilitates thermal management of the reforming process in a manner addressing and minimizing such mass transfer, heat, and coke deposition issues.

The disclosure also relates in another aspect to a process system for conducting the dry methane reforming reaction for syngas and/or hydrogen production, the process system comprising the structured material assembly according to the present disclosure wherein the active material comprises a catalyst for the dry methane reforming reaction, which includes, but is not limited to, active metals such as Ni, Co, Ru, Rh, Pt, Pd, Fe, Cu, Mo, Cr, W, Ir, Os, Re, Mn, V, Zn, Ga, etc., supported on $Al_2O_3$, $SiO_2$, MgO, CaO, $ZrO_2$, $CeO_2$, $TiO_2$, $La_2O_3$, $Cr_2O_3$, $Y_2O_3$, activated carbon, spinels ($MgAl_2O_4$), perovskites ($LaFeO_3$, $SrTiO_3$, etc.), hydrotalcites, zeolites, cordierite, SiC, graphene oxide, metal-organic framework (MOFs), $LaAlO_3$, etc., and promoted by K, Ca, Mg, La, Ce, Ba, Sr, Li, Zn, etc. This would also include noble metal alloys, mixed oxides, doped perovskites, carbide-supported catalysts and bimetallic catalysts.

In such dry methane reforming applications, the joule heating structures and assemblies of the present disclosure may be functionalized with the above-mentioned catalysts and advantageously employed to generate joule heating according to the endothermic heat requirements of the dry methane reforming reaction that are associated with such catalysts.

The disclosure also relates in another aspect to a process system for conducting the ammonia cracking reaction for hydrogen production, the process system comprising the structured material assembly according to the present disclosure wherein the active material comprises a catalyst for ammonia cracking reaction, which includes, but is not limited to active metals such as Ni, Ru, Fe, Co, Pd, Pt, Rh, Mo, W, Os, Ir, Cu, V, Zn, Cr, Re, etc., supported on $Al_2O_3$, $SiO_2$, MgO, CaO, $ZrO_2$, $CeO_2$, $TiO_2$, $La_2O_3$, $Cr_2O_3$, $Y_2O_3$, activated carbon, spinels ($MgAl_2O_4$), perovskites ($LaFeO_3$, $SrTiO_3$ etc.), hydrotalcites, zeolites, cordierite, SiC, graphene oxide, metal-organic framework (MOFs), boron nitride, etc., and promoted by K, Ca, Mg, La, Ce, Ba, Sr, Li, Zn, etc. This would also include noble metal alloys, doped perovskites, nitride and/or carbide-supported catalysts, and layered double hydroxides (LDHs).

The joule heating structures and assemblies of the present disclosure may be functionalized with the above-mentioned catalysts and advantageously employed to generate joule heating according to the endothermic heat requirements of the ammonia cracking reaction that are associated with such catalysts.

A further aspect of the disclosure relates to a process for adsorption of $CO_2$ and catalytic reaction of the $CO_2$ to produce hydrocarbon product, the process comprising adsorbing $CO_2$ from a $CO_2$-containing gas, desorbing the adsorbed $CO_2$, and catalytically reacting the desorbed $CO_2$ to produce the hydrocarbon product, using the structured material assembly of the present disclosure. The hydrocarbon product may comprise liquefied petroleum gas, propane, olefinic hydrocarbon, methane, or other hydrocarbon compound(s).

Another aspect of the disclosure relates to a process for conducting reverse water gas shift reaction, the process comprising conducting the reverse water gas shift reaction in the structured material assembly according to the present disclosure wherein the active material comprises a catalyst for the water gas shift reaction.

Yet another aspect of the disclosure relates to a process for conducting methane pyrolysis reaction to produce hydrogen, the process comprising pyrolyzing methane in the structured material assembly according to the present disclosure, as variously described herein, wherein the active material comprises a catalyst for the methane pyrolysis reaction.

In one aspect of the disclosure, a method for coating a substrate with an electrically conductive carbon network comprises providing a three-dimensional substrate, coating the substrate with a carbon precursor, and heating the coated substrate to a temperature in a range of from 80° C. to 300° C. for solvent removal and curing, then pyrolyzed at temperature in a range of from 600° C. to 1600° C. under an inert atmosphere to pyrolyze the carbon precursor, and form an electrically conductive carbon network on and/or in the substrate. The applied pyrolysis and heat treatment temperature depends on the nature of the application of the ECSM. The term "coating" encompasses one or more of dispersing the carbon precursor on and/or in the substrate and impregnating the carbon precursor on and/or in the substrate. The term "coating" may in various embodiments mean that the carbon precursor is only on the exterior of the three-dimensional substrate surface. However, "coating" in other embodiments may mean that the carbon precursor is dispersed on the accessible exterior as well as interior surface of the substrate using any method that enables such coating operation.

The carbon precursor can be in the form of a liquid solution comprising phenols, polyethyl alcohols, other polymers, or a combination thereof. The polymer solution may comprise, but is not limited to, thermosetting polymers such as phenolic resins or thermoplastics such as polyethylene, in a solution comprising an organic or inorganic solvent. The carbon precursor solution may be dispersed onto the three-dimensional substrate so that the carbon precursor is introduced onto and/or in the substrate, followed by thermal heat treatment to set the carbon precursor and to pyrolyze the carbon precursor to a solid, thereby forming the electrically conductive carbon network.

In certain embodiments, the carbon precursor may be selected to have a molecular size that is smaller than the pore size of the three-dimensional substrate, allowing the carbon precursor solution to permeate through the body of the porous substrate. When subjecting the coated substrate to thermal heat treatment, an electrically conductive carbon network is formed through the walls of the three-dimensional substrate. The thickness, extent of the carbon network and its electrical conductivity will depend on the composition of the carbon precursor used, the concentration of carbon precursor solution, properties of the substrate, and the thermal heat treatment procedure used on the coated substrate.

In certain embodiments, a phenolic resin solution is used as the carbon precursor solution. The phenolic resin solution can be diluted with a solvent, preferably deionized water or alcohols such as methanol or ethanol, in varying ratios, to provide 5.0-50% phenolic resin in the solvent by weight, depending on the resistivity characteristics that are sought to be provided in the electrically conductive carbon network. After the phenolic resin solution is coated on the substrate, the coated substrate is pyrolyzed in an atmosphere depleted of oxygen species such as in a vacuum and/or in an ultra-high purity $N_2$ atmosphere, to form an electrically conductive carbon network on and/or in the substrate. The pyrolyzed phenolic resin or polymer forms a macroscopically continuous, electrically conductive carbon network into which electrical energy can be inputted to produce localized heating. The electrically conductive carbon network can provide an electrical heating function as well as a supporting function for additional components that may be added to the substrate. Additionally, in various embodiments, the conductive carbon network can provide a reinforcing or supportive structure function for the coating of additional components, such as supports and catalyst or sorbent species, thereby minimizing or eliminating the need for separately applied base supports.

In an illustrative implementation, the phenolic resin solution may be dispersed onto a porous three-dimensional substrate and thermally heat treated initially at 80-300° C. for 0.5-36 hours for solvent removal and thermosetting before heating in an atmosphere-controlled furnace up to 1600° C. to pyrolyze the phenolic resin to an electrically conductive carbon network. The atmosphere control removes oxygen species present and/or generated, and may for example employ vacuum purge, inert gas sweep, or a combination thereof.

In various embodiments, the carbon precursor can incorporate a metal precursor component that, after coating of a substrate and subjecting the coating to thermal heat treatment, forms a metal carbide that serves as the carbon component of the electrically conductive carbon network. Compared to purely carbonized carbon precursor, the metal carbide of the electrically conductive carbon network can provide additional properties of interest, such as chemical reactivity resistance and thermal stability, while maintaining good electrical properties. The metal precursor can be in the form of liquid solutions or powders of carbonyl, nitrates, organic hydrocarbons, and other precursors that produce chemical species containing primarily carbon and the metal after high temperature thermal heat treatment. The metal can for example be or comprise tungsten, molybdenum, iron, titanium, silicon, zirconium, chromium, manganese, cobalt, nickel, or any combination thereof.

In various embodiments, a promoter is added to the carbon precursor to catalyze the carbonization and increase the extent of graphitization of the carbon precursor during the thermal heat treatment. The extent of graphitization of the carbon precursor can affect the electrical, chemical, physical and mechanical properties of the electrically conductive carbon network formed. Addition of promoters can enhance the formation of orderly, graphitic carbon during thermal pyrolysis, reducing the duration and temperature required to form the electrically conductive carbon network with the desired electrical, chemical, physical, and mechanical properties. The promoter can be a metal precursor, such as a precursor containing nickel, iron, manganese, copper, and like, wherein the metal constitutes 0.1 wt % to 15 wt %, based on weight of the carbon in the carbon precursor.

The metal precursor may be a nanoparticle metal powder mixed into the carbon precursor solution and coated onto the substrate. Thermal heat treatment carbonizes the carbon precursor and reacts it with the solid metal forming the metal carbide. Smaller metal powder particles provide greater surface area for the solid-solid reaction. Metal particle size in the range of <10 micron is preferred. Thermal heat treatment temperature can be in a range of 500-2,500° C.

When a metal or metal precursor is coated onto a substrate, the carbon precursor may be a gas-phase hydrocarbon, such as methane, ethane, propane, or like. The substrate coated with the metal or metal precursor is heated to 500-2,500° C. and the gaseous carbon precursor is fed over the surface. The carbon precursor catalytically decomposes onto the surface of the metal and, after additional thermal heat treatment (increased temperature, time, or a combination thereof) forms the metal carbide.

The metal precursor in various embodiments may be in a solution as an organic metal compound. Thermal heat treatment of the organic metal compound when coated onto the surface of a substrate carbonizes the hydrocarbon constituents and forms a metal carbide between the carbonized material and the metal species to provide an electrically conductive carbon network through which electrical current can be flowed to generate Joule heating.

In various embodiments, a metal or metal oxide layer maybe formed over the surface of the electrically conductive carbon network to serve as a protective layer to impart additional chemical, thermal, and thermal-chemical stability. The metal or metal oxide layer can be formed using either solution coating with thermal heat treatment or chemical vapor deposition. In the case of chemical vapor deposition, the protective metal precursor, e.g., a metal organic, is vaporized using an inert sweep gas and passed over the surface of the prepared ECSM and heated to 200-1,000° C. The organic metal decomposes onto the surface of the ECSM forming a metal or metal oxide protective layer. Alternatively, the ECSM can be coated with a liquid solution of the metal precursor and heat treated to 200-1000° C. to form the metal or metal oxide protective layer. The protective metal precursor may contain iron, silicon, aluminum, titanium, cobalt, magnesium, manganese, calcium, zinc, palladium, molybdenum, silver, or a combination thereof. The composition of the protective layer after thermal heat treatment can be in a metal or metal oxide phase.

The three-dimensional substrate with which the electrically conductive carbon network is associated may be present in various forms or structures, depending on suitability for a particular application. The substrate can provide a reinforcing or supportive structure for the electrically conductive carbon network. For example, the substrate may be of sheet, block, cylindrical, or layer form, or the substrate may be in a monolithic form, laminate form, wire mesh form, foam material, or nonwoven sheet. The material of construction of the substrate may be of any suitable type, and may, for example, comprise a ceramic, metal, metal oxide, organic, and/or inorganic material, or any combinations thereof, or combinations including other materials.

The substrate material may for example comprise cordierite, mullite, alumina, silica/alumina, silicon carbide (SiC), titania, silica, magnesia, zirconia, metal mesh, carbon, or combinations of two or more thereof. The silica maybe in the form of porous oxides such as fused silica or molecular sieves (e.g. MCM-41 zeolite). Alumina may consist of porous, high temperature phases such as alpha or gamma phase alumina. Aluminosilicates such as zeolites or molecular sieves maybe used. The substrate may for example comprise a ceramic such as cordierite, titania, alumina, mullite, carbon/ceramic composite, SiC, or SiC/ceramic composite in a monolithic form. It is generally understood that cordierite comprises a mixture of components, including MgO, $Al_2O_3$ and $SiO_2$. Conventionally, the composition of cordierite is represented as $2MgO \cdot 2Al_2O_3 \cdot 5SiO_2$. This cordierite composition $2MgO \cdot 2Al_2O_3 \cdot 5SiO_2$ may be suitably tailored to have different molar ratios and starting raw material properties of magnesia, alumina, and silica to meet the performance targets for the substrate. Additionally, components such as talc, clay, kaolin, and raw alumina powder may also be used for cordierite preparation. Monolithic compositions based on cordierite can include advantageous characteristics, such as, for example, porosity and pore size distribution suitable for ease of washcoat application and good washcoat adherence, and compatibility with washcoats.

In certain embodiments, the substrate material can comprise carbon, amorphous or graphitic. The substrate can for example be in the form of a monolith, foam material, or laminate sheet. The extent of graphitization and geometry of the three-dimensional carbon substrate will determine its physical, mechanical and electrical properties.

In certain embodiments, the carbon precursor loading onto the substrate can be in the range of 1-30 wt % which is the weight of the hydrocarbon constituent in the carbon precursor divided by the weight of the substrate plus the weight of the hydrocarbon constituent in the carbon precursor. After heat treatment and final pyrolysis, the remaining electrically conductive carbon species can be 0.5-20 wt % which is the weight of the carbon species in the electrically conductive carbon network divided by the weight of the substrate plus the weight of the carbon specie in the electrically conductive carbon network.

In certain embodiments, the extent of graphitization of the electrically conductive carbon network can achieve a G/D ratio from a Raman spectra of 0.5-3.0. G/D is defined as the area of the G-band divided by the area of the D-band in the Raman spectra profile. The BET surface area after carbon coating as measured with $N_2$ can be increased due to the contribution of microporosity of coated carbon, and the extent of the surface area increase depends on the nature of carbon precursor, the additive, and the process conditions.

In various embodiments, the three-dimensional substrate in monolithic form can have varying cell density and wall thickness. For example, the substrate may have a cell density of at least 200 cells per square inch (CPSI). Suitably, this cell density may be 200 CPSI, 300 CPSI, 400 CPSI, 500 CPSI, 600 CPSI, 700 CPSI, 800 CPSI, 900 CPSI, 1000 CPSI, or more, although the disclosure is not limited thereto. The substrate wall thickness may be of any suitable thickness dimension, e.g., from 2 mils (1.0 mil=25.4 micron) to 12 mils, or more. For example, the wall thickness may be 2 mils, 3 mils, 4 mils, 5 mils, 6 mils, 7 mils, 8 mils, 9 mils, 12 mils, or more.

In various embodiments, the three-dimensional substrate in monolithic form can have pores of varying pore size connecting the cells through the walls. In various embodiments, these pores may have a pore size distribution with a pore size $d_{50}$ in a range of 1.0 microns to 100 microns. $d_{50}$ is defined as a diameter value at which 50% of the particles are below or equal to the specified diameter.

In various embodiments, the substrate is formed using an extrusion technique in which a slurry is prepared with the necessary pore-forming material to provide porosity and pore size to allow the carbon precursor solution to permeate through and disperse within the walls of the extruded substrate. The extruded substrate is commonly first thermally heat treated to remove the pore-forming material and then sintered to convert the formed paste into the three-dimensional structure. In certain embodiments, the carbon precursor may be incorporated with or in place of the pore-forming material and co-extruded within the substrate paste and simultaneously thermally heat treated to serve a dual function of sintering the substrate paste and concurrently forming the electrically conductive carbon network within the extruded substrate.

Phenolic resins are a large family of polymers composed of a wide variety of chemical structures. Most phenolic resins fall into two categories, resole and novolaks, and are derived from phenol and formaldehyde. During synthesis, the molar ratio of phenol to formaldehyde can vary, and the catalyst used for the reaction can vary (e.g., acidic or alkaline catalyst), thus the characteristics of the generated phenolic resins can be tailored. Phenolic resin can be cured by heating to form a thermosetting polymer. In various embodiments, the curing temperature may range from about 100° C. to about 300° C., although the disclosure is not limited thereto. Other polymers, without limitation, such as polyethylene, polypropylene, polyacrylonitrile, polyesters and polystyrene can also be employed.

Phenolic resins or the polymers heated to relatively high temperatures (for example, 500° C. to 2,500° C.) thermally decompose to form an electrically conductive carbon network. This thermal decomposition of a material at elevated temperatures, often in an inert environment, is referred to as pyrolysis. Pyrolysis involves a change in chemical composition. For phenolic resin, pyrolysis brings about carbonization. Controlling pyrolysis processing variables, such as, for example, heat treatment temperature, heating rate, soaking time, and atmosphere, can affect the resulting carbonized material, and, thus, the electrical, physical, mechanical, and chemical properties of the material. For example, high temperature heat treatment of the phenolic resin or polymer can decrease the resistivity of the carbonized material and make it more resistant to oxidation due to the formation of more ordered, graphitic carbon in the carbonized network.

In the methods described herein, pyrolysis temperatures may be varied in specific implementations of the disclosure, but pyrolysis temperatures will typically be in a range of from about 500° C. to about 2,500° C. Additionally, pyrolysis will typically take place in an inert environment, which may be provided by introduction of nonreactive gases such as nitrogen or noble gases such as argon and helium, by vacuum purge, or by a combination thereof. Pyrolysis duration can vary depending on the extent of carbonization desired. In various embodiments, pyrolysis duration may be in a range of from about 1 hour to about 24 hours, although the disclosure is not limited thereto.

Pyrolysis of the carbon precursor forms the electrically conductive carbon network on the substrate. The electrically conductive carbon network is responsive to applied electrical current flow therethrough to generate joule heat throughout the carbon network. In various embodiments, when a voltage potential is applied across the ECSM, electric current passes through the carbon network, generating heat via joule heating. The conductive network is generally electrically conductive and can create a percolation network when combined with the substrate material to achieve an overall electrical resistivity target that may for example be in a range of from 0.01 Ω-m to 300 Ω-m, or other suitable resistivity range. As used herein, the term "electrical resistivity" means resistance of the coated substrate as measured from an inlet to an outlet along a length of the flow channels, multiplied by an area of the solid coated substrate (including the open channel area), and divided by the length of the substrate from inlet to outlet channels.

In place of a carbon precursor, an electrically conductive carbon material can be directly coated onto the three-dimensional substrate and, after thermal heat treatment, form an electrically conductive carbon network. The electrically conductive carbon material can be any solid carbon material that includes amorphous carbons, such as carbon black, graphitized carbons, such as carbon nanotubes and carbon nanofibers, or electrically conductive metal carbides such as silicon carbide or iron carbide. The carbon material is generally prepared by first milling the powder to the desired particle size, then mixing it into a solution comprising an organic or inorganic solvent, forming an ink. An organic or inorganic binding agent may be added to the ink to enhance the adhesion of the carbon material to the three-dimensional substrate. The temperature, pH, concentration of carbon material, particle size and particle size distribution, and binding agent affect the adhesion strength of the carbon material. The coated three-dimensional substrate is thermally heat treated in an inert atmosphere or in air environment depending on the composition of the carbon material and its reactivity to oxygen species present in air and/or produced during the heat treatment process.

For extruded substrates, the electrically conductive carbon material can be directly incorporated into the substrate slurry and thermally heat treated to form the sintered three-dimensional geometry and electrically conductive carbon network. The carbon material may be milled to the particle size range of the substrate precursor for better adhesion. Carbon material loading can be in the range of 2 to 50% by weight of the monolith.

The ECSM can comprise a substrate for reinforcing and structural support function, the electrically conductive carbonized material for heating function, a support for increased surface area function and an active material for reaction, catalysis, or fluid processing function. The active material can be of any suitable type, and may for example comprise a sorbent and/or a catalyst. The sorbent is a material that serves to adsorb molecules from a fluid stream, physically or chemically, where localized heating is generated by the electrically conductive carbonized material so that when electrical energy input is provided, the sorbent can release the adsorbed molecules. A catalyst may be incorporated in combination with the sorbent to impart enhanced adsorption/desorption kinetics. The catalyst, in combination with the appropriate reactants, can also catalyze the conversion of the adsorbed molecules to a desired product. Electrical energy input to the electrically conductive carbon network provides the thermal energy required to reach the operating temperature of the system for the adsorbed molecule conversion and to perform the reaction if the reaction is endothermic in nature. A catalyst may be incorporated into the ECSM as the active material without a sorbent for thermal catalytic conversion reactions that require thermal energy to produce the desired product. In various embodiments, the ECSM, in thermochemical conversion systems that rely entirely on thermal energy/temperature, pressure, and reactant composition to produce the desired product, may be fabricated without any active material or support being required therein.

The support, in ECSMs comprising same, provides surface area for the adhesion of the active material on and/or in the electrically conductive carbon material of the ECSM. The support may be generally prepared as a slurry of fine particles with a controlled pH and viscosity. An organic or inorganic binding agent may be incorporated in the slurry to enhance the adhesion of the support to the structured material during coating. Proper temperature curing or drying may be required to enhance the adhesion of the support to the ECSM. The support coating may be applied to the ECSM before, after, or simultaneously with the resin or polymer layer used to produce the electrically conductive carbon material. In various embodiments, the support layer may be applied to the ECSM after the formation of the electrically conductive carbon network to serve the function of both increasing the surface area of the ECSM for the active material adhesion and as a protective layer to mitigate reactions between the electrically conductive carbon material and the reactant or product feed in the system. In particular embodiments, the support can serve as a protective layer to mitigate the oxidation of the electrically conductive carbon material with oxidizing gas species such as $O_2$, $CO_2$, $H_2O$, etc.

In various embodiments, the electrically conductive carbon network in the ECSM can serve the function of the substrate or support, or both substrate and support. The electrically conductive carbon network can serve as a reinforcing structure to avoid the need for the substrate and/or with sufficient surface area, serve as the surface for adhering the active material in sufficient dispersion and quantity to perform the operation of the desired system.

In various embodiments, the electrically conductive carbon network in combination with the substrate may be referred to as an integrated composite or as desorption material or regeneration material in the context of a ECSM for removing $CO_2$ from ambient air or concentrated sources. The desorption material may comprise multiple components, all of which may be referred to herein as regeneration material or materials, such as resistive components and conductive components.

In various embodiments for $CO_2$ adsorption from ambient and concentrated sources, in the context of ECSM for $CO_2$ adsorption, the ECSM can comprise a support and a sorbent for $CO_2$ adsorption and regeneration as the active material, the electrically conductive carbon network synthesized from a carbon precursor or an electrically conductive carbon material, and a substrate for structural reinforcement. The $CO_2$ sorbent may be responsive to inputted electrical energy to the electrically conductive carbon network to produce joule heating localized to the ECSM, to effect desorption of $CO_2$. The regeneration material components may be chosen, functionalized, tuned, or designed to be effective for the sorbent with which they are paired for the ECSM. The ECSM may be used to adsorb or remove $CO_2$ from any source or stream.

The substrate, the $CO_2$ sorbent (optionally deposited on and/or in a support), and the electrically conductive carbon network are arranged such that the substrate is in a structural supporting relationship with the sorbent and the electrically conductive carbon network. For example, in various embodiments, the sorbent may be deposited on (e.g., washcoated on) and/or in (e.g., impregnated in) the substrate, and the resin or polymer used to synthesize the electrically conductive carbonized material may be deposited on (e.g., washcoated on) and/or in (e.g., impregnated in) the substrate. The substrate may have a monolithic form or laminate form or 3D printed form or other suitable form.

In various embodiments for $CO_2$ adsorption from ambient and concentrated sources and conversion into chemicals and fuels such as, without limitation, synthetic natural gas, alcohols, aviation jet fuels and olefins, the ECSM can comprise a support, electrically conductive carbon network synthesized from a carbon precursor or an electrically conductive carbon material, a sorbent for $CO_2$ adsorption and regeneration, and a catalyst for the conversion of $CO_2$ into the desired product(s). The electrically conductive carbon network may be responsive to inputted electrical energy to produce joule heating localized to the ECSM, to effect desorption and conversion of $CO_2$ into target hydrocarbon ($HC_x$) product. The $CO_2$ sorbent serves to adsorb $CO_2$ while the catalyst serves to convert $CO_2$ into $HC_x$, normally in the presence of hydrogen. The electrically conductive carbon network serves to heat the ECSM to the required temperature to activate the conversion of $CO_2$ into the desired $HC_x$. The catalyst used is based on the desired hydrocarbon product for the system.

In embodiments for methane pyrolysis for hydrogen and carbon production, the ECSM can comprise a structural reinforcing substrate, a support, an electrically conductive carbon network synthesized from a carbon precursor or electrically conductive carbon material, and a catalyst as the active material for the conversion of methane into solid carbon and gaseous hydrogen. Electrical energy input to the electrically conductive carbon network provides the thermal energy required to activate the methane molecules and provides the energy required for the endothermic reaction of converting methane into carbon and hydrogen. The catalyst serves to lower the activation energy required for the methane pyrolysis reaction.

In embodiments for reverse water gas shift (RWGS) reaction, the ECSM can comprise a structural reinforcing substrate, a high surface area support, an electrically conductive carbon network synthesized from a carbon precursor or electrically conductive carbon material, and a catalyst as the active material for the thermal catalytic conversion of $CO_2$ into CO in the presence of hydrogen. Electrical energy input to the electrically conductive carbonized material provides the thermal energy required to activate and convert the $CO_2$ molecules into CO.

Exemplary components for support material in the ECSM include, without limitation, alumina, titania, silica, zirconia, and combinations thereof. The silica may be in the form of porous oxides such as fused silica or molecular sieves (e.g. MCM-41 zeolite). Alumina may consist of porous, high temperature stable phases such as alpha alumina or metal stabilized phase alumina. Alumina silicates such as zeolites or molecular sieves may be used. Support materials may be necessary in embodiments where the substrate material has relatively low surface area. In these embodiments, it can be helpful for the active material to be supported on material having higher surface area than that of the substrate. For example, cordierite monolith forms generally have a low surface area. Thus, it may be advantageous to provide a support component for the active material to be deposited on, for example, alumina, that has a higher surface area than the cordierite substrate. The combined active material and support can be deposited on and/or in the substrate having relatively low surface area.

In embodiments wherein the substrate is produced independently, the active material, the support, and the carbon precursor or carbon material may be deposited in and/or on the substrate sequentially, or simultaneously either independently or in combination. For example, a slurry or solution form of the support material could be applied onto the substrate followed by a slurry or solution form of the carbon precursor used for synthesis of the electrically conductive carbon network, further followed by applying a slurry or solution form of the active material. In this example, the support, the carbon precursor, and the active material, are applied independently and sequentially. In another example, a slurry of the support material and the carbon precursor used to synthesize the electrically conductive carbon network are applied onto the substrate simultaneously, then followed by the active material. In a further example, a solution of the carbon precursor used to synthesize the electrically conductive carbon network could be applied onto the substrate followed by a slurry of the support material, further followed by applying a slurry/solution of the active material.

In embodiments wherein the substrate is produced independently, the carbon precursor or carbon material and the active material may be applied in and/or on the substrate sequentially, or simultaneously either independently or in combination, without an active material. For example, a solution form of the carbon precursor could be applied onto the substrate followed by a slurry or solution form of the active material. In this example, the carbon precursor and the active material are applied independently and sequentially. In another example, a slurry or solution of the active material and a separate solution of the carbon precursor used to synthesize the electrically conductive carbon network could be applied onto the substrate at the same time. In this example, the active material and the carbon precursor are applied independently but simultaneously. In a further example, a slurry or solution comprising a combination of the active material and the carbon precursor used to synthesize the electrically conductive carbon network could be applied to the substrate. In this example, the active material and the carbon precursor are applied in combination and simultaneously.

In alternative embodiments, the substrate and the carbon precursor or carbon material may for example be combined as a paste and extruded together in a combined article and subjected to drying and pyrolysis to produce the electrically conductive carbon network within the substrate form. In this embodiment, the resin or polymer may be dispersed throughout the substrate when the combined article is extruded to achieve the desired physical, structural, and electrical properties after pyrolysis. The active material may then be applied, optionally, as a washcoat on to the combined article. The active material may then be applied, either on to (e.g., washcoated) the support and/or in (e.g., impregnated in) the support to create the ECSM.

The active material, for example catalyst, reactant, chemical reaction promoter, etc., may in various embodiments be provided as a discrete film or coating layer on a support layer, such as may be formed of alumina, titania, cordierite or any other suitable support material, which in turn may be on a layer of the electrically conductive carbon network material that in turn is on a monolith substrate or other base or substrate material or article, as a structured material assembly. In other embodiments, the layer of electrically conductive carbon network material may be doped with the active material in a suitable amount and distribution for the intended application, in the structured material assembly. It will be recognized that a wide variety of arrangements may be employed to provide three-dimensional structures in which the electrically conductive carbon network is provided together with an active material so that the electrically conductive carbon network is electrically energized to transmit heat to the active material. In various embodiments, the electrically conductive carbon network in the ECSM may have an electrical resistivity in a range of from 0.03 $\Omega$-m to 300 $\Omega$-m, or in other suitable electrical resistivity range. The ECSM may further comprise electrodes in contact on two ends of the ECSM to pass electrical energy through it to responsively generate the localized heating via joule heating of the electrically conductive carbonized material.

An ECSM in specific embodiments may comprise: a substrate material, a support material, an active material, and an electrically conductive carbon network synthesized from a carbon precursor or carbon material that is responsive to input energy to generate local heat on the ECSM. The substrate material may be referred to herein as "substrate." Thus, the terms "substrate material" and "substrate" may be used interchangeably. In various embodiments, the substrate material, the support, the active material, and the electrically conductive carbon network are arranged such that the substrate material is in a supporting relationship with the support, the active material and the electrically conductive carbon network. For example, the active material may be deposited on and/or in the substrate, and the carbon precursor or carbon material to form the electrically conductive carbon network may be deposited on and/or in the substrate.

In various embodiments, the ECSM may comprise a substrate of a mixture of the active material and the electrically conductive carbon network. The ECSM may for example be formed as an extrudate of the mixture of the substrate, carbon precursor or carbon material with the active material. The carbon precursor and carbon material in such ECSM produces an electrically conductive carbon network within the substrate/active material mixture after thermal heat treatment that is responsive to applied electrical energy to generate localized heating of the ECSM.

In a further implementation, the ECSM may comprise a 3D-printed substrate structure with multiple parallel and/or three-dimensional channels (to enable a low pressure drop for the inlet reactant feed while providing high surface area exposure to the reactant), which can contain an active material and the carbon precursor or carbon material to synthesize the electrically conductive carbon network thereon. The substrate structure may be formed of a material which can be 3D printed and can provide surface area for the carbon precursor or carbon material coating and for the active material. For example, the substrate can be a polymer, plastic, metal, ceramic material, and/or composite material. In such assembly, the electrically conductive carbon network is responsive to applied electrical energy to generate the localized heat to perform the reaction and/or process heating.

In various embodiments, the 3D-printed substrate is printed from a polymer or resin base that when pyrolyzed and/or subjected to heat treatment, produces an electrically conductive carbon network that can also serve the functions of the substrate or support, or both substrate and support.

In various embodiments, the electrically conductive carbon network in the ECSM can be heated by applying a voltage potential across any two or more sides of the ECSM. The voltage potential can for example be applied using an electrode connection to the surface of the ECSM. The electrodes may be formed of any suitable material, as for example material having a resistivity that is less than 0.1 $\Omega$-cm, with an overall resistance much lower than the ECSM to which the electrodes are connected. The voltage potential provided by the electrodes in contact with the ECSM results in electric current passing through the electrically conductive carbon network, creating localized heat via joule heating. In various embodiments, induced current can be generated across the electrically conductive carbon network by changing the direction of a magnetic field around the ECSM and, with sufficiently high frequency in switching of the magnetic field, the induced current will result in heat generation, also known as induction heating.

In various embodiments, a conductive coating with a resistivity of less than 0.1 $\Omega$-cm may be applied to the sides of the ECSM used for the electrode connection. Such conductive coating serves to support the even distribution of electrical energy input across the side of the ECSM. Generally, the resistivity of the coating material should be less than or equal to the resistivity of the electrode used for the ECSM connection. Common coating materials may contain nickel, iron, copper, titanium, silver, gold, and other highly conductive metals.

The ECSM may further comprise an electrical power supply coupled in circuit relationship with the electrodes or induction coils, and be configured to apply suitable voltage to the electrodes, as for example in a range of 5V to 10 kV, and more preferably in a range of from 100 to 500 V, although the disclosure is not limited thereto. The electrical power supply may more specifically be configured to generate a desired amount of current in the circuit of a single ECSM, which may for example be in a range of from 0.1 to 20 amperes, and more preferably in a range of from 0.5 to 10 amperes, although the disclosure is not limited thereto. The electricity supplied by the electrical power supply can be either alternating current (AC) or direct current (DC).

The ECSM can be used in systems for the adsorption and conversion of $CO_2$ to other chemical products, where the ECSMs for this application are commonly referred to as dual function materials (DFMs). The DFM ECSM may comprise a $CO_2$ sorbent and a $CO_2$ conversion catalyst as the active material, in combination with the substrate, support and electrically conductive carbonized material. The $CO_2$ sorbent can comprise any $CO_2$ sorbent material including inorganic compounds containing alkali and alkali earth metals such as sodium (bi) carbonate, potassium (bi) carbonate, magnesium oxide, etc., or amine-based polymers/resins such as polyethylenimine (PEI). The conversion agent can comprise any $CO_2$ conversion catalyst, e.g., catalyst including noble metals such as ruthenium, rhodium, palladium, silver, osmium, iridium, platinum, and gold, or transition metals including iron, cobalt, nickel, copper, and zinc. The support can include any high surface area support materials or binders, e.g., alumina, that serve to facilitate dispersion of the adsorption and conversion agents. Pyrolyzed resin or polymer on a substrate serves as the electrically conductive carbon network in the DFM. The sorbent and conversion catalyst can be adhered to the DFM via washcoating, wet impregnation, or other appropriate methods. Operations with the DFM may comprise a two-step process where $CO_2$ is adsorbed in the first step and converted into a valuable chemical product in the second step. Such valuable chemical products can include methane, methanol, ethylene, ethanol, alcohols, dimethyl ether (DME), oxymethyl ether (OME), ethylene oxide, and other ethers. The first step, or adsorption step, is conducted so that $CO_2$ in a $CO_2$ containing gas stream, such as air, flue gas, or other $CO_2$ containing point source, is contacted with the DFM so that $CO_2$ is chemisorbed and/or physiosorbed on the $CO_2$ sorbent of the DFM. After the $CO_2$ has been adsorbed onto the surface and the desired operating capacity has been reached, the $CO_2$ is converted to the product in the conversion step. The conversion step is conducted so that a reactant gas is contacted with the DFM and heat is applied via joule heating of the electrically conductive carbon network in the DFM. The reactant gas may comprise reducing or otherwise reactive compounds such as hydrogen, carbon monoxide, methanol, alcohols, formic acid, carboxylic acids, phenols, and hydrogen donating solvents such as tetralin. The reactant gas source may be pure or concentrated (>50%) component gases such as green hydrogen produced by water electrolysis using a renewable energy source such as wind and solar or may be product or waste gas mixtures including hydrogen containing fuel gas or other waste hydrogen sources such as off gas from an ethylene cracker or hydroprocessing/hydrotreating unit in a refinery/biorefinery, syngas from a coal/biomass/MSW/waste plastic gasifier.

In various embodiments, in the conversion step, the DFM can be heated to suitable temperature, e.g., up to 800° C., and more preferably up to 400° C., or up to other suitable temperature or in other suitable temperature range. Electrode connections to the DFM for joule heating or coils induction heating can be used to provide electrical energy input to the DFM. In various embodiments, carbon precursor, pyrolysis, and the heat treatment sequence and procedure are tuned to produce an electrically conductive carbon material with the desired electrical resistivity and a carbon material resistant to reaction with the reactant and product species present in the DFM operation during the $CO_2$ conversion step.

In various embodiments, the ECSM can be used to convert $CO_2$ into CO via the reverse water gas shift (RWGS) reaction. The RWGS reaction is the reversible hydrogenation of $CO_2$ to produce CO and $H_2O$. It is an endothermic equilibrium-limited process that is thermodynamically favored at high reaction temperatures. RWGS is an important foundation for the conversion and utilization of $CO_2$ as the CO product is a building block for numerous chemical products. In this system, a RWGS catalyst material is coated onto the ECSM with a structured substrate, an electrically conductive carbon network, and a support. In the system, the $H_2$-to-$CO_2$ feed molar ratio across the ECSM is managed to maximize CO production. Electrical energy is supplied to the ECSM to provide the heat/thermal energy required for the endothermic RWGS reaction.

Major challenges with RWGS reaction include: (1) suppressing $CH_4$ formation via $CO_2$ methanation; (2) maximizing and stabilizing the $CO_2$-to-CO yield, (3) avoiding or reducing catalyst sintering and deactivation at high temperatures, (4) providing efficient heat/thermal energy to the catalyst at high temperatures, (5) avoiding formation of coke during the initiation of the RWGS reaction. Localized, direct heating of the ECSM for RWGS systems via joule heating can ensure (a) high solid-gas temperature difference, suppressing side reactions and coke formation, (b) integration of renewable electricity, obviating the need for exotic metallurgy (like Inconel or Hastelloy materials) for reactor vessel, (c) high CO yields due to the favored thermodynamics at high temperatures, and (d) high heating efficiency due to rapid on-off capability.

In various embodiments, the RWGS ECSM can be heated up to 1200° C., and more preferably up to 900° C., or in other suitable temperature range. Electrode connections to the ECSM for joule heating or induction heating can be used to provide electrical energy input to the ECSM. In various embodiments, the resin or polymer coating composition, pyrolysis, and heat treatment sequence and procedure are tuned to produce an electrically conducted carbon network with the desired electrical resistivity and a carbon network resistant to reaction with the reactant and product species present in the RWGS operation.

Another application of the ECSM is catalytic methane pyrolysis. In this system, the methane pyrolysis catalyst is coated onto the ECSM. Methane is fed across the ECSM and is decomposed to solid carbon and $H_2$. This is an endothermic reaction favored at high temperatures (>650° C.). For non-catalytic methane pyrolysis, low conversions are observed below 1200° C. due to kinetic limitations and high activation energy is required to break the stable C—H bonds in the methane molecule. In the presence of a catalyst, this requirement can be significantly reduced, from 356-452 kJ/mol to below 200 kJ/mol. A major challenge in catalytic methane pyrolysis is providing a material, reactor design, and process operating conditions that avoid catalyst deactivation, to sustain $H_2$ productivity with efficient solid carbon product removal. The use of catalyst-coated ECSM allows for highly efficient, uniform, and targeted heating of the catalyst, resulting in lower cost of the pyrolysis reactor, greater heat transfer efficiency for fast startup/shutdown and $H_2$ production ramping and turndown, and ready system integration with renewable electricity. Such use of catalyst-coated ECSM also results in the avoidance of catalyst-carbon separation, which is a major challenge in packed/fluidized bed reactors. Carbon formed in the monolith channels can be dislodged using a mildly oxidizing environment like $H_2O$ or $CO_2$, which can then be removed under a high velocity gas flow.

In various embodiments, the catalytic methane pyrolysis ECSM can be heated up to 1200° C., and more preferably up to 900° C., although the disclosure is not limited thereto. Electrode connections to the ECSM for joule heating or induction heating can be used to provide electrical energy input to the ECSM. In various embodiments, the resin or polymer coating composition, pyrolysis, and heat treatment sequence and procedure are tuned to produce an electrically conductive carbon network with the desired electrical resistivity and a carbon network resistant to reaction with the reactant and product species present in the methane pyrolysis operation. In various embodiments, the ECSM can be used without a catalyst or support for hydrogen production from thermochemical methane pyrolysis by providing rapid heating of the substrate and maintaining a high gas-solid temperature difference, driving the reaction towards preferential solid carbon formation.

In various embodiments, the ECSM can be utilized for thermochemical reactions that require heat for the conversion of the reactants to the target products. These systems include, but are not limited to, (1) steam ethane cracking (or ethane dehydrogenation in presence of steam) for ethylene production, (2) propane cracking for propylene production, (3) steam methane reforming for production of syngas ($H_2$+CO) and/or $H_2$ and/or CO, and (4) dry methane reforming for production of syngas ($H_2$+CO) and/or $H_2$ and/or CO.

In various embodiments, the ECSM can be used for catalytic $CO_2$ hydrogenation to (1) olefins such as ethylene, propylene, iso-butylene, etc., (2) long-chain straight chain paraffins, iso-paraffins and cycloparaffins containing n number of C atoms with n ranging from 1 to 10, (3) aromatics containing n number of C atoms with n ranging from 6 to 15, and (4) lower alcohols such as methanol, ethanol, propanol and butanol, by heating up to 700° C., and more preferably up to 300° C., or in other suitable temperature range.

In one aspect, the disclosure relates to a joule heating structure, comprising a three-dimensional structure having an electrically conductive carbon network therein and/or thereon, wherein the electrically conductive carbon network has a G/D Raman spectral intensity ratio in a range of from 0.5 to 3, and a resistivity in a range of from 0.01 Ω-m to 300 Ω-m.

In such joule heating structure, the electrically conductive carbon network may comprise carbon in a form selected from the group consisting of carbon black, graphitic carbon, graphene, carbon nanotubes, pyrolyzed carbon, carbon in the form of carbide compounds of metalloids or metals, and combinations thereof. The Joule heating structure may additionally comprise one or more electrical circuitry element(s) for connecting the electrically conductive carbon network with an electrical power source to flow electrical current through the electrically conductive carbon network to produce joule heating. Such electrical circuitry element(s) may for example comprise at least one selected from the group consisting of electrodes, electrical wires, electrical connectors, and electrical couplings.

The joule heating structure may comprise a sorbent positioned to be heated by joule heating generated by the electrically conductive carbon network when electrical current is flowed through the electrically conductive carbon network. Such sorbent may be selected from the group consisting of oxides, carbonates, and bicarbonates of Group 1 and Group 2 elements. In specific implementations, the sorbent may be selected from the group consisting of oxides, carbonates, and bicarbonates of sodium, calcium, potassium, barium, cesium, lithium, magnesium, and combinations thereof.

In various embodiments, the joule heating structure may comprise a catalyst positioned to be heated by joule heating generated by the electrically conductive carbon network when electrical current is flowed through the electrically conductive carbon network. Such catalysts may comprise at least one selected from the group consisting of Ni, Fe, Co, Ru, Rh, Pd, Pt, Cu, Mo, W, Au, Ag, Cr, Re, Os, Ir, V, Zn, Mn, Ga, Ce, La, etc., supported on $Al_2O_3$, $SiO_2$, MgO, CaO, $ZrO_2$, $CeO_2$, $TiO_2$, $La_2O_3$, $Cr_2O_3$, $Y_2O_3$, activated carbon, spinels, perovskites, hydrotalcites, zeolites, cordierite, SiC, graphene oxide, metal-organic framework (MOFs), boron nitride, $AlPO_4$, BaO, and SrO. The catalyst may further comprise a promoter selected from the group consisting of K, Ca, Mg, La, Ce, Ba, Sr, Li, Zn, Cs, Th, W, P, Mn, S, Cl, F, and combinations thereof.

In various embodiments, the joule heating structure may comprise a sorbent and a catalyst co-located with one another in the joule heating structure, and arranged so that the receive joule heat from the electrically conductive carbon network when the electrically conductive carbon network has electrical current flowed therethrough. The sorbent may be sorptively selective for carbon dioxide, and the catalyst may be catalytically effective for chemical reaction of carbon dioxide. In embodiments, the catalyst may be catalytically effective for conversion of carbon dioxide to a hydrocarbon product, catalytically effective for reverse water gas shift reaction, catalytically effective for methane pyrolysis, catalytically effective for hydrocarbon cracking, or catalytically effective for methane reforming.

The three-dimensional structure in the joule heating structure may be of any suitable type, and may for example comprise a support, carrier, substrate, or continuous phase material. In various embodiments, the three-dimensional structure may comprise a porous monolith, e.g., a monolith wherein porosity of the porous monolith has a pore size distribution with a pore size $d_{50}$ in a range of from 1 μm to 100 μm. The porous monolith may have a cell density in a range of from 200 to 1000 cells per square inch, and wall thickness in a range of from 2 to 12 mils.

The three-dimensional structure in the joule heating structure may comprise a laminate or sheet-form structure, or a foam material, or a non-woven sheet, e.g., a non-woven sheet that comprises carbon, polymeric, or cellulosic fibers.

Another aspect of the disclosure relates to a joule heating structured material assembly, comprising a porous monolith channelized with a multiplicity of substantially aligned channels extending therethrough to open ends at opposite faces of the porous monolith, wherein each channel is bounded by channel walls defining interior wall surfaces of the channel, wherein the channel walls have an electrically conductive carbon network therein and/or thereon, and wherein the electrically conductive carbon network has a G/D Raman spectral intensity ratio in a range of from 0.5 to 3, and a resistivity in a range of from 0.01 Ω-m to 300 Ω-m.

A further aspect of the disclosure relates to an apparatus for conducting a heat-mediated transformation of a material, comprising a vessel having an inlet to receive the material in an interior volume of the vessel, and an outlet for discharging a product of the heat-mediated transformation of the material, and a joule heating structure disposed in the interior volume of the vessel, the joule heating structure comprising a three-dimensional structure having an electrically conductive carbon network therein and/or thereon, wherein the electrically conductive carbon network has a G/D Raman spectral intensity ratio in a range of from 0.5 to 3, and a resistivity in a range of from 0.01 Ω-m to 300 Ω-m, and is arranged to provide joule heat for the heat-mediated transformation of the material upon flow of electrical current through the electrically conductive carbon network.

Another aspect of the disclosure relates to a process for carrying out a heat-mediated transformation of a material, comprising: flowing electrical current through an electrically conductive carbon network to cause the electrically conductive carbon network to responsively generate joule heating; and transmitting joule heat from the joule heating to effect the heat-mediated transformation of the material, wherein the electrically conductive carbon network has a G/D Raman spectral intensity ratio in a range of from 0.5 to 3, and a resistivity in a range of from 0.01 Ω-m to 300 Ω-m.

The present disclosure contemplates various structures and assemblies incorporating the electrically conductive carbon network to provide joule heating. In various embodiments, the disclosure contemplates a joule heating structured material assembly, comprising: a three-dimensional substrate; and an electrically conductive carbon network formed in and/or on the three-dimensional substrate, wherein the electrically conductive carbon network has the following characteristics: a G/D Raman spectral intensity ratio in a range of from 0.8 to 10; an electrical resistivity in a range of from 0.2 Ω-m to 300 Ω-m; and an elemental carbon content in the electrically conductive carbon network that is in a range of 0.5 to 30% by weight, based on weight of the three-dimensional substrate.

The three-dimensional substrate in such assembly may have a surface area in a range of from 50 to 1000 $m^2$ per gram of the substrate. The joule heating structured material assembly may comprise a catalyst and/or sorbent.

The electrically conductive carbon network may be advantageously formed by heat treatment of a carbon precursor impregnated in porosity of a porous three-dimensional substrate, at temperatures that may be in a range of from 600 to 1600° C. The carbon precursor may comprise a solution of phenolic resin or polymer, and a metal or metal compound. The carbon precursor composition desirably comprises a promoter that is effective to catalyze graphitization of the electrically conductive carbon network during the thermal heat treatment. The promoter may comprise nickel, iron, manganese, copper, and the like, wherein such metal is present in the precursor composition at concentration of 0.1 weight % to 15 weight %, based on weight of carbon in the carbon precursor.

The electrically conductive carbon network may comprise carbon in a form selected from the group consisting of carbon black, graphitic carbon, graphene, carbon nanotubes, carbon nanofibers, pyrolyzed carbon, carbon in the form of carbide compounds of metalloids or metals, and combinations thereof.

The three-dimensional substrate may comprise a laminate or sheet-form or filter-form structure having a surface resistivity range of 1-1000 Ω/sq as measured according to ASTM D-257. Electrical resistivity for the three-dimensional substrate may be determined as the electrical resistance multiplied by face area of the three-dimensional substrate, and divided by the length of the three-dimensional substrate.

In various embodiments, the three-dimensional substrate comprises a porous monolith, having a porosity void volume of 20% to 75% of the volume of the porous monolith. The porous monolith may have a cell density in a range of from 200 to 1000 cells per square inch, and a wall thickness in a range of from 2 to 12 mils. In various embodiments, the electrically conductive carbon network may have a G/D Raman spectral intensity ratio in a range of from 0.5 to 3, or in a range of from 0.8 to 10, or in a range of from 1.0-6.0. In various embodiments, the electrically conductive carbon network may have a resistivity in a range of from 0.2 Ω-m to 300 Ω-m or a range of from 0.8 Ω-m to 300 Ω-m, or in a range of from 1.5 Ω-m-80 Ω-m.

The aspects, features, and advantages of the present disclosure will be further appreciated with reference to non-limiting Examples in the ensuing description, as illustrative of specific embodiments and implementations of the disclosure.

Example 1—Effect of Pyrolysis Temperature on Resistance

A high cell density cordierite monolith with 600 cells per square inch (CPSI) and 3 mils wall thickness was used as the substrate for the testing. Small cylindrical cores (approximately 1.5 in. length and 0.75 in. diameter) were extracted from the full-sized monolith. Cores were pre-dried at 120° C. in air for at least 12 hours. Each core was then washcoated with an aqueous phenolic resin solution. Excess resin solution was removed from the channels with forced air. The washcoated cores were cured overnight at 120° C. in air to thermoset. As will be appreciated by persons ordinarily skilled in the art, the cured phenolic resins undergo a polycondensation reaction involving release of volatiles resulting in hardened polymer coated cores. The cured cores were then pyrolyzed in a tube furnace at the desired target temperature for 4 hours with a continuous flow of nitrogen as the inert gas to prevent oxygen ingress to the furnace. Core samples were pyrolyzed at varying temperatures (600° C., 625° C., 650° C., and 700° C.) to evaluate the effect on the resulting electrical resistance of the pyrolyzed materials. Details of the four samples pyrolyzed at different temperatures are shown below in Table 1.

TABLE 1

Details of monoliths treated with different pyrolysis temperatures

| Initial mass (g) | Mass after curing (g) | Pyrolysis temperature (° C.) | Post-pyrolysis mass (g) | Carbon loading after pyrolysis (wt %) |
|---|---|---|---|---|
| 1.92 | 3.69 | 700 | 2.89 | 33.5 |
| 1.98 | 3.70 | 650 | 2.93 | 32.7 |
| 2.01 | 3.96 | 625 | 3.12 | 35.4 |
| 2.07 | 4.02 | 600 | 3.19 | 35.0 |

Figure 4:
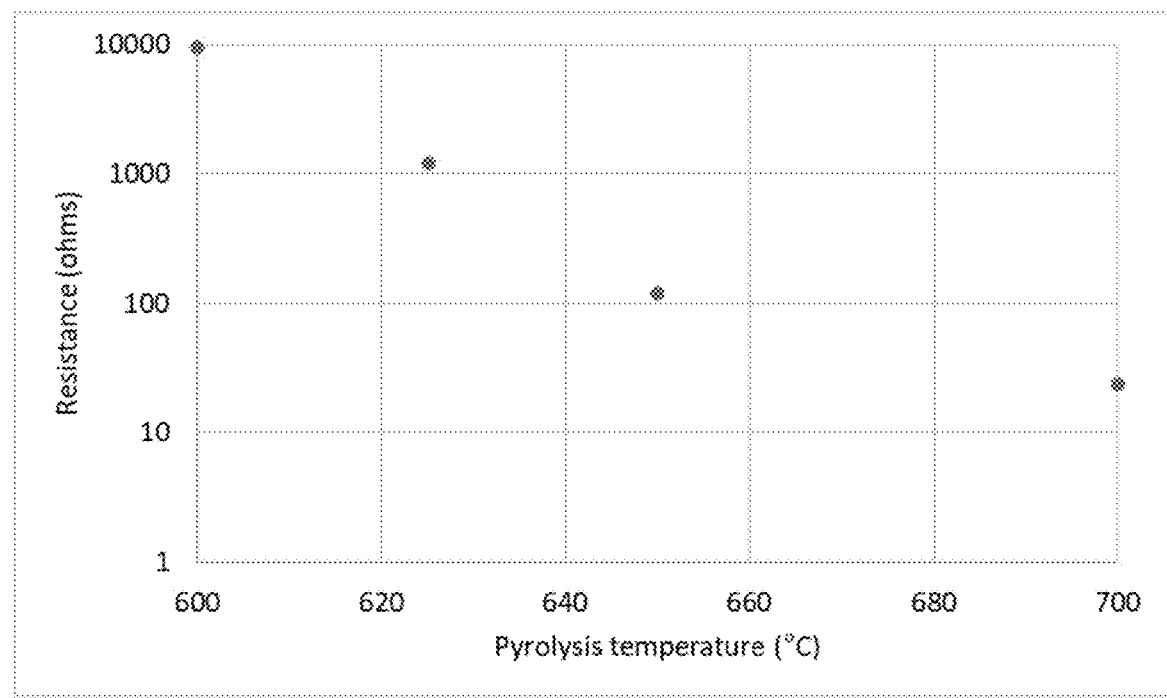
FIG. 4 is a graph of electrical resistance of electrically conductive pyrolyzed core material as a function of pyrolysis temperature.

After pyrolysis, the resistance of the pyrolyzed cores was measured by using a multimeter with point probes. Two small pieces of copper were positioned between the point probes and opposing core faces. Stainless steel mesh was pressed against the faces of the cores to assist in distributing the electricity. The results of the resistance measurements are shown in FIG. 4, which is a graph showing resistance versus pyrolysis temperature. The resistance decreases with increasing pyrolysis temperature, decreasing from 10,000 ohms when pyrolyzed at 600° C. to 40 ohms when pyrolyzed at 700° C. As is shown in FIG. 4, resistance of the sample materials was dependent on pyrolysis temperature. This result demonstrates that pyrolysis temperature is a tunable variable to obtain desired electrical resistances/resistivities.

Figure 5:
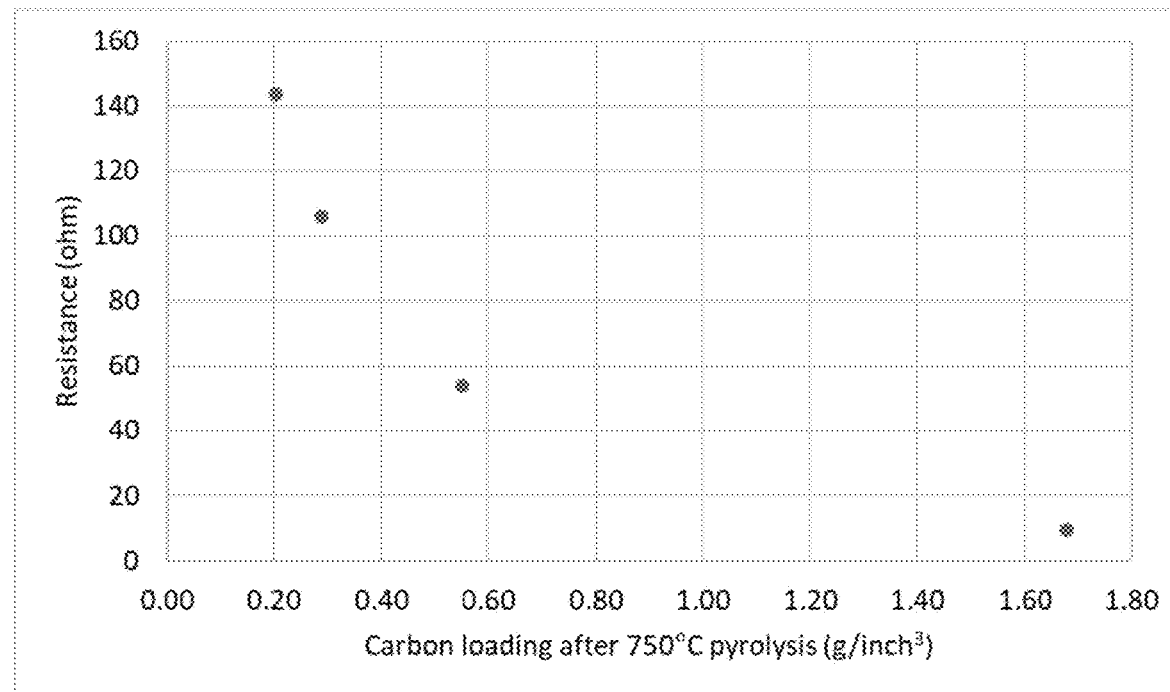
FIG. 5 is a graph of electrical resistance as a function of carbon loading of electrically conductive pyrolyzed core materials in which the respective materials were prepared by wash coating of phenolic resins at varying ratios of resin solution to deionized water, followed by pyrolysis of the materials, and measurement of the final mass of carbon loading on the substrate core material.

A separate set of equivalent substrate cores (cordierite, 1.5-inch length, 0.75-inch diameter, 600 CPSI, and 0.003 inch wall thickness) were washcoated with phenolic resins at varied resin dilution ratios. The original phenolic resin solution was diluted with deionized water to varying concentrations having the following ratios of resin solution to deionized water:resin solution (no dilution), 2:1, 1:1, 1:2, and 1:3. The washcoated cores were then pyrolyzed at 750° C. and the final mass of carbon loading on the substrate cores was recorded. FIG. 5 is a graph showing resistance as a function of carbon loading for this example.

TABLE 2

Details of sample cores coated with different loadings of phenolic resin

| Initial mass (g) | Mass ratio resin solution to deionized water | Mass after curing (g) | Pyrolysis temperature (° C.) | Post-pyrolysis mass (g) | Carbon loading after pyrolysis (wt %) |
|---|---|---|---|---|---|
| 2.02 | Resin solution (no dilution) | 4.02 | 750 | 3.15 | 35.8 |
| 1.85 | 2:1 | 2.32 | 750 | 2.20 | 16.0 |
| 1.98 | 1:1 | 2.39 | 750 | 2.20 | 10.3 |
| 1.85 | 1:2 | 2.22 | 750 | 2.04 | 9.35 |
| 2.03 | 1:3 | 2.29 | 750 | 2.17 | 6.23 |

Example 2—Evaluation of Heating Profile and Resistivity for a Larger Monolith Structure A large (6.34 in.×6.34 in.×5.88 in.) high porosity cordierite monolith with 400 cells per square inch and 0.007-inch wall thickness was used as the substrate for the testing. The monolith was cut, perpendicular to the channel direction. The cut monolith face was sanded to create a smooth surface for coating, after which the length along the channels was 2.8 inches. The monolith was dried overnight at 120° C. in air. The dried monolith had a mass of 422.73 g. The monolith was dip coated with a phenolic resin solution consisting of 25 wt % phenolic resin and 75 wt % deionized water. Excess resin solution was removed from the coated monolith with high velocity air. The resin-coated monolith was cured in air at 120° C. overnight. The post-curing mass was 478 g, giving a resin loading of 0.49 g/in$^3$. Three cylindrical cores (diameter=0.75 in) and one corner section (0.66 in square) were removed from the cured monolith for characterization.

Pyrolysis was performed on the parent monolith (large piece without the cores) under vacuum conditions (1E-2 Torr, or about 1.3 Pascal) in a vacuum furnace. More specifically, the parent monolith sample was heated to 850° C. at a rate of 2° C./min and held for four hours at that temperature before slowly (<2° C./min) cooling back to ambient temperature.

Figure 6:
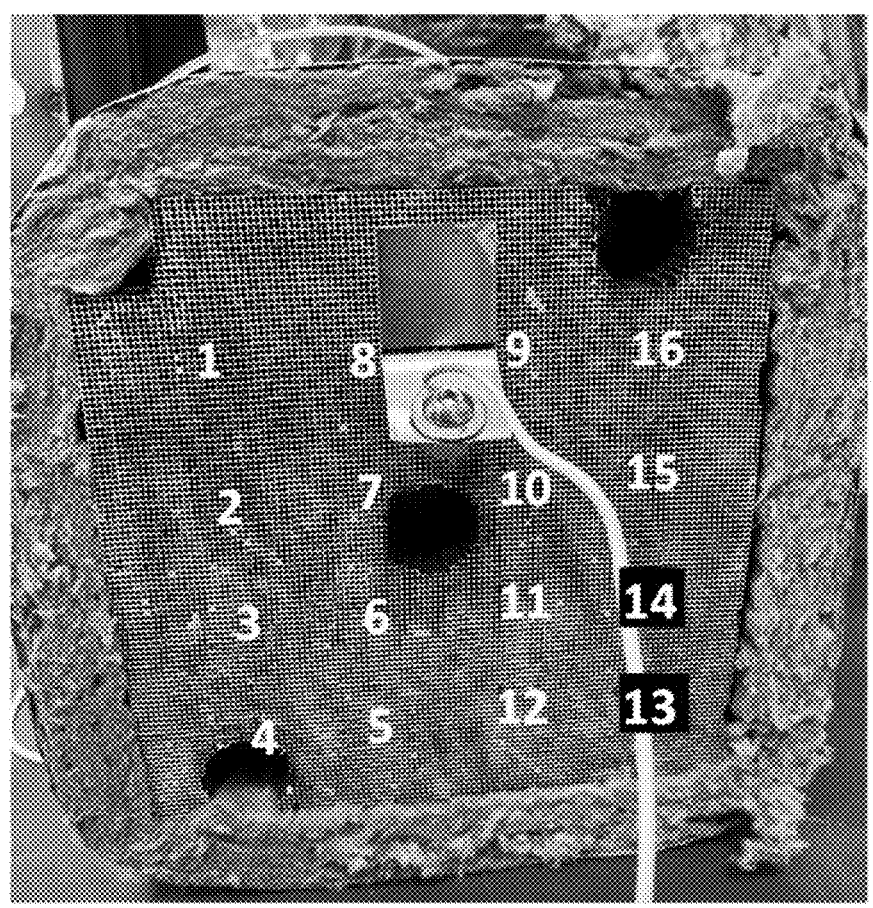
FIG. 6 is a photograph of a test arrangement of a pyrolyzed monolith for heat testing.

The pyrolyzed monolith was prepared for joule heating testing. The faces of the pyrolyzed monolith were painted with a highly conductive silver paint (0.02-0.05 Ω/sq/mil). A copper tab having dimensions of 2 in.×1 in. was cut into 1 in. square sections. One of the 1 in. square sections of the copper tab was adhered to one of the faces of the monolith with a high temperature adhesive and clamped in place to set overnight under ambient conditions. The other 1 in. square section of the copper tab was used to connect the wire from a power supply unit. Mineral wool thermal insulation was wrapped around the four sides of the monolith. The test arrangement is shown in FIG. 6, which is a photograph of the pyrolyzed monolith prepared for heat testing. Resistance between the two copper terminals was measured to be 4.5Ω. The insulated monolith was loaded into a bench reactor, which remained unsealed.

An Optical Distributed Sensor Interrogator (ODiSI) measurement system was used to probe the temperature distribution along numbered channels (5.2 mm spatial resolution) as a function of time. The ODiSI instrument used Rayleigh backscattering to acquire both strain and temperature data. In FIG. 6, the numbers (1-16) indicate positions/channels in the monolith where fiber optic sensors were threaded for heat testing. The spacing between the measured channels was 30 mm. The numbers correspond to peaks shown in the graph of FIG. 7.

A 1.5 kW power supply was used for heating. A constant power of ~64 W was applied during heating until the temperature of the channel with the lowest temperature reached a peak temperature of at least 80° C. Shortly thereafter the power was turned off. Throughout the measurement, fiber optic data (temperature profile along fiber optic) and power supply data (voltage, current and power) were recorded as a function of time.

Figure 7:
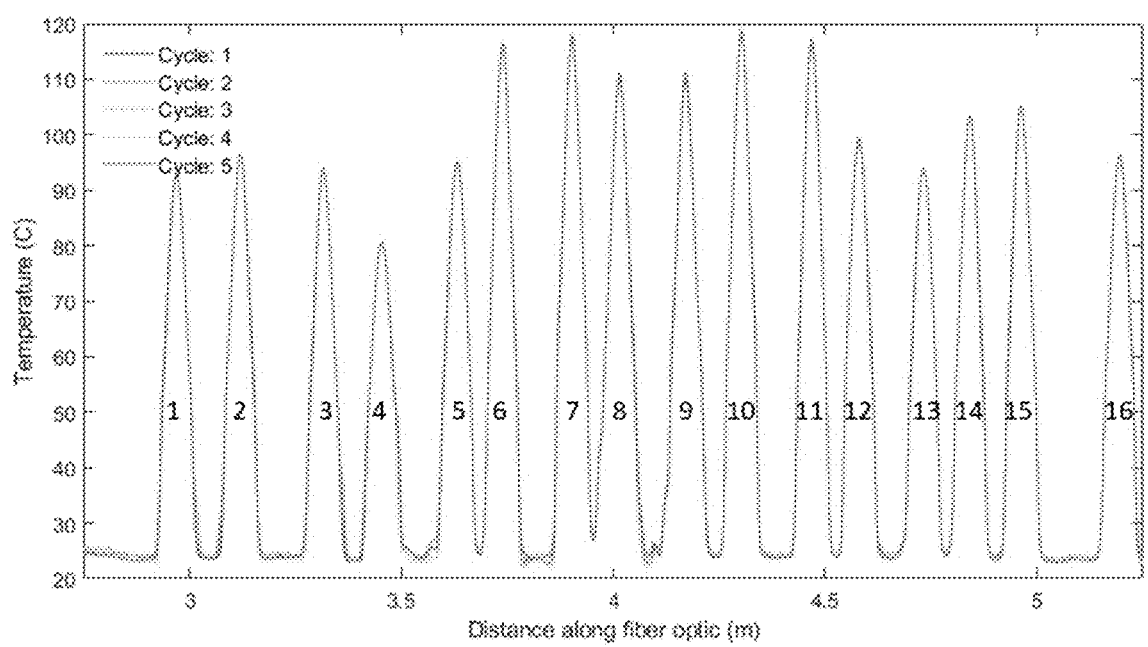
FIG. 7 shows measured temperature profiles of the pyrolyzed monolith in the pyrolyzed monolith test arrangement of FIG. 6 over 5 heating cycles, in which each cycle's temperature profile was recorded 5 seconds after the temperature of the lowest temperature channel reached 80° C.

The temperature profile along the fiber optic sensors was measured and is shown for 5 heating cycles in FIG. 7, which shows temperature versus distance along the fiber optic sensor. The temperature snapshot of the fiber optic sensors shown in FIG. 7 was taken 5 seconds after the temperature of the lowest temperature channel reached 80° C. The temperature profiles for all channels for all of cycles 1-5 largely overlaid one another demonstrating great reproducibility of heating and the absence of drastic initial degradation. Moreover, the temperatures of all 16 channels were within the 80-120° C. temperature range.

Additionally, post testing analysis revealed that the silver paint coverage near to channel 4 was low, which led to less heating for channel 4. If channel 4 were not included in the analysis, then all remaining channels had peak temperatures within a <25° C. range.

The time to heat from ambient to above 80° C. for the lowest temperature channel (channel 4) is shown in Table 3 below for the different cycles. All cycles had similar heating times except for cycle 1. The first cycle heated slightly faster due to a high initial starting temperature, which reflected changing ambient conditions.

TABLE 3

| Cycle | Starting T Channel 4 (° C.) | Time to heat to 80° C. (s) |
| --- | --- | --- |
| 1 | 21.8 | 434 |
| 2 | 19.5 | 451 |
| 3 | 18.5 | 451 |
| 4 | 18.0 | 456 |
| 5 | 18.5 | 454 |

Figure 8:
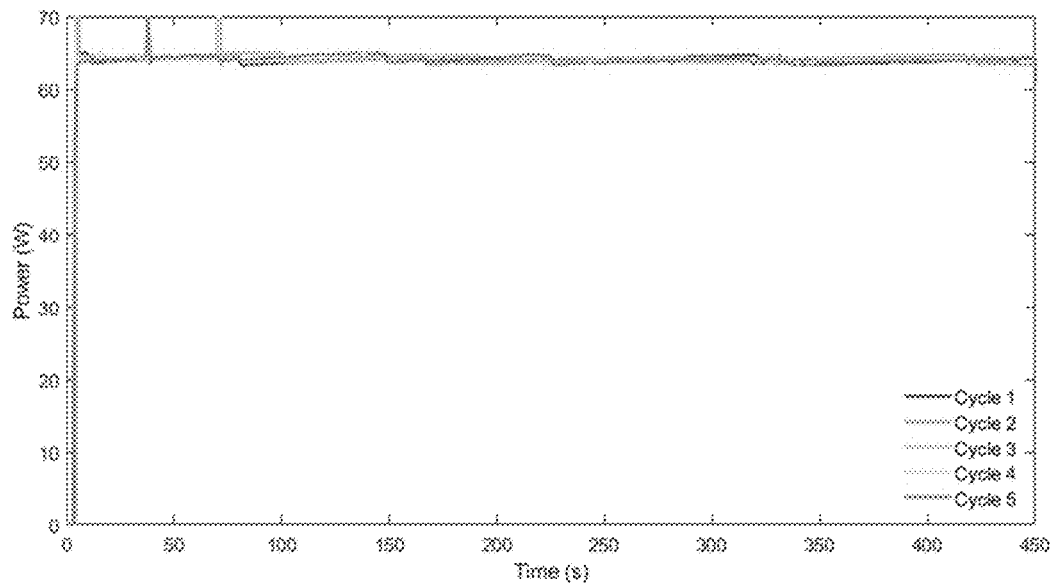
FIG. 8 is a graph showing the power input to the pyrolyzed monolith in the pyrolyzed monolith test arrangement of FIG. 6 over 5 heating cycles, as a function of time.
Figure 9:
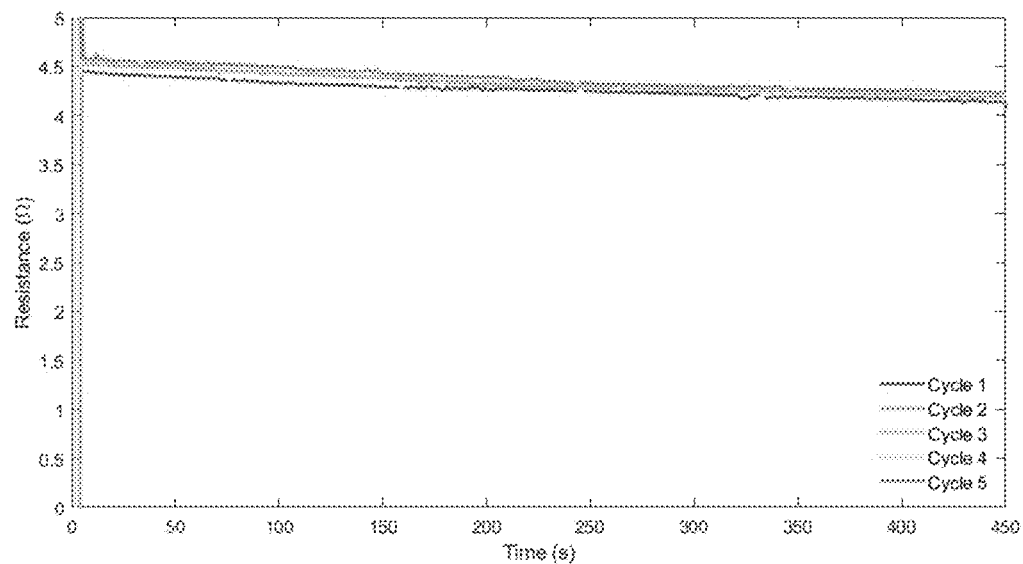
FIG. 9 is a graph showing resistance of the pyrolyzed monolith in the pyrolyzed monolith test arrangement of FIG. 6 over 5 heating cycles, as a function of time.

FIG. 8 is a graph showing the power input to the monolith over five heating cycles. FIG. 8 shows that a constant power of 64 W was supplied throughout the duration of heating for all five cycles. FIG. 9 is a graph showing monolith resistance over time for the five heating cycles. FIG. 9 shows that resistances decreased over time for all cycles, which demonstrates a negative temperature coefficient (NTC) behavior, which is typical of semiconductors. NTC behavior occurs when a physical property (such as thermal conductivity or electrical resistivity) of a material lowers with increasing temperature.

Example 3—Long Term Heat Cycling Tests

Figure 10:
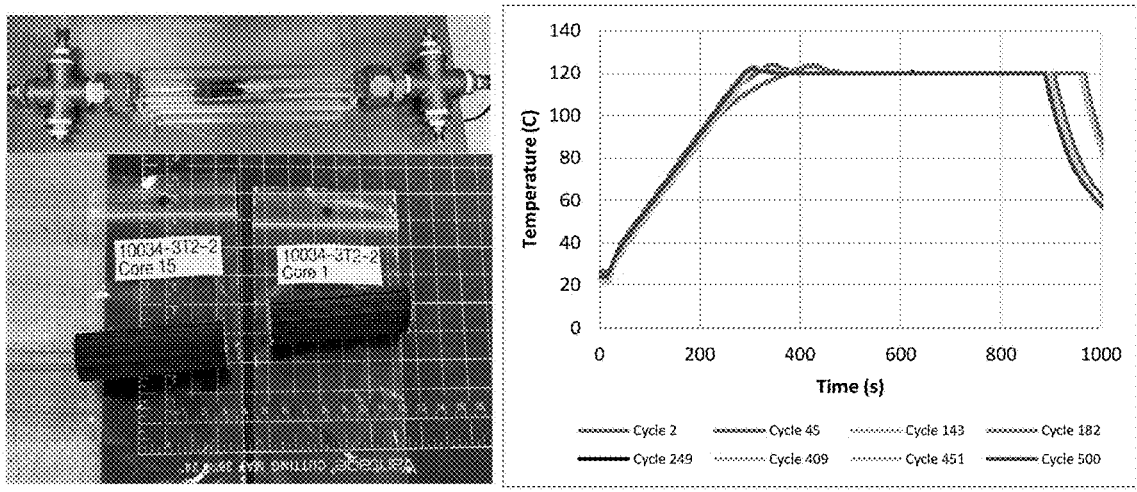
FIG. 10 in the left portion thereof is a photograph of two core samples and the associated heating test apparatus, and in the right portion thereof shows temperature profiles across 500 cycles maintained with rapid heating.

Core samples, ¾ inches in diameter, 1.5 inches in length, of a carbon coated ECSM was tested to verify the reliability of heating the layer through direct resistive heating. A core sample was subjected to 500 heating and cooling cycles to verify the reliability of the heating layer. FIG. 10 in the left portion thereof is a photo of two core samples and the heating test apparatus. A fiber optic probe was used to verify the sample temperature, and 1.5 kW DC power supply was used to regulate and monitor the voltage and current input. For the heating test, the operating conditions were as follows:

Stabilization Step—Temperature: Ambient; Gas flow: 0.667 slpm humid air with 0.333 slpm dry air (1 slpm total); Duration: 10 minutes.

Purge Condition—Temperature: Ambient; Gas flow: 1 slpm $N_2$; Duration: 2.5 minutes.

Heating Condition—Temperature: 120° C.; Ramp Rate: 20° C./min; Gas flow: 1 slpm $N_2$; Duration: 10-minute hold after reaching 120° C.

Figure 11:
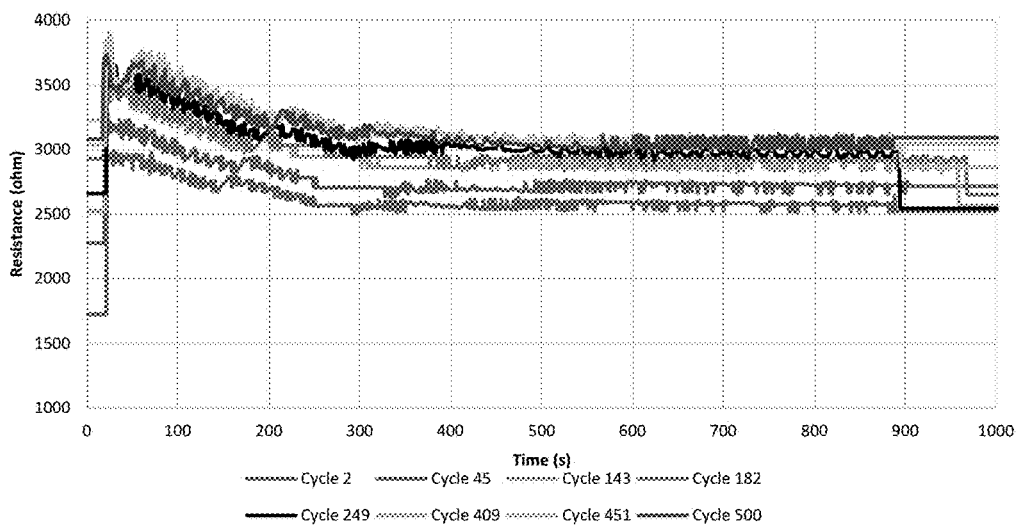
FIG. 11 is a graph of resistance, in ohms, as a function of time, in seconds, for heating cycles in the heating test apparatus shown in FIG. 10.
Figure 12:
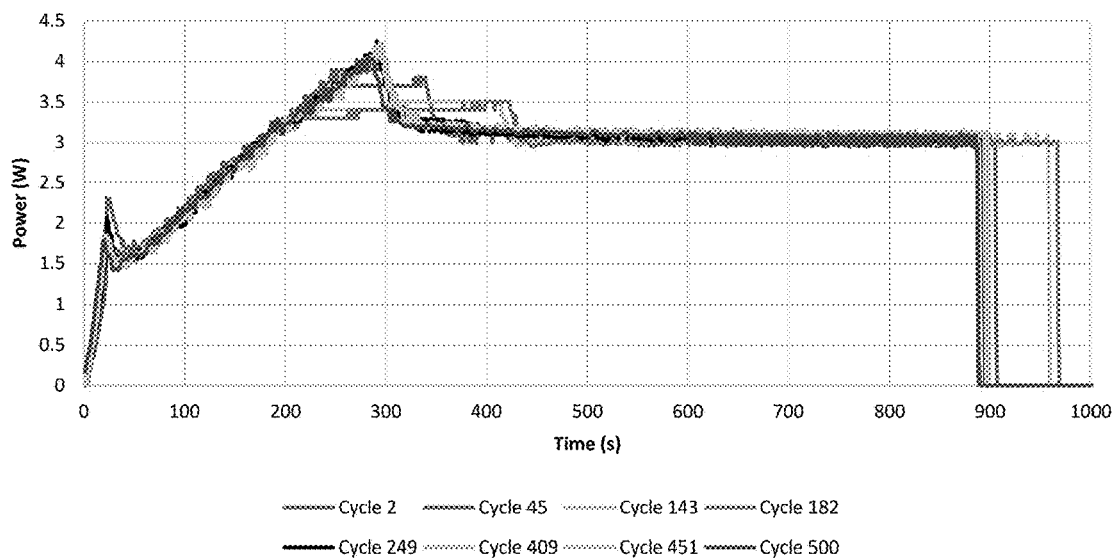
FIG. 12 is a graph of power, in watts, as a function of time, in seconds, for heating cycles in the heating test apparatus shown in FIG. 10.

FIG. 10 in the right portion thereof shows the temperature profiles across all 500 cycles maintained with the rapid heating. This indicates the carbon layer is performing reliably and capable of sustained heating cycles. With the measured current and voltage input to the sample during the heating step, the resistance and power input can be estimated across each heat cycle, as shown in FIG. 11 and FIG. 12, respectively. A significant decrease in resistance occurs as the sample heats to 120° C., which is expected due to the negative temperature coefficient of the carbon heating material. Over the first 45 cycles, the sample resistance increases by 20% to a sustained 3,000 ohms at 120° C. that remained mostly constant for the remaining 255 heating cycles, showing some signs of initial aging of the heating layer before steady conditions are achieved.

Example 4—Evaluation of Carbonization after Pyrolysis

Four cordierite monolith cores with differing CPSI and differing wall thicknesses and with approximate dimensions of 1.5 in. long×0.75 in. diameter were pre-dried at 120° C. and then impregnated with non-diluted phenolic resin solution. The CPSI and wall thicknesses for the sample cores are shown in Table 4 below.

The resin-coated monoliths were cured at 120° C. in air and pyrolyzed in a tube furnace at different temperatures for 4 hours under an inert nitrogen (oxygen-free) atmosphere. Pyrolysis temperatures are shown in Table 4 below.

TABLE 4

| Materials | CPSI | Wall thickness (mils) | Pyrolysis temperature (° C.) |
|---|---|---|---|
| High porosity cordierite | 600 | 3 | 750 |
| High porosity cordierite | 300 | 5 | 800 |
| Standard porosity cordierite | 400 | 6 | 900 |
| High porosity cordierite | 300 | 5 | 1000 |

Small samples of the pyrolyzed monoliths were removed and analyzed using a Raman spectrometer to determine the extent graphitization. A Horiba LabRam Raman spectrometer with a 532 nm laser was used for room-temperature analysis of the samples.

Figure 13:
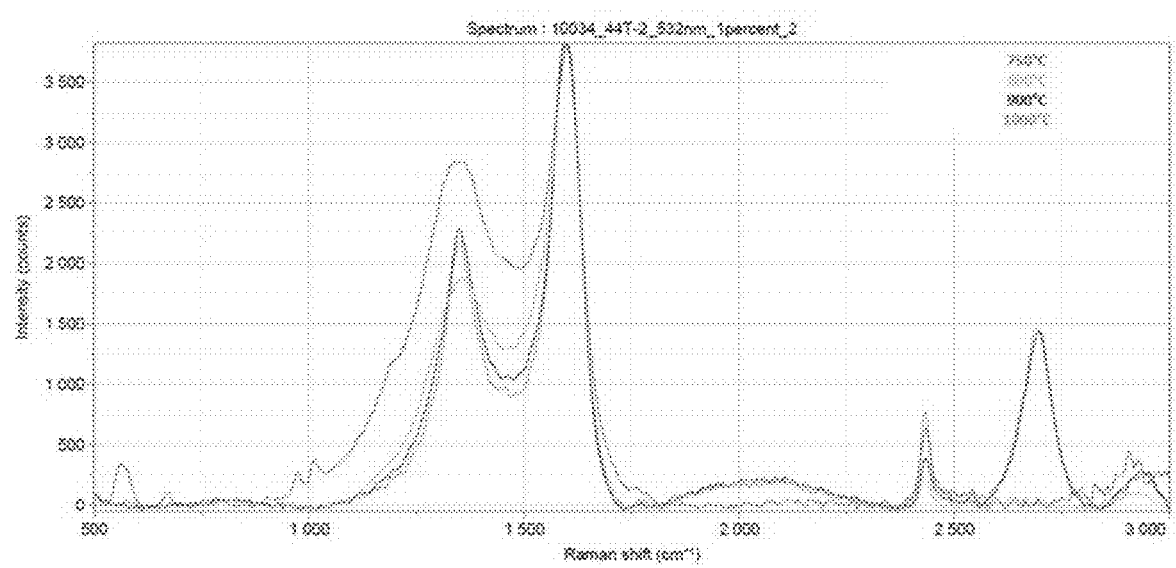
FIG. 13 is an image of the Raman spectra for four pyrolyzed monolith samples, showing that the ratio of G band to D band increases with increasing in the pyrolysis temperature, indicating the carbon sample is more electrically conductive at higher pyrolysis temperature.

Graphitized carbon has two distinct Raman peaks: the G band which appears at around 1580 cm$^{-1}$ indicates the level of graphitization. The D band, which appears at around 1340 cm$^{-1}$ results from carbon defects. FIG. 13 is an image of the Raman spectra for the four samples. As shown in FIG. 13, the ratio of G band to D band increases with increasing in the pyrolysis temperature, indicating the carbon sample is more electrically conductive at higher pyrolysis temperature.

Example 5—Rapid High Temperature Heating of the Catalyst-Coated Substrate

Figure 14:
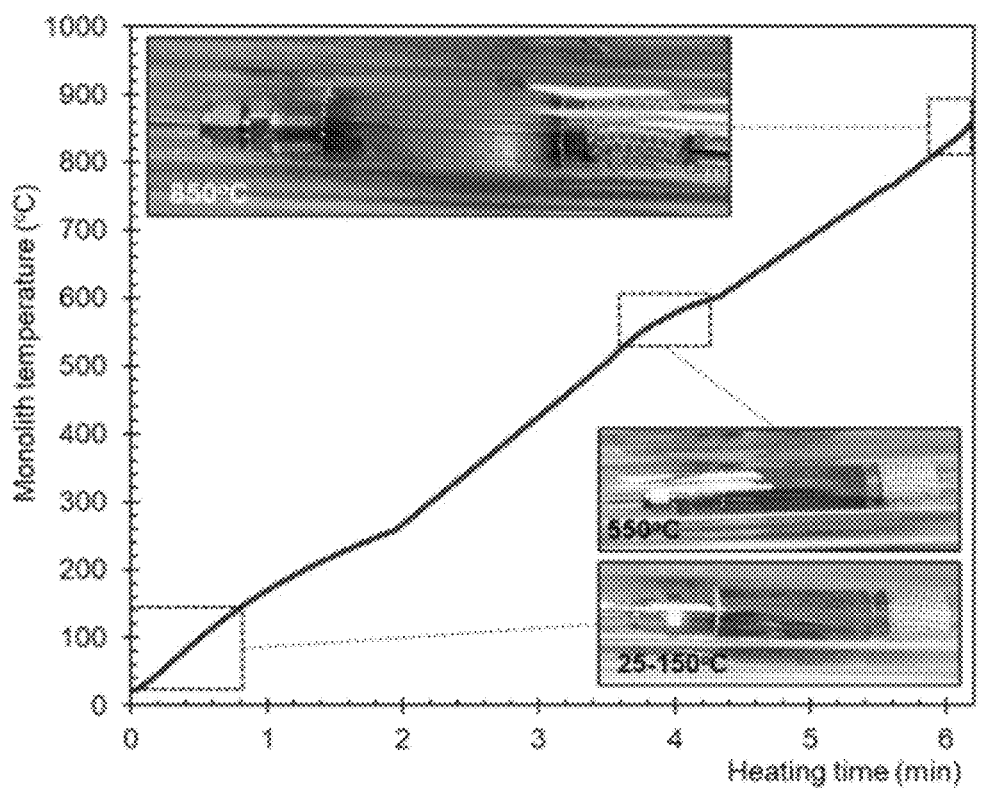
FIG. 14 is a graph of monolith temperature, in ° C., as a function of heating time, in minutes, for a cordierite monolith substrate comprising a conductive carbon network, disposed in a quartz reactor as described in Example 5, with inset photographs of the monolith test system at successive stages of heating operation.
Figure 15:
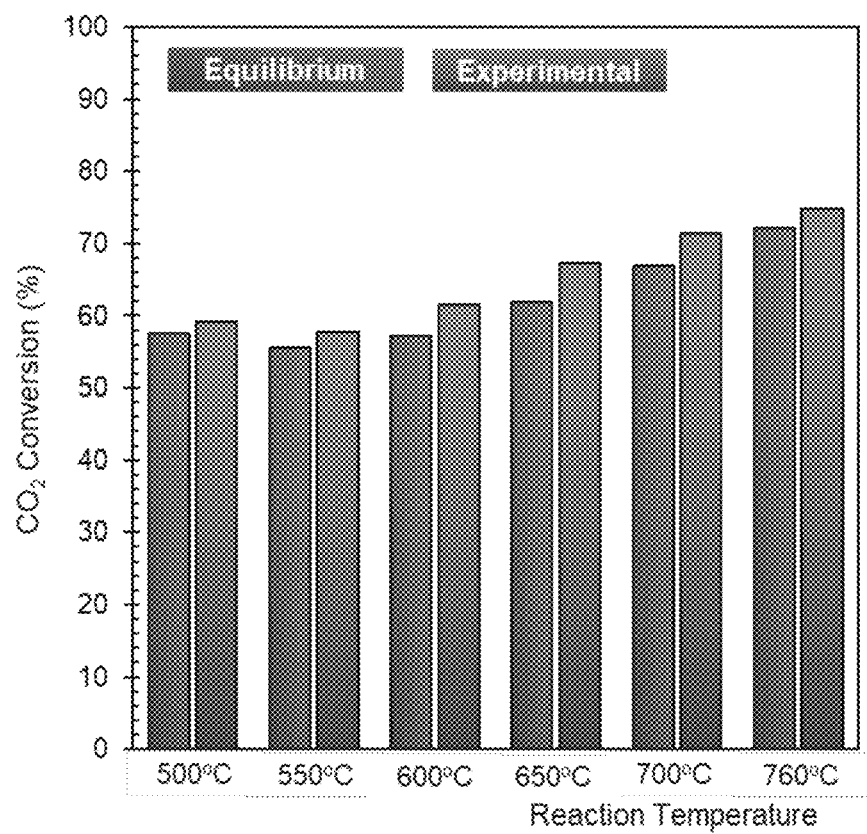
FIG. 15 is a graph of $CO_2$ conversion percentage, as a function of reaction temperature, showing the experimental performance of the reverse water gas shift reaction structured material described in Example 6, and corresponding equilibrium values, showing the experimental performance to be close to equilibrium values.
Figure 16:
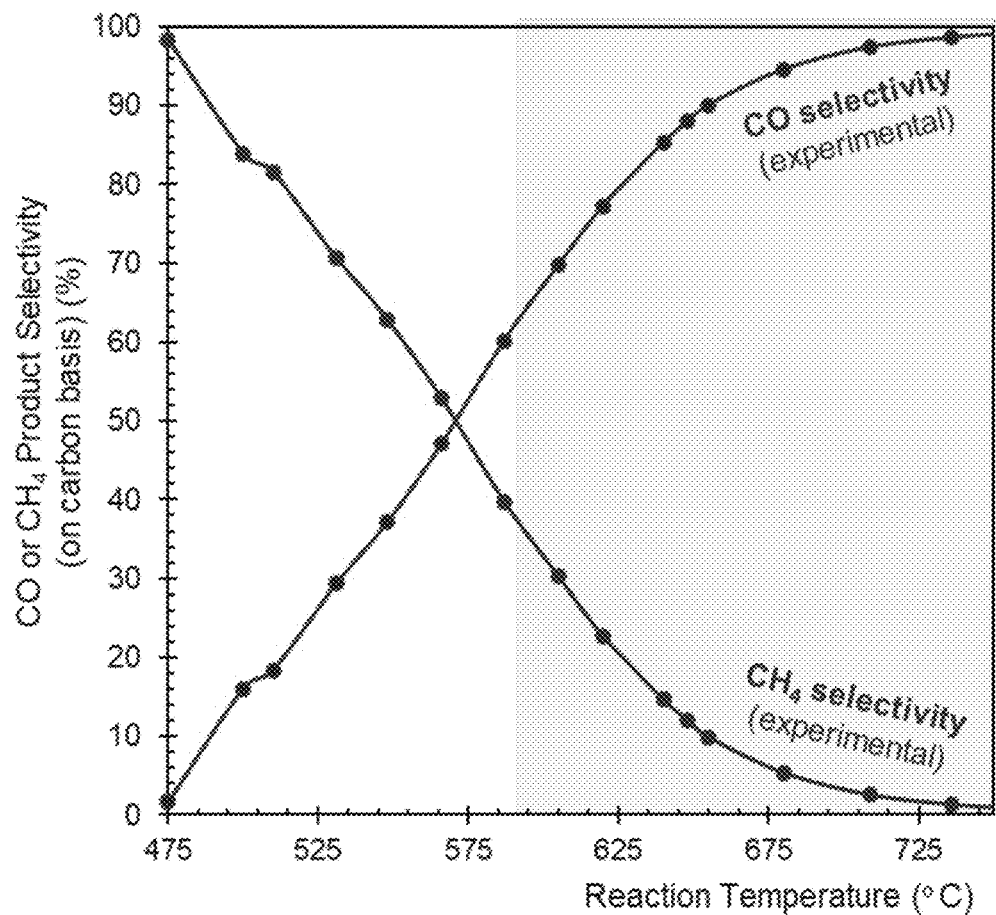
FIG. 16 is a graph of CO and $CH_4$ product selectivity, on a carbon basis, in percent, as a function of reaction temperature, in ° C., for the reverse water gas shift reaction structured material described in Example 9, showing performance that was close to equilibrium values.

A ¾" diameter cylindrical monolithic substrate (cordierite, 600 cpsi) 1.5" in length was synthesized with the conductive carbon network and placed in a vacuum insulated quartz reactor. An electrically insulated Type K thermocouple was placed in the monolith sample for temperature measurement and electrodes were placed on each end of the monolith sample. A standard variable AC transformer was used to control the voltage output to the electrodes, controlling the power input to the monolith sample. FIG. 14 shows the heating test results and provides images of the sample and test apparatus at 3 stages of heating. An average heating rate of >135° C./min was achieved, resulting in the sample reaching 850° C., from room temperature, in just over 6 minutes. This rapid heating rate was achievable due to coating of the conductive carbon coating, and enables rapid switch on/off function, which is advantageous considering the non-continuous nature of renewable electricity supply Example 6—Reverse Water Gas Shift (RWGS) Reaction To test the above structured material of Example 7 for RWGS reaction, the sample was washcoated with 20 wt. % Ni/Al$_2$O$_3$ and then heated up to 766° C., using a 1 kW-heating tape. This high loading of Ni/Al$_2$O$_3$ provides an effective methanation catalyst at low temperatures (<500° C.). A total of 500 sccm gas was fed to the reactor (H$_2$:CO$_2$: N$_2$=3:1:1) and an Inficon MicroGC was used to analyze CO$_2$, CO, H$_2$, H$_2$O, CH$_4$ and N$_2$ concentrations in the product gas. The synthesized catalyst was first reduced in 15% H$_2$ (50 sccm) at 450° C., followed by CO$_2$ injection with the abovementioned flowrates. As shown in FIG. 15, at 766° C., a CO$_2$ conversion of >75% was achieved, close to equilibrium values. As the temperature increased, the CH$_4$ formation dropped and the CO selectivity increased, depicting the suppression of the methanation reactions at higher temperatures. CO selectivity, defined as moles of CO formed per moles of converted CO$_2$, of >99% was observed at temperatures above 725° C., as shown in FIG. 16, demonstrating performance that was close to equilibrium values. A product syngas with H$_2$/CO$_x$ ratio of 2.3 was obtained which can be directly used for Fischer-Tropsch or methanol synthesis without any further conditioning.

Example 7—Improvement in Thermal Properties of Electrically Conductive Carbon Network with Addition of Promoter to the Carbon Precursor: Raman Analysis Nonpromoted sample preparation: A mixture of phenolic resin solution and ethanol was prepared with 33.3% resin by weight. A monolith core (400 cpsi/7 mil wall, 0.75" diameter, 1.5" length) was dipped in the mixture. Channels were cleared of excess liquid using high velocity air. The sample was dried at 120° C. overnight in stagnant air. Once dried, the sample was pyrolyzed at 1150° C. for 4 hours. Pyrolysis was performed under a vacuum to maintain an oxygen-free environment.

A solution of nickel nitrate hexahydrate in ethanol was first prepared, then a desired amount of phenolic resin solution (3.0 wt % Ni to phenol resin solution) was added into nickel nitrate solution with 25% resin by weight under a mixing until a clear solution was obtained. A monolith core (400 cpsi/7 mil wall, 0.75" diameter, 1.5" length) was dipped in the mixture. Channels were cleared of excess liquid using high velocity air. The sample was dried at 120° C. overnight in stagnant air. Once dried, the sample was pyrolyzed at 1150° C. Pyrolysis was either performed under a vacuum or an ultra-high purity (UHP) of nitrogen to maintain an oxygen-free environment. Two samples were prepared using this method, one of which was subjected to a continuous flow of 100 sccm nitrogen and heated under nitrogen flow at a rate of 30° C./min to 300° C. by applying an electrical current across the sample. The temperature was held at 300° C. for 20 minutes before the sample was allowed to cool to 35° C. This was repeated nearly for nearly 240 cycles.

The prepared carbon-coated monolith cores were pulverized to a powder using a mortar and pestle. A layer of powder was affixed to a glass slide with tape. A Horiba XploRA PLUS Confocal Raman Microscope with 532 nm excitation laser at 10% power was used to generate spectral data of various carbon-coated cordierite samples. Each spectrum is an average of 10 accumulations (scans) at the chosen site on the sample surface. Spectra were generated for each sample at four sites on the sample.

Figure 17:
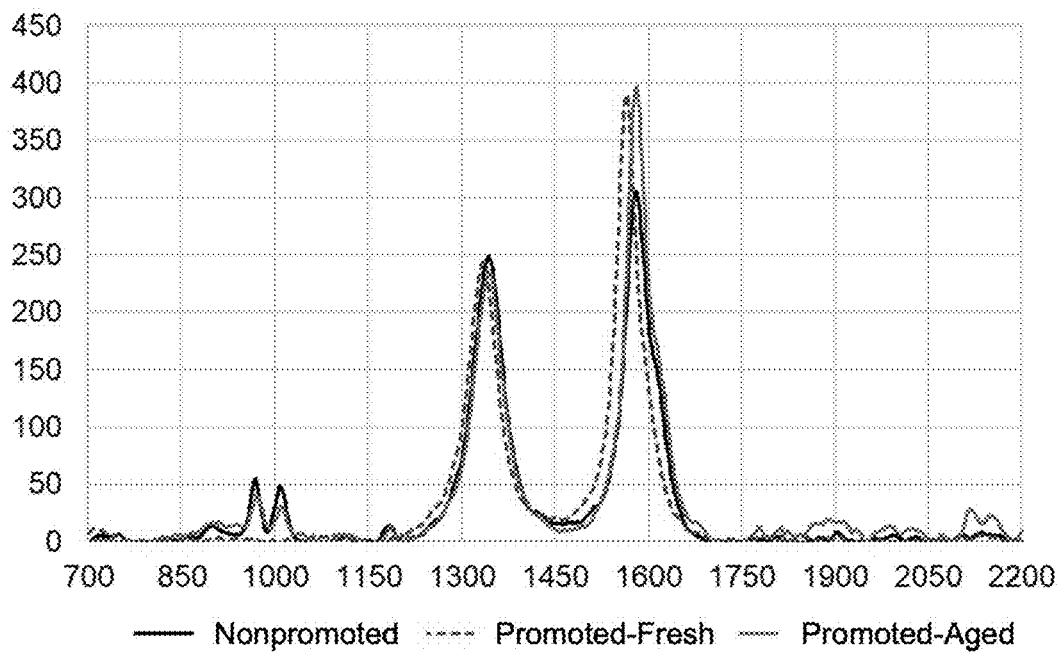
FIG. 17 is an image of the Raman spectra for 3 ECSM prepared with and without promoter per Example 7 illustrating the improvement in G/D ratio with the addition of promoter.

Results: Table 5 summarizes the G/D ratio from the Raman analysis for the nonpromoted sample and the promoted sample before and after thermal cycle aging. FIG. 17 illustrates the Raman Spectra for each sample.

TABLE 5

G/D Ratio of nonpromoted vs promoted samples

| Samples | Nonpromoted - Fresh | Promoted - Fresh | Promoted - Aged |
|---|---|---|---|
| 1 | 1.08 | 1.27 | 1.46 |
| 2 | 1.29 | 1.13 | 1.38 |
| 3 | 1.13 | 1.25 | 1.19 |
| 4 | 0.82 | 1.23 | 1.57 |
| AVG | 1.08 | 1.22 | 1.40 |

Raman spectroscopy was used as a qualitative measure of the level of graphitization achieved in the sample preparation. Of interest in the Raman spectra are the D-mode (~1350 cm$^{-1}$) and G-mode (~1583 cm$^{-1}$), representing vibrational modes of disordered and graphitic structures, respectively. As shown in the spectra, the G bands appear with greater intensity for the samples derived from catalyzed pyrolysis. Furthermore, the table gives the ratios of the G and D peak ratios shows a greater degree of graphitization for the promoted samples vs the nonpromoted.

Example 8: Oxidative Resistance Enhancement of Electrically Conductive Carbon Network with Addition of Promoter Sample Preparation: A solution of nickel nitrate hexahydrate in ethanol was first prepared, then a desired amount of phenolic resin solution (3.0 wt % of Ni to phenol resin solution) was added into nickel nitrate solution with 25% resin by weight while mixing until a clear solution was obtained. A monolith core (400 cpsi/7 mil wall, 0.75" diameter, 1.5" length) was dipped in the mixture. Channels were cleared of excess liquid using high velocity air. The sample was dried at 120° C. overnight in stagnant air. Once dried, the sample was pyrolyzed at 1150° C. Pyrolysis was performed under a vacuum, and the sample was designated as 10038-30-#7. An identical sample that underwent post-treatment in air was designated as 10038-30-#8.

The general procedure for making carbon coated monolith without catalyst addition during the process was as follows: a mixture of phenolic resin solution and ethanol was prepared with 33.3% resin by weight. A monolith core (400 cpsi/7 mil wall, 0.75" diameter, 1.5" length) was dipped in the mixture. Channels were cleared of excess liquid using high velocity air. The sample was dried at 120° C. overnight in stagnant air. Once dried, the sample was pyrolyzed under a vacuum at 1150° C. for 4 hours, and no post treatment in air was conducted. The sample made as such was designated as 10038-26-#3. Followed by the similar procedure but pyrolysis either under an UHP N$_2$ gas or the post treatment in air or both, the samples 10038-27-#3 and -#4 were made.

TABLE 6

Sample preparation conditions

| Sample ID | Resin % | Promoter (Y/N) | Temp (° C.) | Vacuum (Y/N) | 400° C. air treatment (Y/N) |
|---|---|---|---|---|---|
| 10038-26-#3 | 33.3 | N | 1150 | Y | N |
| 10038-30-#7 | 25.0 | Y | 1150 | Y | Y |
| 10038-30-#8 | 25.0 | Y | 1150 | Y | N |

TPO Experimental Setup: Temperature programmed oxidation (TPO) was performed on carbon-coated cordierite samples using a Setram THEMYS thermogravimetric analyzer (TGA). In a flow of 100 scc/min air and 50 scc/min helium, a blank crucible was heated from 25° C. to 120° C. at a rate of 5° C./min. The temperature was held at 120° C. for 2 hours to dry the sample. Subsequently, the sample temperature was increased from 120° C. to 1000° C. at a rate of 5° C./min to facilitate temperature programmed oxidation. The furnace chamber was cooled before the completion of the furnace program. This blank served as a baseline correction for TPO characterization performed on the samples. Samples were pulverized to a powder using a mortar and pestle. About 30 milligrams of sample was deposited into the crucible and loaded into the TGA. The TGA program described above was repeated for each sample, and the blank correction was applied to generate the resulting thermogravimetric profiles presented herein.

Results: TPO was performed via TGA by exposing monolith samples to a flow of air and gradually increasing the temperature to identify the temperature at which the samples start to oxidize. The thermogravimetric profiles among the samples are distinct, whereby sample 10038-30-#7 and 10038-30-#8 exhibited the greatest resistance to oxidation as the temperature increased beyond 450° C. This is indicated by its delayed onset of mass loss in FIG. 18 relative to 10038-26-#3. The superior resistance to oxidation is attributed to the addition of the promoter to the carbon precursor.

Figure 18:
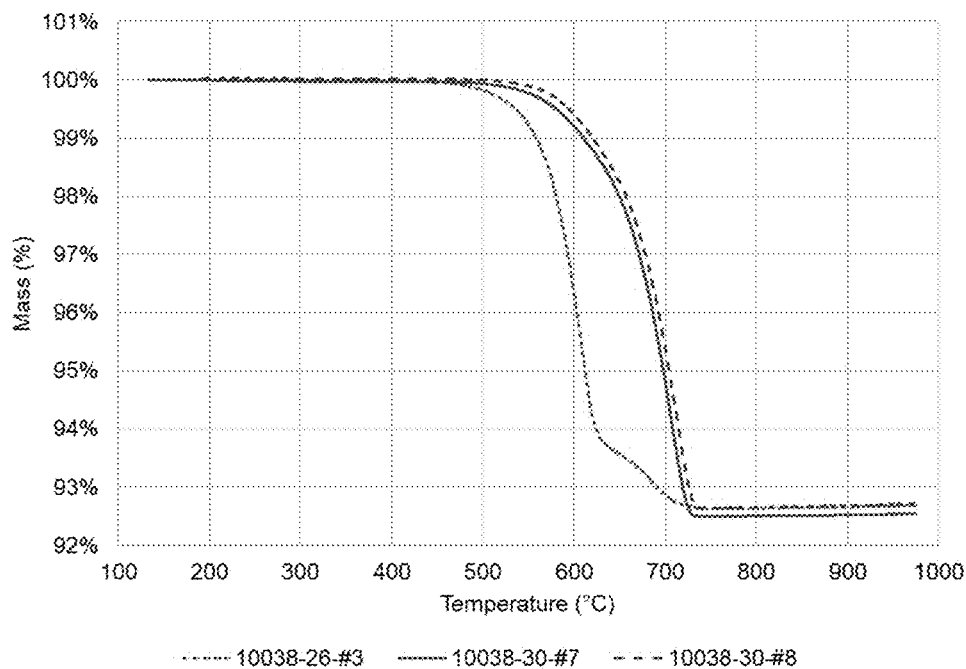
FIG. 18 is a thermogravimetric graph of mass (%) as a function of temperature (° C.) for samples of electrically conductive carbon network materials on ceramic monolith substrates in a $CO_2$ environment for 3 ECSM samples wherein sample details are summarized in Table 6.

Samples 10038-30-#7 and 10038-30-#8 were prepared with a promoter to facilitate formation of more stable and oxidation-resistant carbon with a greater extent of graphitization. TPO results are shown in FIG. 18, demonstrating that the presence of the promoter increased in minimum oxidation temperature to above 500° C. This is relevant to applications that may require exposure to oxidizing environments at elevated temperatures. For example, in DFM applications, air containing oxygen may be used to cool the DFM after the methanation step, where the final bulk temperature may be as low as 200° C. or as high as 350° C., but higher surface temperatures may occur from localized exotherms due to catalyzed methanation at the material surface.

Example 9: Joule Heating of Electrically Conductive Carbon Network Through the Substrate Walls Sample Preparation: A solution of nickel nitrate hexahydrate in ethanol was first prepared, then a desired amount of phenolic resin solution (3.0 wt % Ni to phenol resin solution) was added into nickel nitrate solution with 25% resin by weight under a mixing until a clear solution was obtained. A monolith core (400 cpsi/7 mil wall, 0.75" diameter, 1.5" length) was dipped in the mixture. Channels were cleared of excess liquid using high velocity air. The sample was dried at 120° C. overnight in stagnant air. Once dried, the sample was pyrolyzed at 1150° C. Pyrolysis was either performed under a vacuum or an ultra-high purity (UHP) of nitrogen to maintain an oxygen-free environment. The obtained sample was designated as 10046-49-#2. Resistance along its faces was measured to be 8 ohms. Two samples were prepared for the Joule heating test.

Figure 19:
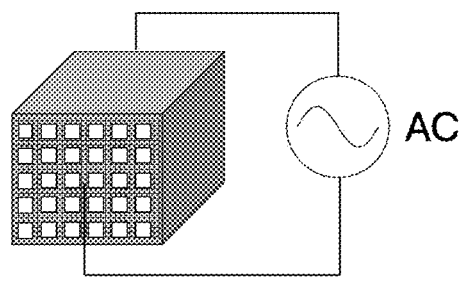
FIG. 19 Infrared temperature scan of ECSM sample resistively (Joule) heated with AC voltage applied on the front and back of the monolith (left image) and side to side (right image)
Figure 19:
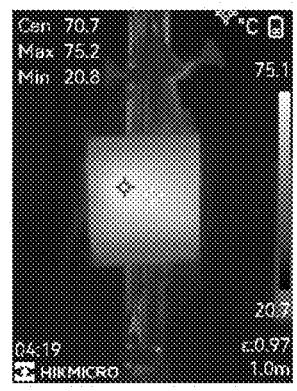
Figure 19:
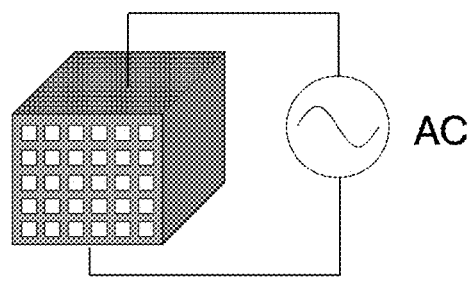
Figure 19:
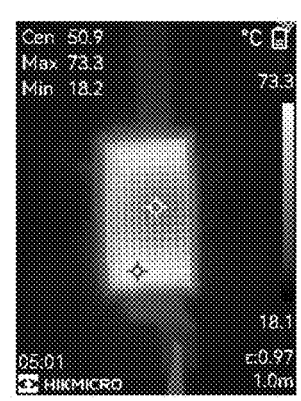

Joule Heating Test Setup: Electrodes were affixed to the ends of the sample, which were coated with a conductive electrode material. A non-contact infrared temperature sensor/transmitter was used to measure the sample temperature and as feedback for the PID controller. The voltage to the apparatus was controlled with custom Labview software. The sample was heated in air, and infrared images of the sample were taken using a HIKMICRO thermal imaging camera. As shown in FIG. 19, the conductive electrode material was coated on the front and back face of the monolith (i.e. on the channel walls of the front and back of the monolith). The conductive electrode was coated on the sides of the monolith for the second sample. The AC voltage potential was then applied to the front and back face of the first sample and the sides of the second sample.

Results: As illustrated in FIG. 19 (Left), upon applying a voltage across front and back face of the monolith, clear heating of the whole length of the channel is apparent. This demonstrates the resistive heating layer is continuous along the length of the channel. As illustrated in FIG. 19 (Right), upon applying a voltage on the side walls of the monolith, an image of the monolith face depicts heating throughout the array of channels, enabled by the resistive carbon network found throughout the pores of the monolith walls. In order for the sample to be resistively heated from the side walls of the monolith, a continuous electrically carbon network must exist connecting each side of the monolith to close the electrical circuit and the network must be sufficiently distributed through the monolith walls to achieve uniform temperature distribution. Thus, applying the voltage on the sides of the monolith confirms the electrically conductive carbon network permeates through the walls of the substrate and is electrically continuous.

Example 10: Thermal Cycle Stability of Electrically Conductive Carbon Network with Promoter in Carbon Precursor Sample Preparation: A solution of nickel nitrate hexahydrate in ethanol was first prepared, then a desired amount of phenolic resin solution (3.0 wt % Ni to phenol resin solution) was added into nickel nitrate solution with 25% resin by weight under a mixing until a clear solution was obtained. A monolith core (400 cpsi/7 mil wall, 0.75" diameter, 1.5" length) was dipped in the mixture. Channels were cleared of excess liquid using high velocity air. The sample was dried at 120° C. overnight in stagnant air. Once dried, the sample was pyrolyzed at 1150° C. Pyrolysis was performed under a flow of ultra-high purity (UHP) nitrogen to maintain an oxygen-free environment. The obtained sample was then subject to treatment at 400° C. for 4 hours in stagnant air before testing. The faces of the monolith were coated with a conductive electrode material.

Figure 20:
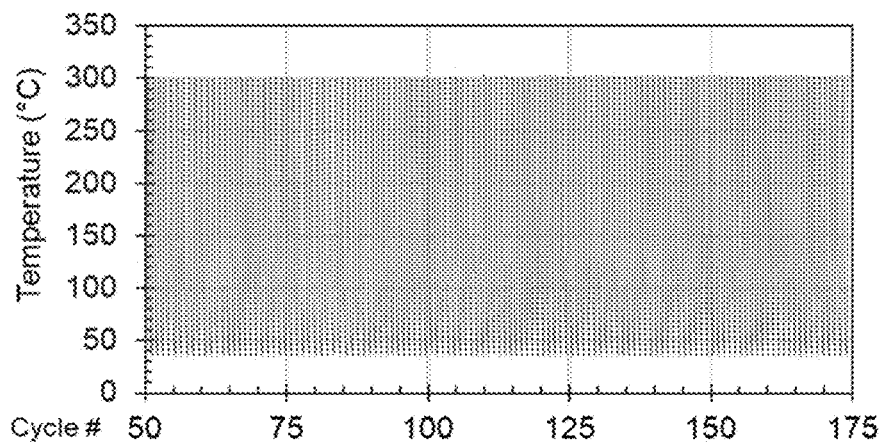
FIG. 20 is a graph summarizing the temperature profile of a resistive (Joule) heated ECSM core sample over 175 hours of thermal cycling

Experimental Setup: The sample was placed between two stainless steel electrodes within a reactor tube. A thermocouple was directed through the face and into the monolith. The sample was subjected to a continuous flow of 100 sccm nitrogen and heated under nitrogen flow at a rate of 30° C./min to 300° C. by applying an electrical current across the sample. The temperature was held at 300° C. for 20 minutes before the sample was allowed to cool to 35° C. The temperature profile of the sample core over an extended cyclic heating/cooling test is plotted in FIG. 20. The data demonstrate consistent temperature measurements from cycle to cycle and the ability of the electrically resistive carbon network to repeatedly achieve the desired setpoint and heating rate.

Example 11: Improvement in Electrical Stability of Electrically Conductive Carbon Network with Increased Heat Treatment Temperature Sample Preparation: 10038-14-#1AA: An aqueous solution of iron (III) nitrate nonahydrate was prepared. Phenolic resin, herein called resin #1, and the solution were mixed (25% resin by weight). A monolith core (400 cpsi/7 mil wall) was dipped in the mixture. Channels were cleared of excess liquid using high velocity air. The sample was dried at 120° C. overnight in stagnant air. Once dried, subsequently pyrolyzed for 6 hours at 1050° C. under continuous $N_2$ flow to maintain an oxygen-free environment. After pyrolysis, a core with dimensions 0.74" diameter, 1.35" length was taken. The faces of the monolith were coated with a conductive electrode material. Subsequently, the core was washcoated with an aqueous slurry of gamma alumina, dried, and calcined in nitrogen at 900° C. An aqueous solution of ruthenium nitrosyl nitrate was added to the alumina washcoat, after drying, a subsequent aqueous sodium carbonate solution was added, then dried and calcined at 450° C. in $N_2$ for 4 hrs. The final active composition of the washcoated DFM was 1% Ru, 27% $Na_2CO_3/Al_2O_3$.

10038-30-#4: A solution was prepared of nickel nitrate hexahydrate dissolved in ethanol. Phenolic resin, herein called resin #2) and the solution were mixed (25% resin by weight). A monolith core (400 cpsi/7 mil wall, 0.75" diameter, 1.5" length) was dipped in the mixture. Channels were cleared of excess liquid using high velocity air. The sample was dried at 120° C. overnight in stagnant air. Once dried, the sample was pyrolyzed for 4 hours at 1150° C. under vacuum to maintain an oxygen-free environment. The pyrolyzed sample was then subjected to heat treatment at 400° C. in air for 4 hrs. The faces of treated monolith were coated with a conductive electrode material. Subsequently, the core was washcoated with an aqueous slurry of gamma alumina, dried, and calcined in $N_2$ at 800° C. Aqueous solutions of ruthenium nitrosyl nitrate was added to the alumina washcoat, then dried in air before a subsequent aqueous sodium carbonate solution was added, then dried and calcined at 450° C. in $N_2$. The final active composition of the washcoated DFM was 0.25% Ru, 22% $Na_2CO_3/Al_2O_3$.

An improvement in performance of the resistive heating layer can be attributed to improved synthesis methods. The main difference in the two experiments is the carbon preparation, whereby 10038-30-#4 underwent pyrolysis at a higher temperature than 10038-14-#1AA and under vacuum conditions. Both samples 10038-14-#1AA and 10038-30-#4 were washcoated with Ru, $Na_2O/Al_2O_3$ DFM and cycled in the laboratory under conditions simulating the $CO_2$ adsorption and methanation process, as set forth in Table 7.

TABLE 7

| Sample ID | Adsorption (Air, 25° C.) | | | Purge ($N_2$, 25° C.) | | Methanation (300° C., $H_2$) | | |
|---|---|---|---|---|---|---|---|---|
| | Flow rate sccm | RH % | Duration hrs | Flow rate sccm | Duration min | Flow rate sccm | Heating rate ° C./min | $H_2$ comp. % |
| 10038-14-#1AA | 1000 | 90 | 1 | 100 | 10 | 100 | 30 | 100 |
| 10038-30-#4 | 1000 | 90 | 1 | 100 | 10 | 100 | 30 | 200 |

Figure 21:
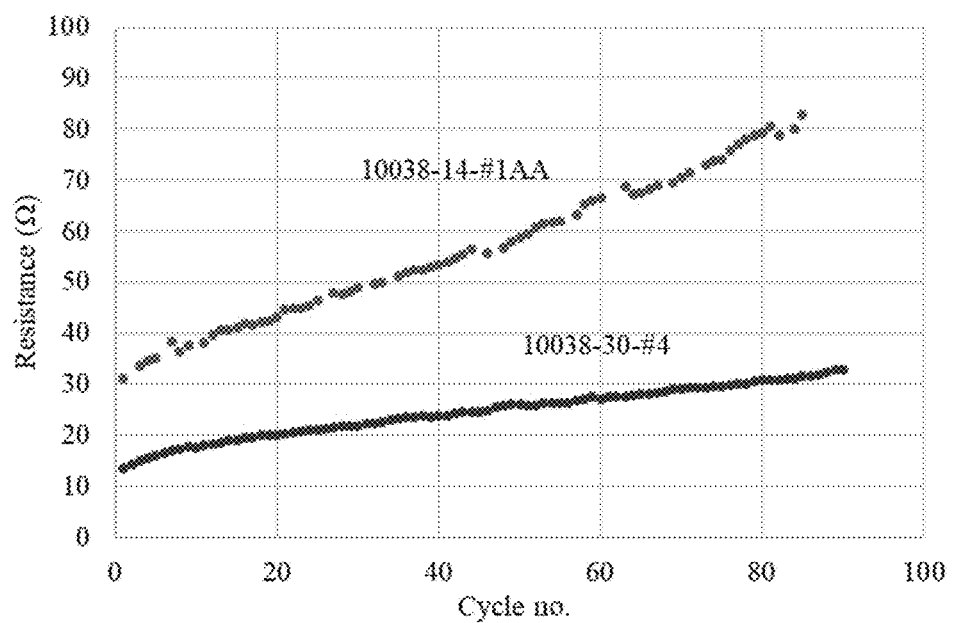
FIG. 21 shows the resistance (ohms) of resistive heating layer samples measured at 300° C. of an ECSM sample performing integrated adsorption and methanation DFM cycles.

During the isothermal methanation step of each cycle (at 300° C. under hydrogen flow), the resistance was measured and is plotted in FIG. 21. The figure shows the carbon in sample 10038-30-#4 had greater stability over the course of about 90 cycles, whereby the rate of increase in resistance is about three times lower than that of 10038-14-#1AA, demonstrating a superior sample preparation method. FIG. 21 shows the resistance (ohms) of the resistive heating layer samples measured at 300° C. during integrated adsorption and methanation DFM cycles.

Example 12: Verification of Electrically Conductive Carbon Network Through Sample Imaging Via Scanning Electron Microscopy (SEM) with Elemental Mapping Using Energy-Dispersive X-Ray Spectroscopy (EDS)

Sample Preparation: A mixture of phenolic resin solution and ethanol was prepared with 33% resin by weight. A monolith core (400 cpsi/7 mil wall, 0.75" diameter, 1.5" length) was dipped in the mixture. Channels were cleared of excess liquid using high velocity air. The sample was dried at 120° C. overnight in stagnant air. Once dried, the sample was pyrolyzed under an ultra-high purity (UHP) of nitrogen at 1150° C. for 4 hours. The sample of 10038-26-#3 was made according to the above description.

Figure 22:
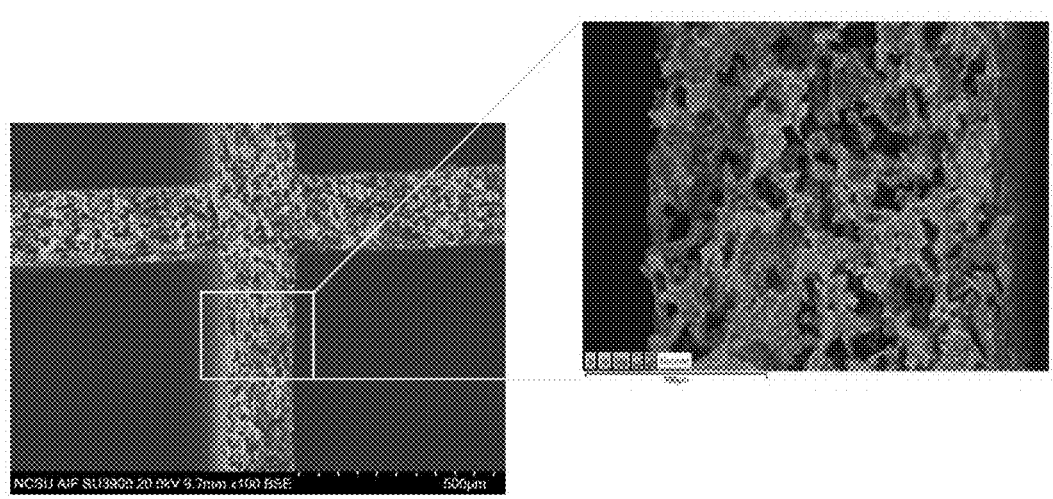
FIG. 22 depicts a SEM micrograph of a cross section of the walls of the carbon-loaded ECSM monolith at 100× magnification as described in Example 12. Highlighted is an example location where a higher magnification image (500×, right) was taken and EDS was performed.
Figure 23:
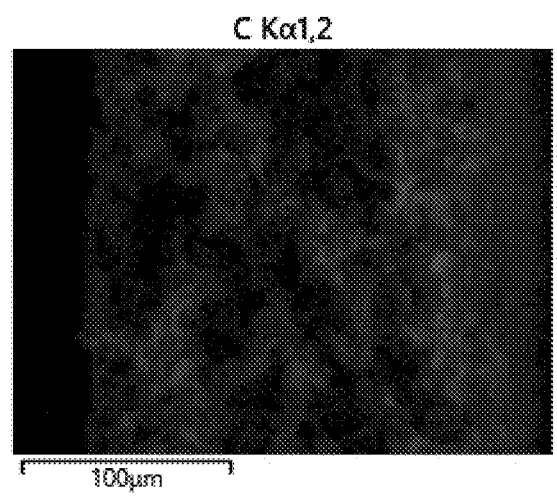
FIG. 23. EDS mapping of elemental carbon of the magnified zone shown in FIG. 22 right.

A Hitachi SU3900 variable pressure scanning electron microscope (VPSEM) with elemental mapping and elemental analysis capabilities was used for imaging of the radial cross section of sample 10038-26-#3. First, the sample was placed on the sample holder and held in place with carbon tape. Then the sample was placed into the stage and the instrument was sealed. A vacuum was pulled to $<1 \times 10^{-4}$ Pa before the analysis began. Images were taken at randomly selected locations on the monolith cross section. EDS was performed, and all elements within the detection limit were mapped. FIG. 22 depicts a micrograph of a cross section of the walls of the carbon-loaded monolith at 100× magnification. Highlighted is an example location where a higher magnification image (500×) was taken and EDS was performed. The uniform porosity of the monolith core is evident in both figures. The zoomed image also includes an overlay of Si, Al, Mg, O, and C elemental mapping performed on the monolith cross section. The Si, Al, Mg, and O are characteristic of the ceramic substrate. The continuous distribution of carbon is further reinforced in the carbon mapping shown in FIG. 23.

Example 13—Reverse Water Gas Shift Reaction

Conversion of $CO_2$ into CO, using $H_2$ as the reducing agent can be carried out by the reverse water gas shift (rWGS) reaction. The rWGS reaction is the reversible hydrogenation of $CO_2$ to produce CO and $H_2O$. It is an endothermic equilibrium-limited process that is thermodynamically favored at high reaction temperatures. The rWGS is an important foundation for the conversion and utilization of $CO_2$ as CO is a building block for numerous chemical products. Major challenges with rWGS reaction include: (1) suppressing $CH_4$ formation via $CO_2$ methanation, which is favored at lower temperatures (<650° C.); (2) maximizing and stabilizing the $CO_2$-to-CO yield, (3) avoiding or reducing catalyst sintering and deactivation at high temperatures, (4) providing efficient heat/thermal energy to the catalyst at high temperatures, (5) avoiding formation of coke during the initiation of the rWGS reaction.

The Joule heating electrically conductive carbon network structures of the present disclosure may be utilized to carry out the rWGS reaction, to produce synthesis gas from $CO_2$, utilizing a supported catalyst on the electrically conductive carbonized network, which in turn is on a three-dimensional substrate, as an SMA deployed in the rWGS process system and method. The electrically conductive carbonized network can be formed by pyrolyzing a phenolic resin or a polymer that has been dispersed on or in a three-dimensional substrate. Electrical energy to the electrically conductive carbonized network is effective to produce localized heating throughout the three-dimensional substrate coated with the electrically conductive carbonized network, which enables the supply of the required endothermic heat of reaction. Systems for carrying out the reverse water gas shift reaction include controlled and localized thermal energy input, integrated with units to upgrade the syngas to valuable products such as gasoline, diesel, aviation fuel, methanol, etc.

The following description has reference to FIGS. 24-34. In the ensuing description, and the appertaining drawings, the following identification of reference numerals is applicable. 100—electrically heatable structures, multiple ones of which constitute 201; 101—layers in channels of 100; 111—outermost layer, substrate, which makes up 100; 121—an electrically conductive carbonized material layer; 131—a support material layer; 141—an active material layer; 200—reactor; 201—$CO_2$ compressor; 00—$CO_2$ (low pressure); 01—$CO_2$ (high pressure); 02—$H_2$ (high pressure); 03—combined feed to reactor; 04—syngas or syngas-rich high temperature product; 05—condensed water; 06—cooled syngas (cooled feed to FT reactor); 07—syngas product (liquid syncrude) (hot syngas); 08—recycled $CO_2$ (gaseous syncrude) (cooled methanol reactor product); 09—condensed water (water-deficient methanol product); 10—internal recycled to FT (condensed water); 11—external recycle to reactor (water feed for steam); 12—condensed liquid fuel; 13—hydrocracked liquid fuel (hot methanol reactor product); 14—condensed water; 15—liquid fuel product (purified methanol product); 202—product cooling and water separation; 203—$CO_2$ removal (Fischer-Tropsch (FT)) (heat exchanger network); 204—cold-box for gas separation (hydrocracker and product separation) (methanol reactor); 205—sequential gaseous syncrude purification (water removal+product cooling); 206—methanol purification.

Figure 26:
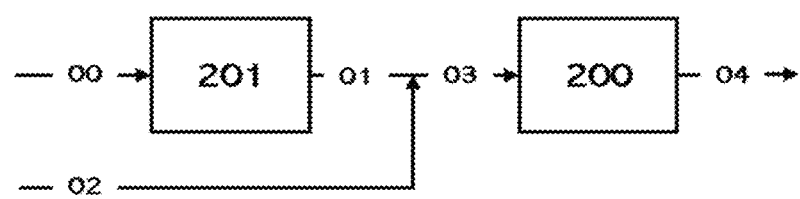
FIG. 26 shows an embodiment of the process with the feedstocks and reactor.

FIG. 26 shows an embodiment of the rWGS process, where a feedstock (03) to 200 is provided by mixing high pressure $H_2$ (02, 1-100 bar) and high-pressure $CO_2$ (01, 1-100 bar). $CO_2$ (00) is pressurized by compressor 201 to make a gas phase feedstock. In reactor system 200, the temperature is increased while facilitating the reverse water gas shift reaction to provide a hot synthesis gas as first product gas. Alternatively, the compression of $CO_2$ (00) and $H_2$ (02), can be done in a combined compressor.

Figure 27:
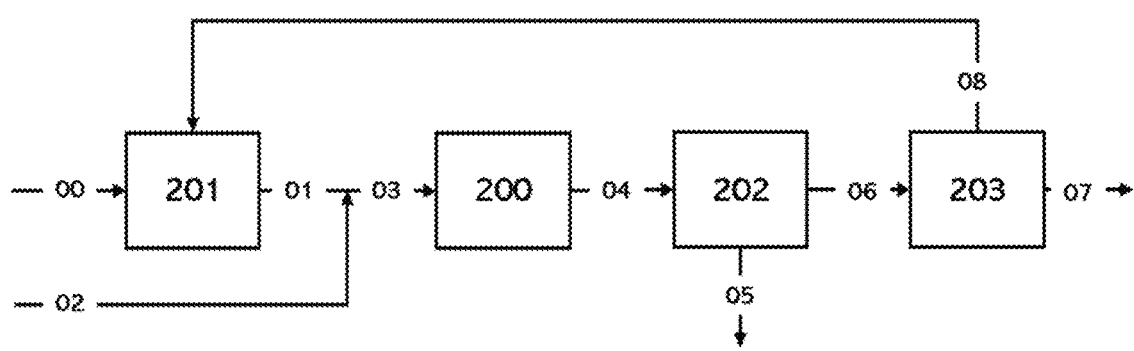
FIG. 27 shows an embodiment of the process with the feedstocks, reactor, product purification which includes separation and recycling of unreacted feed.

FIG. 27 shows an embodiment of the process like FIG. 260, which involves upgrading units including a flash separation unit 202 and a $CO_2$ removal unit 203. The product gas 04 from 200 is cooled in a heat exchanger 202 to condense and remove liquid water 05 and produce a dry product gas 06. The dry product gas 06 is sent to a $CO_2$ removal unit 203 where $CO_2$ is separated into an off-gas stream 08 comprising substantially pure $CO_2$ stream and leaves an upgraded synthesis gas stream 07. The off-gas stream 08 is recycled back to the $CO_2$ compressor 201 and used as feedstock for 200.

Figure 28:
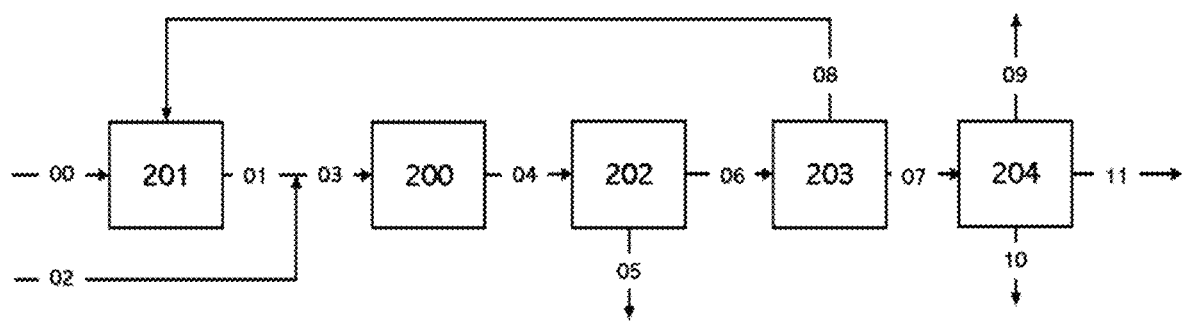
FIG. 28 shows an embodiment of the process with the feedstocks, reactor, product purification which includes cold box-driven gas separation and recycling of the unreacted feed.

FIG. 28 shows an embodiment of the process like FIG. 27, which involves an upgrading unit comprising a flash separation unit 202, $CO_2$ removal unit 203, and a cold box 204.

The product gas 04 from 200 is cooled in a heat exchanger 202 to condense and remove liquid water 05 and produce a dry product gas 06. The dry product gas 06 is sent to a $CO_2$ removal unit 203 where $CO_2$ is separated into an off-gas stream 08 comprising substantially pure $CO_2$ stream and leaves an upgraded synthesis gas stream 07. The off-gas stream 08 is recycled back to the $CO_2$ compressor 201 and used as feedstock for 200. The upgraded synthesis gas stream 07 is sent to a cold box unit 204, which produces an off-gas stream 09 primarily consisting of $CH_4$ and $H_2$, and two upgraded synthesis gas streams, one rich in $H_2$ (11), and the other rich in CO (10).

Figure 29:
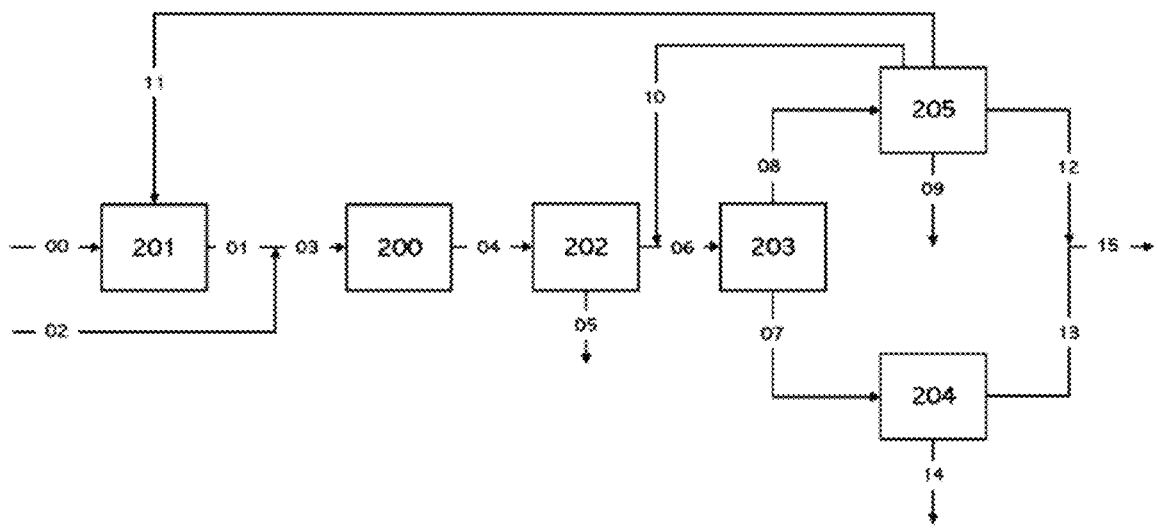
FIG. 29 shows an embodiment of the process including the feedstocks, reactor, product separation, recycling of unreacted feed, and upgrading to liquid fuels including, but not limited to aviation fuel, gasoline, diesel etc.

In one embodiment, the syngas product (07 from FIG. 28) can be used as a feedstock for production of liquid fuels, including but not limited to gasoline, diesel, and jet fuel. FIG. 29 shows an embodiment of the process like FIG. 27, which involves an upgrading unit comprising a flash separation unit 202, Fischer-Tropsch reactor system 203, a hydrocracker system 204, and a sequential gaseous product purification system 205. The product gas 04 from 200 is cooled in a heat exchanger 202 to condense and remove liquid water 05 and produce a dry product gas 06. The dry product gas 06 is sent to Fischer-Tropsch reactor system 203 where syngas is passed over a catalyst under high temperatures and pressures, to form long-chain hydrocarbons. These long-chain hydrocarbons 07 are broken down into shorter chains through hydrocracking 204. This process also includes hydroprocessing to remove impurities and improve the quality of the final product. The heavy liquid products 14 is separated. The resulting product mixture is distilled (204) to separate the desired liquid fuel fraction from other types of hydrocarbons like waxes. The separated liquid fuel fraction undergoes further treatment to make the final product. The gaseous product 08 from 203 is purified sequentially in 205. The light hydrocarbons 10 are recycled to Fischer Tropsch reactor 203, while the light gases 11, like unreacted $CO_2$ and $H_2$, are recycled to the reactor 200.

Figure 30:
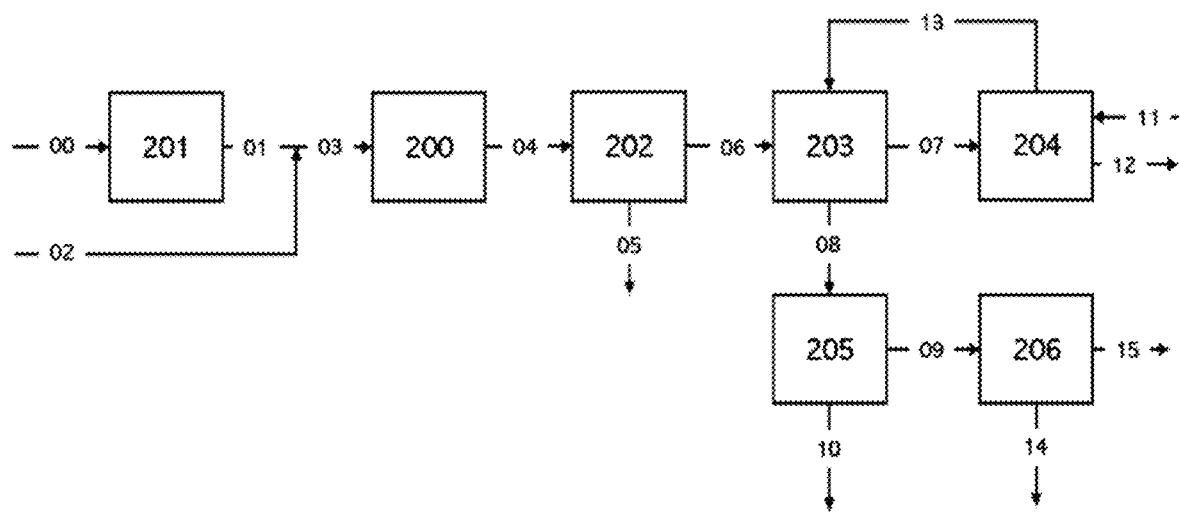
FIG. 30 shows an embodiment of the process including the feedstocks, reactor, product separation, recycling of unreacted feed, and upgrading to chemical intermediates like methanol.

In one embodiment, the syngas product (07 from FIG. 28) can be used as a feedstock for production of methanol. FIG. 30 shows an embodiment of the process like FIG. 27, which involves an upgrading unit comprising a flash separation unit 202, product cooling and heat exchanger unit 203, a methanol reactor system 204, a water removal and product cooling system 205, and methanol purification 206 by distillation. The product gas 04 from 200 is cooled in a heat exchanger 202 to condense and remove liquid water 05 and produce a dry product gas 06. The dry product gas 06 is heated by exchanging heat with the gaseous product 13 of 204. The cooled product 07 is sent to methanol reactor system 204 where syngas is passed over a catalyst under high pressures, to form methanol. This is an exothermic reaction. The heat released in 204 due to reaction is extracted in the form of medium quality steam 12 by passing using water 11. Methanol product 13, after cooling in 203 is further cooled in 205 to remove the water, which is a by-product of the reaction in 204. Water is condensed and separated into a liquid stream 10. The crude methanol 09 is purified using distillation columns 206 to obtain a high purity methanol 15.

Figure 24:
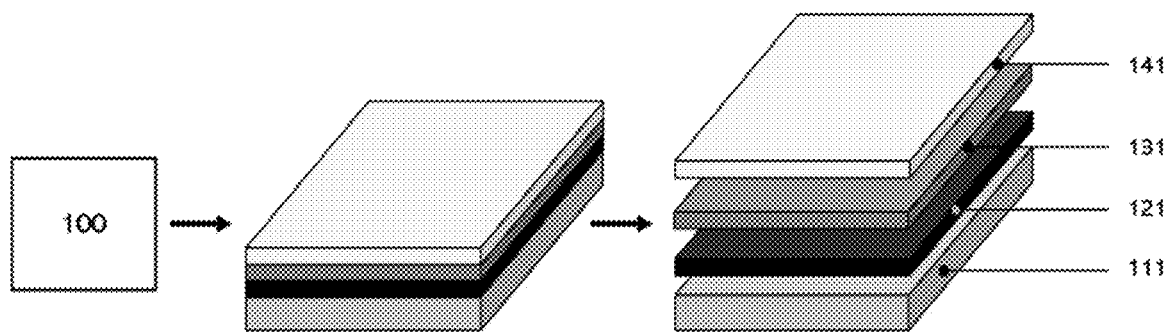
FIG. 24 is a schematic depiction of an electrically heatable structure according to one illustrative embodiment of the present disclosure, showing a substrate on which electrically conductive carbonized material has been formed, with a support material layer on the electrically conductive carbonized material, and with an active material on the support.
Figure 25:
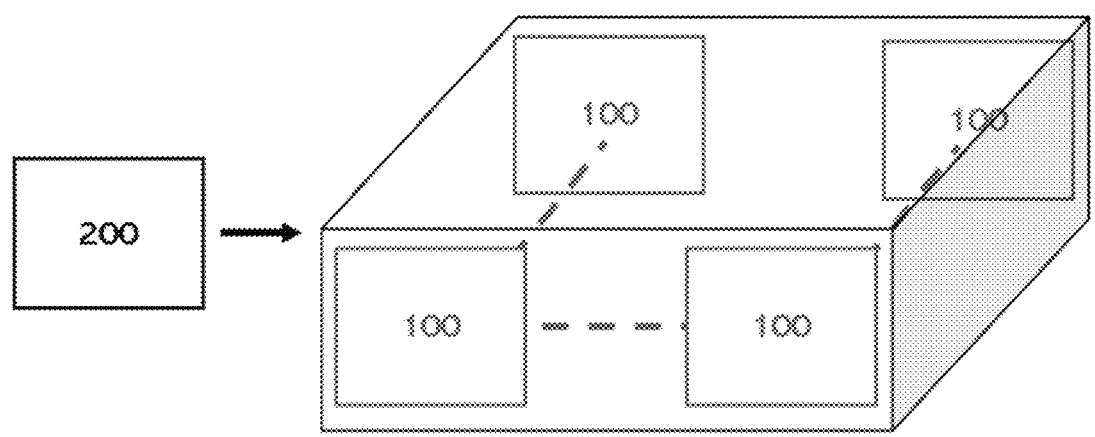
FIG. 25 is a schematic of the modular reactor consisting of several sub-units of the electrically heated structures as shown in FIG. 24.

In one embodiment, 100 from FIG. 24 involves a cordierite monolith structured material which is innovatively coated with different compositions of the heating layers 121, along the length of 100. This embodiment is depicted in FIG. 2. Each layer has different thermal properties and compositions allowing for a controlled temperature gradient along the length of the monolith. From the feed point to the exit, the temperature can be precisely managed, enabling optimal conditions for various chemical processes. This involves 100 being coated with different compositions of 121, that have varying heat conductivities and capacities. The arrangement of these materials is engineered such that the section of 100 near the feed point has medium resistance, allowing feed to preheat, gradually transitioning to more resistance towards the center, and then to low resistance towards the end, for product cooling. This setup induces a temperature gradient, crucial for feed preheat, high temperature rWGS requiring staged heating or different reaction zones. This embodiment demonstrated enhanced reaction efficiency with the ability to optimize the reaction conditions along the path of the reactants and achieve higher yields and selectivity for desired products. This allows for localized heating, in selected sections, reducing the overall energy consumption as heat is not wasted over inactive zones. This thereby leads to an extended catalyst life, since controlled temperatures prevent hot spots that can degrade catalysts prematurely. Another embodiment involves integration of sensors within 100 to dynamically adjust temperatures based on real-time reaction conditions, enhancing adaptability and control over the chemical processes. This offers a versatile and efficient solution to current limitations in temperature management within reactors.

In another embodiment, 100 from FIG. 24 involves a cordierite monolith structured material which is innovatively coated with different compositions of the heating layers 121 and different catalysts (or active material) 141, along the length of 100. This embodiment is depicted in FIG. 26. This embodiment enables a gradient of temperatures across 100, from the feed to the exit, with specific catalysts coated at intervals that are most effective at the corresponding temperatures. Each layer of 121 has different thermal properties and compositions allowing for a controlled temperature gradient along the length of the monolith. Each layer of 141 has a different active material or catalyst, active at the corresponding temperature allowing for a controlled catalytic activity along the length of 100. From the feed point to the exit, the temperature can be precisely managed, along with the rWGS reaction activity at that temperature, enabling optimal conditions for the reaction. This involves 100 being coated with different compositions of 121, that have varying heat conductivities and capacities, and varying active material compositions 141. The arrangement of these materials is engineered such that the section of 100 near the feed point has medium resistance, allowing feed to preheat with rWGS activity at medium temperatures (<600° C.), gradually transitioning to more resistance towards the center with rWGS activity at high temperatures (600-1200° C.), and then to low resistance towards the end with rWGS activity at medium or low temperatures (200-600° C.), for product cooling. This setup induces a temperature gradient, crucial for feed preheat, high temperature rWGS requiring staged heating or different reaction zones. This embodiment demonstrated enhanced reaction efficiency with the ability to optimize the reaction conditions along the path of the reactants and achieve higher yields and selectivity for desired products. This allows for localized heating, in selected sections, reducing the overall energy consumption as heat is not wasted over inactive zones along with increased catalytic activity. This thereby leads to an extended catalyst life, since controlled temperatures prevent hot spots that can degrade catalysts prematurely. Another embodiment involves integration of sensors within 100 to dynamically adjust temperatures based on real-time reaction conditions, enhancing adaptability and control over the chemical processes. This offers a versatile and efficient solution to current limitations in temperature management within reactors. This embodiment provides a customizable and efficient solution to complex chemical processes like rWGS requiring precise environmental controls.

Example 14—Further Reverse Water Gas Shift Testing

Figure 31:
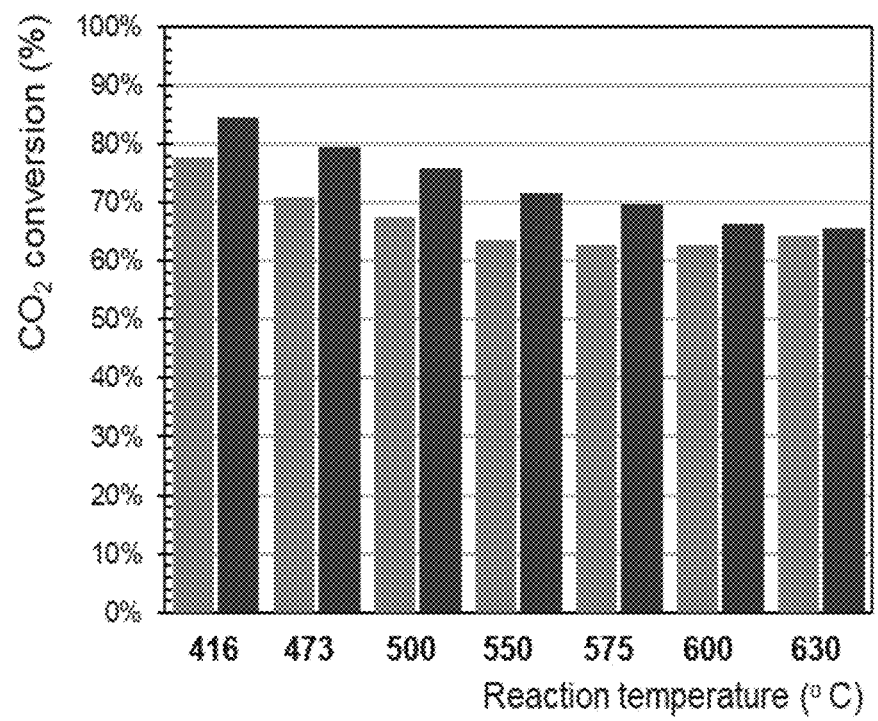
FIG. 31 is a graph of $CO_2$ conversion percentage, as a function of reaction temperature, showing the experimental performance of the electrically heated reverse water gas shift reaction structured material described in Example 13, and corresponding equilibrium values, showing the experimental performance to be close to equilibrium values.
Figure 32:
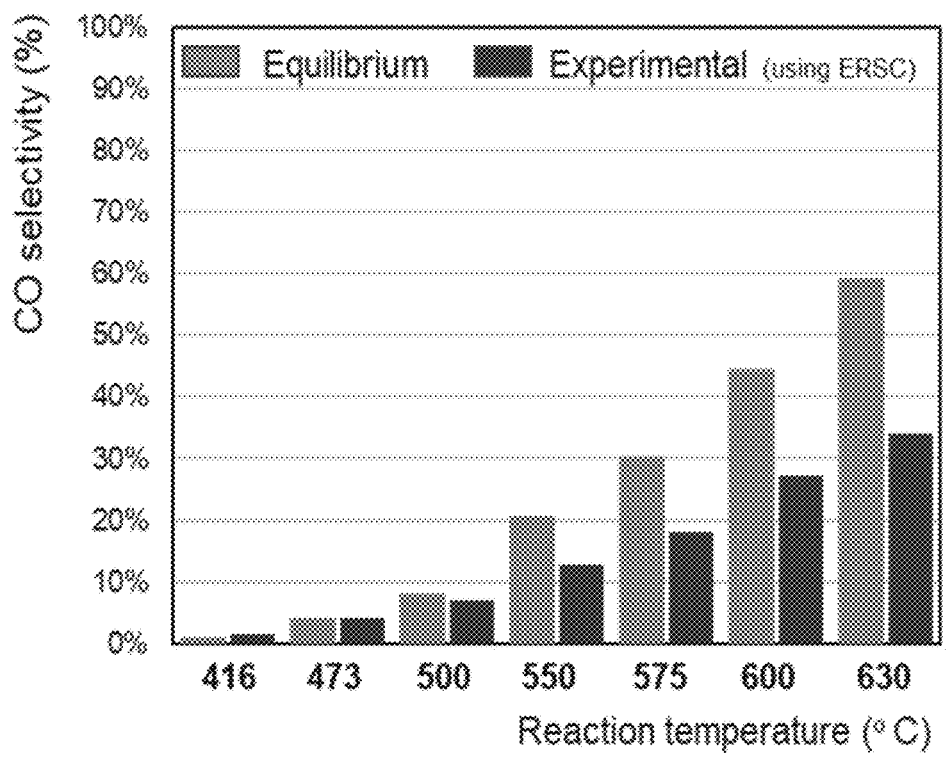
FIG. 32 is a graph of CO product selectivity, on a carbon basis, in percent, as a function of reaction temperature, in ° C., for the reverse water gas shift reaction structured material described in Example 13.

To test the above structured material of Example 11 for rWGS reaction, the sample was washcoated with 20 wt. % Ni/Al$_2$O$_3$ and then Joule heated up to 630° C., with appropriate voltage and wall-power. This high loading of Ni/Al$_2$O$_3$ provides an effective methanation catalyst at low temperatures (<500° C.). A total of 500 sccm gas was fed to the reactor (H$_2$:CO$_2$:N$_2$=3.6:1:1) and an Inficon MicroGC was used to analyze CO$_2$, CO, H$_2$, H$_2$O, CH$_4$ and N$_2$ concentrations in the product gas. The synthesized catalyst was first reduced in 15% H$_2$ (50 sccm) at 450° C., followed by CO$_2$ injection with the abovementioned flowrates. As shown in FIG. 31, at 630° C., a CO$_2$ conversion of >60% was achieved, close to equilibrium values. CO selectivity, defined as moles of CO formed per mole of converted CO$_2$, of >30% was observed at 630° C., as shown in FIG. 32.

Example 15—Electrified Production of Propane from CO$_2$

Propane, and liquefied petroleum gas (LPG) containing >80% propane by mass, are high energy fuels, propane providing 6.8 kWh/L energy density at 25° C. and pressure >10 bar. The Joule heating electrically conductive carbon network structures of the present disclosure may be utilized in an electrically resistive structured catalyst (ERSC) system to carry out the production of propane from CO$_2$, utilizing hydrogen generated by an electrolyzer, and electricity, for rapid, stable, and continuous production of propane in a single step operation involving rapid, uniform Joule heating and quick startup/shutdown capability.

Figure 33:
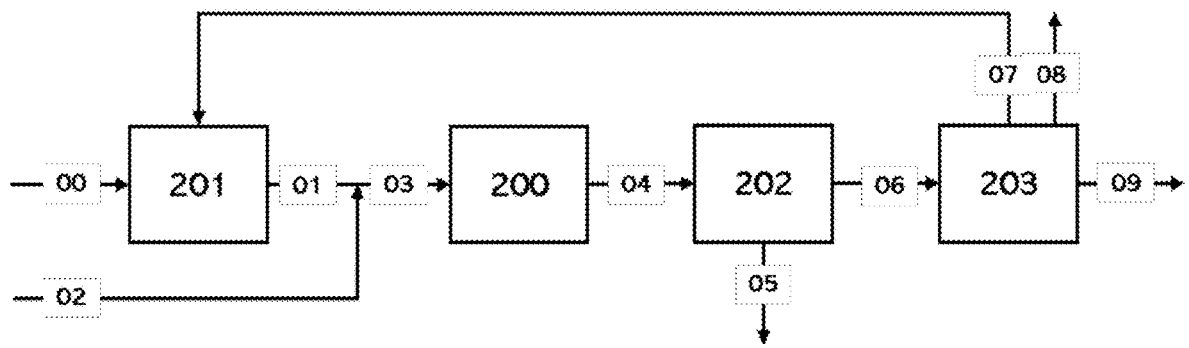
FIG. 33 is a schematic representation of a process system for production of propane (LPG) from $CO_2$ in a reactor containing electrically conductive structured material (ECSM) assemblies in which conversion catalyst is Joule heated by an electrically conductive carbon network in the assemblies.

FIG. 33 is a schematic representation of a process system that may be employed for such production of propane (LPG) from CO$_2$ using a reactor containing electrically resistive structured catalyst (ERSC) assemblies in which conversion catalyst is Joule heated by an electrically conductive carbon network in the assemblies. The CO$_2$, from a source such as biogas, and hydrogen from an electrolyzer enter the reactor in the presence of a supported catalyst layer on the ERSC structure, such supported catalyst layer overlying and in direct contact with an electrical heating layer comprising the electrically conductive carbon network, and the electrical heating layer overlying and in direct contact with a monolith substrate.

The reaction 3CO$_2$+10H$_2$→C$_3$H$_8$+6H$_2$O is carried out in the reactor and the propane-containing reaction product stream of such reaction is discharged from the reactor and flows to a downstream separation apparatus in which unreacted gases and water are removed from the liquid propane (LPG) product, with the unreacted gases separated from the product being recycled to the reactor, and with the recovered liquid propane (LPG) being discharged as product, with a portion of the product propane being recirculated to the power engine as the fuel for engine operation.

Example 16—CO$_2$ to LPG in a Structured Catalyst

Figure 34:
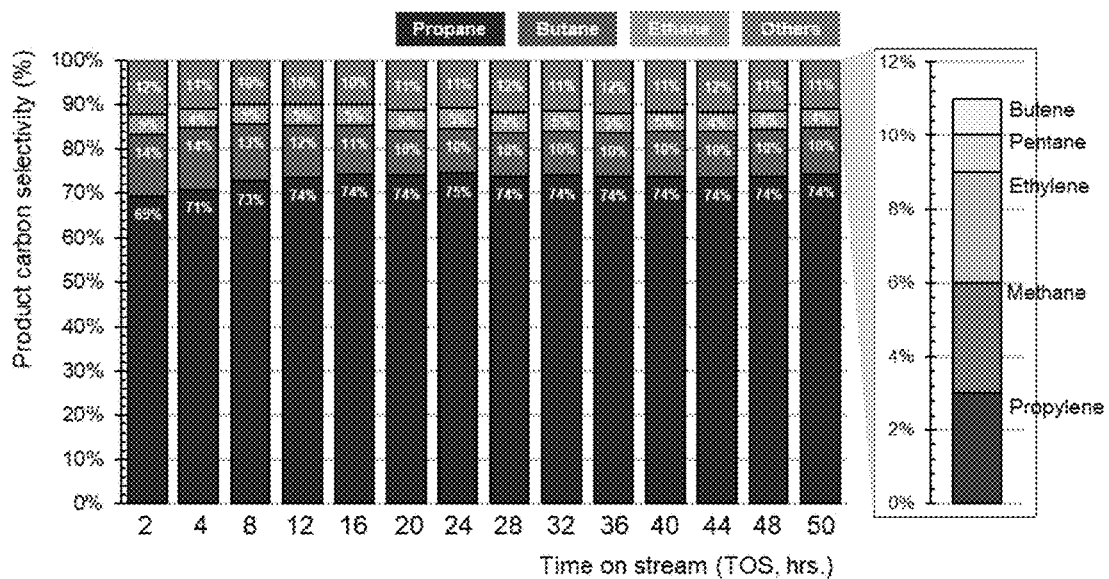
FIG. 34 is the selectivity profile for $CO_2$ to propane study in Example 15

GaZrOx/H-SSZ-13 catalyst was synthesized and tested for CO$_2$ hydrogenation to LPG. For the GaZrOx component, hydrates of gallium nitrate and zirconyl nitrate were used as precursors. The H-SSZ-13 catalyst component can be obtained from commercially available SSZ-13 or H-SSZ-13 (Si/Al=6.5), with SSZ-13 requiring full exchange with NH$_4$NO$_3$ to obtain the NH$_4^+$ form, and followed by decomposition in air to a protonic form at 300-700° C. The GaZrOx and H-SSZ-13 powders are then mixed and pelletized to obtain the composite catalyst, sieved into 40-60 mesh composite catalyst particles. This resulting composite particulate catalyst can be pretreated at 400° C. in hydrogen, and then tested at reaction conditions of 350° C., 25 bar (absolute) pressure, and WHSV of 2400 mL g$^{-1}$ h$^{-1}$ with H$_2$/CO$_2$ (5:1 molar) for 50 hrs. to carry out the overall reaction 3CO$_2$+ 10H$_2$→C$_3$H$_8$+6H$_2$O ($\Delta H_{623K}$=−270.2 kJ/mol C$_3$H$_8$) As shown in FIG. 34, a CO$_2$-to-propane selectivity of 74% and a butane selectivity of 11% with stable performance was obtained.

Example 17—Electrified Production of Olefins from CO$_2$

The Joule heating electrically conductive carbon network structures of the present disclosure may be utilized in an electrically resistive structured catalyst (ERSC) system to carry out the production of olefins from CO$_2$. As an illustrative example, ERSC reactors of a general type as described above in connection with electrified production of propane from CO$_2$ may be employed to carry out a single-step catalytic hydrogenation of CO$_2$ to lower olefins using ERSC, followed by catalytic olefin oligomerization using ERSC to produce kerosene-range olefins for sustainable aviation fuel.

Figure 35:
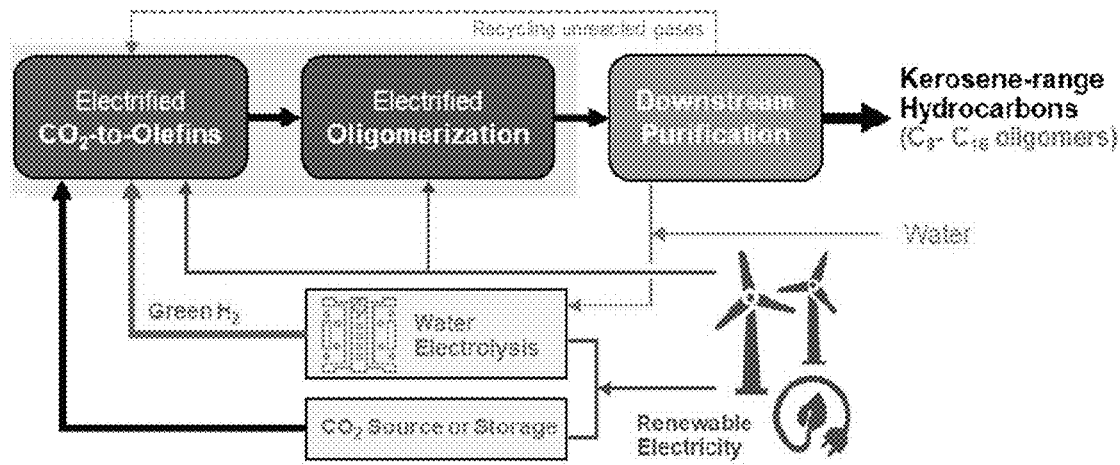
FIG. 35 is a schematic representation of a process system for production of olefins from $CO_2$ in reactors containing electrically resistive structured catalyst (ERSC) assemblies in which conversion catalyst is Joule heated by an electrically conductive carbon network in the assemblies, and a first reactor is employed to carry out a single-step catalytic hydrogenation of $CO_2$ to lower olefins, followed by catalytic olefin oligomerization in a second reactor to produce kerosene-range olefins for sustainable aviation fuel.
Figure 36:
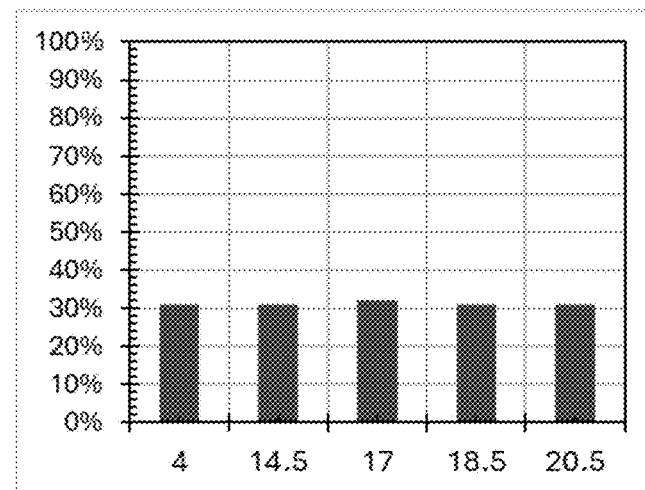
FIG. 36 is the $CO_2$ conversion vs time on stream profile with the $CO_2$ to olefins ECSM

A schematic representation of the corresponding process system is shown in FIG. 35, as comprising reactors containing electrically resistive structured catalyst (ERSC) assemblies in which conversion catalyst is Joule heated by an electrically conductive carbon network in the assemblies, with a first reactor being employed to carry out the single-step catalytic hydrogenation of CO$_2$ to lower olefins, and a second reactor downstream of the first reactor for conducting the catalytic olefin oligomerization to produce the kerosene-range olefins.

In this process system, renewable electricity is utilized to power a water electrolysis apparatus providing green hydrogen to the ERSC CO$_2$-to-olefins reactor, as well as powering the delivery of CO$_2$ to such reactor from a CO$_2$ source or storage facility containing CO$_2$. Such renewable electricity is also provided to the electrified CO$_2$-to-olefins reactor and to the electrified oligomerization reactor. In each of these reactors, the heating layers of the ERSC assemblies comprise an electrically conductive carbon network to which the renewable electricity is delivered by associated electrical circuitry from the renewable electricity source(s). The renewable electricity source(s) may be of any suitable type and may for example comprise wind turbines, photovoltaic solar installations, solar chimneys, wave action generators or other hydroelectric facilities, or geothermal installations, although the disclosure is not limited thereto.

The ERSC assemblies that are employed in the electrified CO$_2$-to-olefins reactor and electrified oligomerization reactor may be of any suitable type including the corresponding catalyst in association with heating material comprising an electrically conductive carbon network, and support structure for the assembly. The ERSC assemblies may for example be of a type as shown and described with reference to FIG. 1 herein, as comprising a monolith substrate on which are disposed, as sequential layers, a heating layer in direct contact with the monolith substrate and comprising the electrically conductive carbon network, a support layer in direct contact with the heating layer, and an active catalyst layer in direct contact with the support layer. Alternatively, the ERSC assemblies may comprise a monolith substrate on which are disposed a heating layer in direct contact with the monolith substrate, and an active catalyst layer in direct contact with the heating layer.

In the electrified $CO_2$-to-olefins reactor of the process system, the $CO_2$ from the $CO_2$ source or storage facility containing $CO_2$ is reacted with green hydrogen provided from the water electrolyzer, to selectively hydrogenate $CO_2$ to produce $C_2$-$C_4$ olefins. The Joule heating of the catalyst by the heating material comprising the electrically conductive carbon network can be carried out to produce optimum olefin product yield in the electrified $CO_2$-to-olefins reactor.

The reaction product comprising $C_2$-$C_4$ olefins that is produced in the electrified $CO_2$-to-olefins reactor is flowed from such reactor to the electrified oligomerization reactor in which the oligomerization catalyst in the ERSC assemblies is Joule heated by the heating material comprising the electrically conductive carbon network to which electrical current is flowed by associated electrical circuitry comprising electrodes receiving the renewable electricity in the circuitry. The oligomerization catalyst may be of any suitable type, and may for example comprise a zeolite olefin oligomerization catalyst, to convert the $C_2$-$C_4$ olefins in the gas received from the gas received from the $CO_2$-to-olefins reactor to kerosene-range olefins ($C_8$-$C_{16}$). The oligomerization catalyst that is used in the oligomerization reactor may be tuned based on the feed olefin and desired product distribution. No separation of unreacted paraffins, $CO_2$ or water, produced during the $CO_2$-to-olefins reaction, is required before the oligomerization in the oligomerization reactor, thus vastly simplifying the process flow sheet and dynamic operation of the process.

The reaction product discharged from the oligomerization reactor is flowed to a downstream purification apparatus in which kerosene-range olefins are purified, with unreacted gases being separated and recycled to the $CO_2$-to-olefins reactor, and water being separated and circulated to the water electrolyzer along with independently introduced water from a water source providing water for the process. The downstream purification apparatus may comprise a flash separator or other separation apparatus. The purified kerosene-range hydrocarbons comprising $C_8$-$C_{16}$ oligomers are discharged from the purification apparatus, and may be flowed to a storage facility or further processing facility for upgrading of the kerosene-range hydrocarbons comprising $C_8$-$C_{16}$ oligomers to provide the final product sustainable aviation fuel.

In an illustrative embodiment of the process for producing kerosene-range hydrocarbons from $CO_2$ and green hydrogen, $CO_2$ at a flow rate of 6.1 kg/second and green hydrogen at a flow rate of 0.85 kg/second are flowed to the $CO_2$-to-olefins $CO_2$ hydrogenation reactor for contacting in the reactor with the $CO_2$ hydrogenation catalyst in the ERSC assemblies therein, as Joule heated by the heat generated by the electrically conductive carbon network in the heating material of such assemblies. The Joule heating is controlled to provide temperature on the order of 320° C. at pressure of 30 bar to achieve 50% single pass $CO_2$ conversion of the feed $CO_2$ to the $CO_2$ hydrogenation reactor. The resulting reaction product components and carbon selectivity are as follows: ethylene, 20%; propylene, 50%; butylene, 7%; propane, 5%; methane, 11%; ethane, 3%; and carbon monoxide, 4%.

No separation step between the $CO_2$ hydrogenation reactor and the oligomerization reactor is required, and the $CO_2$ conversion reaction product is directly flowed to the oligomerization reactor in which Joule heat is generated by the electrically conductive carbon network in the heating material of the ERSC assemblies therein, so that the oligomerization catalyst is heated to temperature on the order of 200° C. at 30 bar pressure and achieves 95% single pass conversion of the olefin hydrocarbons in the gas mixture that is flowed to the oligomerization reactor, to produce kerosene-range hydrocarbons comprising $C_8$-$C_{16}$ oligomers.

The reaction product of the oligomerization reaction in the oligomerization reactor is discharged to a flash separator operated at temperature of 30° C. and 30 bar pressure to produce overhead gas including carbon dioxide, carbon monoxide, methane, ethane, propane, and small amounts of water vapor, ethylene, propylene, butylene, and dodecane, which is recycled to the $CO_2$ hydrogenation reactor, and liquid phase kerosene-range hydrocarbons comprising $C_8$-$C_{16}$ oligomers that is discharged from the system at a flow rate of 1.56 kg/second, and liquid phase water that is discharged from the flash separator at a flowrate of 4.83 kg/second. The system is operated so that overall $CO_2$ conversion is 97%, overall $CO_2$ to liquid hydrocarbon conversion is 77%, overall hydrogen conversion is 99.7%, and 63.1% of the hydrogen is converted to water.

Example 17: $CO_2$ to Olefins Production in Structured Catalyst

Figure 37:
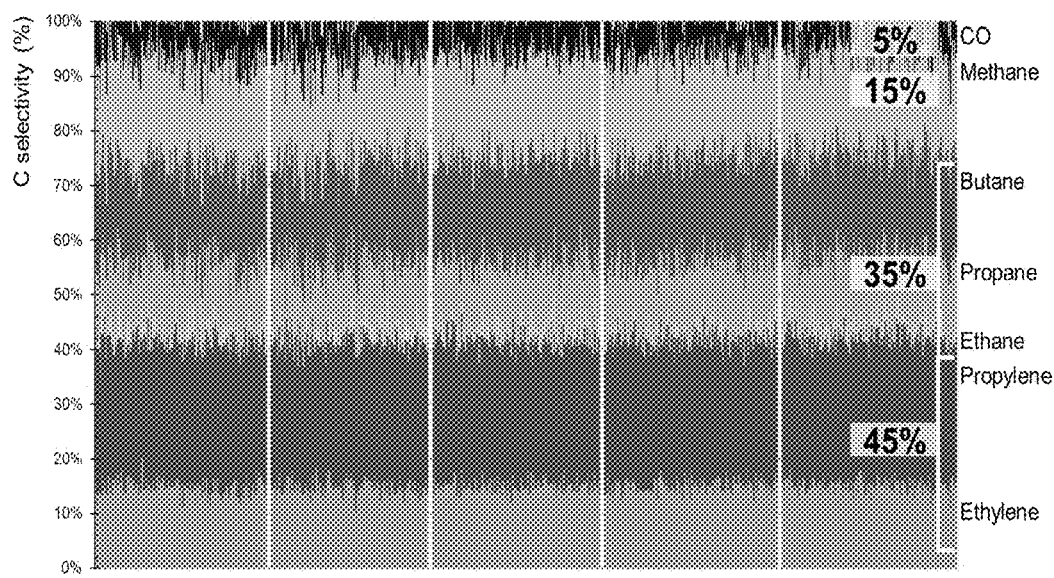
FIG. 37 is the hydrocarbon selectivity vs time on stream profile with the $CO_2$ to olefins ECSM
Figure 38:
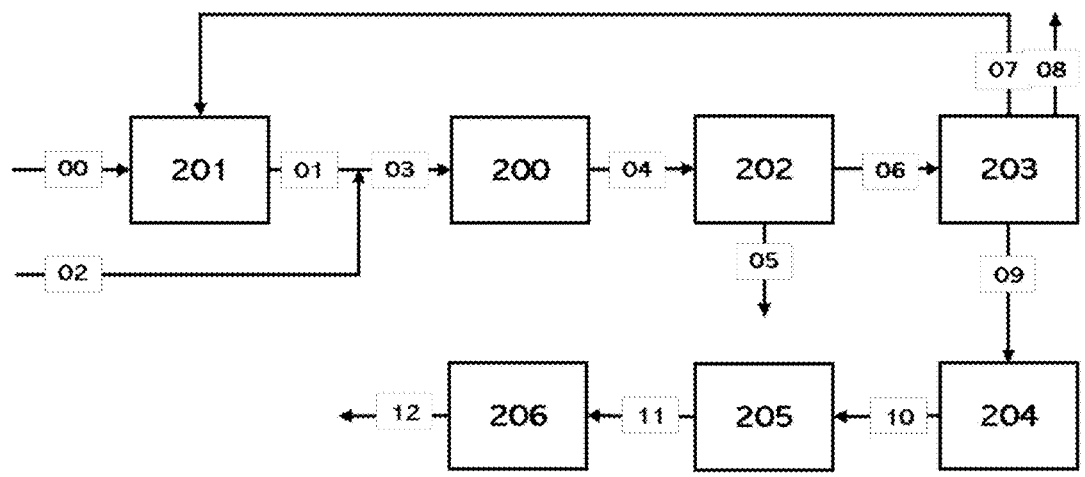
FIG. 38 illustrates the utilization of the electrified $CO_2$ hydrogenation reactor unit to produce liquid fuel, like gasoline, aviation fuel, diesel etc.

Fe/Zn catalyst was prepared by co-precipitation from the corresponding nitrate solutions in a base solution (like NaOH). Sample was collected and dried at 120° C. for 12 h, and then calcined in air at 400° C. for 4 h. Sample was then dipped in a $K_2CO_3$ solution, then dried and crushed to a 20-40 mesh size. The fixed-bed experiment was performed in a tubular reactor with 2 grams of catalyst material, mixed with 21 grams of inert SiC. Catalyst bed length was 5.1 cm, supported at the center of the reactor over a bed of quartz wool. Catalyst was reduced in hydrogen to activate the material at 400° C. and ambient pressure. The system temperature and pressure were stabilized at 320° C. and 20 bar (abs), respectively, the reaction step was initiated, for which a total gas flow of 43.3 mL/min was maintained, comprising 25 mL/min $H_2$ and 8.33 mL/min carbon dioxide ($CO_2$) along with 10 mL/min Ar as tracer gas. The feed ratio of $H_2$:$CO_2$ was maintained at 3:1, with a space velocity (GHSV) of 1000 $hr^{-1}$. The reaction was carried out for ~20 hours. The outlet gas concentrations were analyzed using an MKS Cirrus 2 mass spectrometer (MS). The results are summarized in FIGS. 37 and 38.

Results discussion: Over 95% carbon selectivity was observed for hydrocarbons with 30% single-pass $CO_2$ conversion. The reverse water gas shift reaction, yielding CO, was suppressed with a high selectivity towards olefins. The C selectivity has been observed to be constant over the 20-hr. period. Ethylene and propylene showed a combined selectivity of ~45%, with a butene selectivity of ~10%. The overall desired olefin products (C2-C4) show ~55% C selectivity.

Example 18—Electrified $CO_2$ Hydrogenation to Olefins for Production of Liquid Fuel This example shows the utilization of the electrified $CO_2$ hydrogenation reactor unit to produce liquid fuel, like gasoline, aviation fuel, diesel etc. The following description has reference to FIG. 38 and using the nomenclature of FIGS. 24 and 25. In the ensuing description, and the appertaining drawing, the following identification of reference numerals is applicable. 100—electrically heatable structures, multiple ones of which constitute 200—electrified $CO_2$ hydrogenation reactor (ERSM); 201—$CO_2$ compressor; 202—heat exchanger to cool the product, 203—light gas ($H_2$, CO, $CO_2$, $CH_4$) separation, 204—oligomerization unit, 205—hydrogenation unit to produce long-chain paraffins, 206—fractionation to required range of paraffins from the heavy components; 00—low pressure $CO_2$ feed; 01—compressed $CO_2$ feed; 02—high pressure $H_2$ feed; 03—overall combined reactor feed; 04—olefin containing product from 200; 05—condensed water; 06—cooled product gas, 07—recycled unreacted $CO_2$ and $H_2$, 08—purge gas primarily containing the inert $CH_4$ to avoid build-up, 09—light olefin-rich product (C2-C4), 10—oligomer-rich product from 204, 11—long-chain paraffin-rich product from 205, 12—final liquid fuel (gasoline, aviation fuel and/or diesel).

Example 19—Electrified Methane Pyrolysis for Crude Hydrogen

Figure 39:
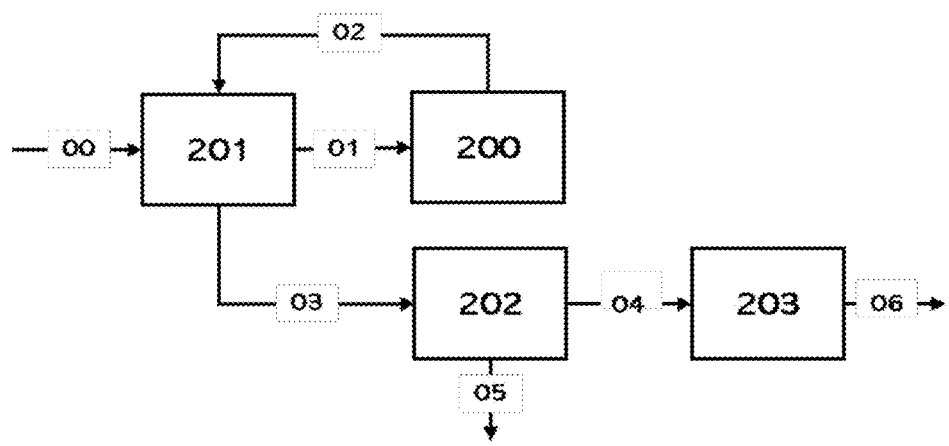
FIG. 39 illustrates the utilization of the electrified methane pyrolysis reactor unit to produce crude hydrogen (50-90 vol. % hydrogen), which can be used in power generation, hydrogenation reactions, glass manufacturing, heat treatment and annealing, metallurgical processes, and chemical production like methanol, syngas, and/or ammonia

This example shows the utilization of the electrified methane pyrolysis reactor unit to produce crude hydrogen (50-90 vol. % hydrogen), which can be used in power generation, hydrogenation reactions, glass manufacturing, heat treatment and annealing, metallurgical processes, and chemical production like methanol, syngas, and/or ammonia. The following description has reference to FIG. 39 and using the nomenclature of FIGS. 23 and 24. In the ensuing description, and the appertaining drawing, the following identification of reference numerals is applicable. 100—electrically heatable structures, multiple ones of which constitute 200—electrified methane pyrolysis reactor; 201—feed preheater; 202—gas-solid separation unit to remove solid carbon by-product, 203—heat exchanger to cool the product hydrogen gas; 00—CH4 or natural gas (with or without $CO_2$) or biogas; 01—pre-heated feed; 02—hot reactor product; 03—cooled reactor product containing hydrogen gas; 04—product gas after removal of solid carbon; 05—solid carbon product; 06—crude hydrogen product.

Example 20—Electrified Methane Pyrolysis for Pure Hydrogen

Figure 40:
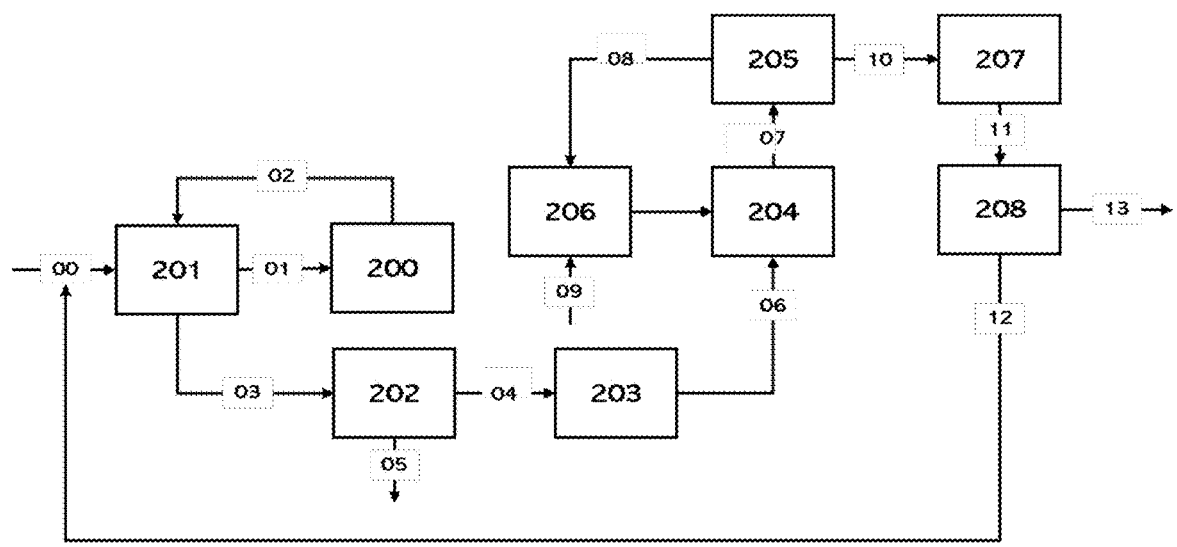
FIG. 40 illustrates the utilization of the electrified methane pyrolysis reactor unit to produce pure hydrogen (>99.9 vol. % hydrogen), which can be used as a fuel cell feed, in semiconductor manufacturing, pharmaceutical and fine chemical production, hydrogenation in food industry, aerospace and rocket propulsion applications, in metal production and nuclear reactor cooling, and production of chemicals like hydrogen peroxide, methanol, and ammonia.

This example shows the utilization of the electrified methane pyrolysis reactor unit to produce pure hydrogen (>99.9 vol. % hydrogen), which can be used as a fuel cell feed, in semiconductor manufacturing, pharmaceutical and fine chemical production, hydrogenation in food industry, aerospace and rocket propulsion applications, in metal production and nuclear reactor cooling, and production of chemicals like hydrogen peroxide, methanol, and ammonia. The following description has reference to FIG. 40 and using the nomenclature of FIGS. 23 and 24. In the ensuing description, and the appertaining drawing, the following identification of reference numerals is applicable. 100—electrically heatable structures, multiple ones of which constitute 200—electrified methane pyrolysis reactor; 201—feed preheater; 202—gas-solid separation unit to remove solid carbon by-product, 203—heat exchanger to cool the product hydrogen gas; 204—water gas shift reactor to remove remnant CO, 205—heat exchanger to further cool the product gas, 206—heater to generate steam, 207—compressor to pressurize the feed to 208—hydrogen pressure swing adsorption unit; 00—CH4 or natural gas (with or without $CO_2$) or biogas; 01—pre-heated feed; 02—hot reactor product; 03—cooled reactor product containing hydrogen gas; 04—product gas after removal of solid carbon; 05—solid carbon product; 06—crude hydrogen product, 07—CO-free product gas, 08—condensed water, 09—boiler feed water, 10—cooled product gas, 11—compressed hydrogen-rich product gas, 12—tail gas for 208, to be recycled, containing unreacted $CH_4$ and $CO_2$, 13—pure hydrogen gas (>99.9 vol. %).

Example 21—Electrified Production of Renewable Natural Gas from $CO_2$

The Joule heating electrically conductive carbon network structures of the present disclosure may be utilized in an electrically resistive structured catalyst (ERSC) system to carry out a process for the production of renewable natural gas (RNG) from $CO_2$.

In such production process, dual functional materials (DFMs) are utilized for sorptively removing $CO_2$ from a gas or environment containing same, and converting such $CO_2$ into methane using renewable or waste hydrogen for regeneration to produce a green methane product as renewable natural gas. This $CO_2$ sorptive removal and conversion is carried out in a single process operation, in which the energy input for sorbent regeneration can be substantially reduced by heat from the exothermic reaction of $CO_2$ methanation, so that the sorbent regeneration and $CO_2$ methanation are synergistically integrated. The electrically conductive carbon network of the present disclosure is advantageously incorporated in the dual functional material to integrate Joule heating and thermal management at the DFM surface. The DFM comprises a $CO_2$ sorbent and a $CO_2$ conversion catalyst co-located on a high surface area carrier to achieve maximal conversion of the sorbed $CO_2$. Such dual function material is disposed in a reactor through which $CO_2$-containing gas is flowed for adsorption of $CO_2$ therefrom by the $CO_2$ sorbent, to produce $CO_2$-reduced gas that is discharged from the reactor. Subsequent to such adsorption, the reactor interior volume is evacuated to remove any oxygen present therein, hydrogen is introduced, and the DFM is heated by the electrically conductive carbon network comprised in the DFM. As a result, $CO_2$ migrates to the catalyst sites on the DFM surface, facilitating a Sabatier reaction ($CO_2$+ $4H_2 \leftrightarrow CH_4 + 2H_2O$ ($\Delta H° = -165$ kJ/mol) in which $CO_2$ is converted to methane or synthetic natural gas.

The reactor effluent, containing methane, water, and potentially other species such as $H_2$ and $CO_2$, is flowed to a separation process to concentrate and compress the methane for subsequent transport and/or use.

The dual function material (DFM) for $CO_2$ sorption and conversion to methane ($CH_4$), or renewable natural gas (RNG), or synthetic natural gas (SNG), is comprised of a sorbent, a conversion catalyst, and a support for enhancing surface area, with an electrically conductive carbon network provided in the DFM structure and arranged to selectively heat the sorbent and catalyst to desorb $CO_2$ sorbate from the sorbent and to effect catalytic conversion of the $CO_2$ to methane.

In the $CO_2$ sorption and conversion process, $CO_2$ sorption is initially carried out, until the $CO_2$ sorbent is loaded with the $CO_2$ sorbate to a predetermined extent. During the conversion operation, hydrogen is introduced to the reactor as a co-reactant for conversion of $CO_2$ to methane (methanation) and heat is supplied to the DFM by inputting electrical current to the electrically conductive carbon network in the DFM structure to effect Joule heating of the $CO_2$ sorbent for desorption of $CO_2$ and Joule heating of the conversion catalyst to facilitate the $CO_2$ conversion process.

Multiple reactors containing the DFM assemblies may be employed to achieve continuous production of methane, in which each of the multiple reactors undergoes a cyclic and repeated sequence of steps of adsorption, purge, methanation, and purge, and wherein at least one of the multiple reactors at any time is conducting methanation and discharging the methane product, while other(s) of the multiple reactors are undergoing cycle steps other than methanation or are in standby mode awaiting resumption of cycle steps including methane production. The multiple reactors for such purpose may be joined by valved manifolds to provide introduction of $CO_2$-containing gas, introduction of hydrogen, and introduction of purge gases, in the corresponding sequence steps, and with discharge of the methane product gas, and discharge of non-methane effluents, in corresponding sequence steps. In the valved manifold arrangement of multiple reactor vessels, the valves in respective inlet and outlet manifolds may be controlled by valve controllers according to a cycle time program, such as by control signals transmitted to the various valve controllers from a central processor unit (CPU) that is programmably arranged for carrying out the cycle time program.

Any suitable $CO_2$ conversion catalyst can be used in the methane production process. Useful catalysts may comprise platinum group metals, transition metals, or combinations thereof. Examples include ruthenium, rhodium, palladium, silver, osmium, iridium, platinum, gold, iron, cobalt, nickel, copper, and zinc. The catalyst desirably maintains its active catalyst form throughout the process or is easily converted to its active form during routine operation. Ru is an advantageous catalyst material due to its favorable redox properties. Although it is easily oxidized in the presence of oxygen-containing feed gases, it can be easily reduced to its catalytically active by hydrogen at relatively mild temperatures, e.g., on the order of 150° C.

The $CO_2$ sorbent that is employed in the DFM for carrying out $CO_2$ adsorption for the methanation process may be of any suitable type capable of reversible $CO_2$ sorption. Useful sorbents for such purposes include oxides, carbonates, and/or bicarbonates of Group 1 and 2 elements, such as sodium, calcium, potassium, barium, cesium, lithium, magnesium, or combinations thereof, from which adsorbed $CO_2$ is desorbable at temperature consistent with the target methanation temperature carried out in the process such that $CO_2$ is available for catalytic conversion.

In the DFM material, the active sorbent and catalyst species may be dispersed on a high porosity, high surface area carrier or support, formed of suitable material such as alumina, silica, silica/alumina, activated carbon, titania, zirconia, or zeolite, advantageously having high porosity with significant mesoporosity and a large surface area on and/or in which a washcoat can be deposited. For example, a mesoporous structure (having 2-50 nm pore diameter) with pore volume of at least 0.5 ml/gram and surface area of at least 150 $m^2$ per gram, preferably at least 300 $m^2$ per gram, may be utilized as a support.

In various embodiments, the DFM assembly may be provided on a structured substrate having a resistive heating layer comprising an electrically conductive carbon network on and in direct contact with the structured substrate. A support or carrier layer may be provided on and in direct contact with the resistive heating layer, with the $CO_2$ sorbent and methanation catalyst on and/or in the support or carrier layer, and preferably dispersed throughout the support or carrier layer.

The active catalyst may be provided at any suitable loading in the DFM article, e.g., a loading of at least 0.25 weight percent of the of the total mass of catalyst, sorbent, and support in the DFM article. In various embodiments, the active catalyst may be a ruthenium methanation catalyst provided at a loading of 0.25-1 weight percent, based on total mass of catalyst, sorbent, and support in the the DFM article. In various embodiments, the loading of the sorbent (carbonate equivalent) is above 10 weight percent, taste on the total mass of catalyst, sorbent, and support in the DFM article, with the molar ratio of sorbent catalyst being greater than 10. In various embodiments having high carrier surface area, loadings of greater than 20 weight percent of sorbent, based on total mass of catalyst, sorbent, and support in the DFM article, are usefully employed.

Dispersion of the $CO_2$ sorbent and methanation catalyst on and/or in the support or carrier of the DFM article is advantageous to maximize operational availability of sorbent and catalyst sites. As previously described, mesoporosity with high pore volume and high surface area are desirable to enable high dispersion. A high degree of dispersion can be achieved during material preparation, e.g., in the addition of aqueous precursor salts to the porous structure of the carrier. The provision of desired active surface species may also be enhanced through thermal treatment, as for example at temperatures at or above 300° C. Advantageous active surface species may also be provided by specific additives. For example, $K_2CO_3$ impregnated on alumina results in both low (100° C.) and high (300° C.) desorption of $CO_2$ due to the formation of $KAl(CO_3)_2(OH)_2$ as an additional surface species. Adsorption of $CO_2$ may also be enhanced by specific interactions between the sorbent and support materials. For example, interactions between sodium oxide sorbents and alumina support provide interfacial sites that favor $CO_2$ adsorption.

The DFM may be prepared with the methanation catalyst being the final component added to the material, to avoid blocking catalyst active sites that may otherwise be occluded by subsequently added species. In certain instances, however, such as when achievement of an immobile, insoluble phase of the sorbent is not possible, it may be necessary to load the catalyst prior to the sorbent.

The geometric and conformational character of the DFM support can depend on or be affected by the requirements of the $CO_2$ adsorption and methanation process. In various embodiments, the support may advantageously take the form of a powder, pellet, or extrudate that is employed to form a bed of material for use in the $CO_2$ adsorption and methanation process. In such cases, the active species or their precursors may be loaded into and dispersed throughout the pores of these carrier forms, e.g., by impregnation of the carrier with solutions containing dissolved precursors of the catalyst and sorbent species, in which wet impregnation (co-impregnation or serial impregnation) is carried out using aqueous solutions of the precursors, with subsequent calcination and reduction of the prepared material to yield the desired composition of active species.

In various embodiments, three-dimensional structured material supports providing high throughput of gas and low pressure drop may be employed for the DFM article, in which the material is optimized for gas contacting with high geometric surface areas, e.g., >2500 $m^2/m^3$, to enhance mass transfer kinetics and accommodate available reactor volume. Depending on specific embodiment, favorable properties of the structured substrate material may include high porosity, durability, high mechanical strength, and electrical insulative character. Examples of structured supports that may be employed include monoliths, which may be formed of or comprise ceramic, cordierite, mullite, alumina, silica/alumina, silica, silicon carbide, magnesia, zirconia, titania, metal, carbonaceous material, other organic or inorganic material, or combinations of two or more of the foregoing, as well as laminates, non-woven fabrics (e.g., formed of or comprising a polymer, carbon fibers, etc.), meshes, foams, three-dimensional printed structures, and filters, although the disclosure is not limited thereto.

The material of the structured support may be coated using a slurry washcoating process or other suitable technique to apply DFM components thereto, or such components may be coated on the structured support in a suitable coating to adhere DFM particles to the structured support.

In embodiments in which a monolithic substrate is used, a cell density of between 200 and 1200 cells per square inch is preferred, with wall thicknesses between 1.5 and 8 mil, although other cell densities and wall thicknesses may be advantageous in other embodiments. Monolithic substrates may be coated using an aqueous slurry of carrier powder that is washcoated on the monolith support. Binders may be employed to enhance interaction and adhesion of washcoated particles to the structured support. When aqueous summaries are employed, excess slurry may be removed from the monolith using a stream of high velocity air or other gas, with the coated monolith being dried and calcined at temperature of at least 500° C. to ensure adhesion of the washcoat layer to the monolith substrate. Active species and/or their precursors can be added to the washcoat slurry or can be impregnated in the calcined washcoat via wet impregnation techniques, with subsequent drying and calcination of the resulting composite substrate, to decompose the catalyst and sorbent precursors to active catalyst and sorbent species, respectively.

In specific implementations, washcoat loadings of 2 g/in.$^3$ or higher may be employed to maximize volumetric productivity of the process, however the thickness of the resulting washcoat layer should not impede the diffusion of reactive species into such layer. Multiple washcoat story applications may be necessary to achieve target loadings, with drying being carried out between successive applications of the washcoat slurry.

In the DFM article, Joule heating is delivered to the active material and is controlled to accommodate the required temperature change between CO2 adsorption and catalytic methanation conversion conditions, utilizing an electrically conductive carbon network that is integrated with the DFM. The electrically conductive carbon network is formed and integrated so that it is resistant to oxidation reduction at anticipated process temperatures (e.g., in a range of 0-400° C.), exhibits stable resistance upon repeated inputs and termination of current, and repeated heating and cooling conditions, as well as resistance to degradation through side reactions, particularly those catalyzed by the specific catalyst and sorbent used in the DFM.

The electrically conductive carbon network may be formed as a carbon layer that is formed from a precursor of phenolic resin or polymer solution, which may be diluted with a solvent such as deionized water in varying ratios depending on the target resistivity desired to be present in the final DFM article. After the phenolic resin or polymer solution is coated on the substrate, the coated substrate may be pyrolyzed in inert atmosphere to form electrically conductive carbonized material on and/or in the substrate, as a macroscopically continuous electrically conductive carbon network into which electrical energy can be inputted to produce localized Joule heating. The electrically conductive carbon network material correspondingly provides an electrical Joule heating function as well as a supporting function for additional components that may be added to the substrate.

Thus, the electrically conductive carbon network is a constituent of the DFM structured material article, and in most embodiments, the electrically conductive carbon of such network is provided in a layer beneath the active material sorbent and catalyst species so that the electrically conductive carbon network layer is in intimate contact with the DFM. In some applications, the sorbent material may be of such character as to enable it to replace the catalyst support that may otherwise be required for the active catalyst species of the DFM. Further, to the extent that the electrically conductive carbon network provides a significant reinforcing or supportive structure function, it may eliminate the need for separately applied base supports that would otherwise be required.

In various embodiments, the electrically conductive carbon network can be extruded with the catalyst and/or sorbent carrier to form pellets or extrudates into which the active catalyst and/or sorbent species can be impregnated.

In various embodiments, the electrically conductive carbon network itself may be of such character as to serve as a structured substrate for the DFM, and can be synthesized in a three-dimensional form. Illustrative geometries of such electrically conductive carbon network structured substrates may include monoliths, non-woven carbon fabrics, carbon meshes, carbon foams, or three-dimensional printed carbon structures. The geometric surface area of such structures is desirably greater than 2500 m$^2$/m$^3$, and desirably includes porosity comprising pores of appropriate size, e.g., at least 10 μm diameter pores.

For other support geometries, such as non-woven fabrics, washcoating processes may also be susceptible of application to load the support structure with active species and/or their precursors. Alternative coating processes may be employed, including for example the loading of powders, granules, or pellets using a chemically, thermally, and electrically stable adhesive or binder material.

In various embodiments, pre-treatment methods may be employed to obtain desired active species for carrying out the process, such as treatment of precursor species of the DFM active species in pure or deluded hydrogen at temperature higher than the maximum operating temperature of the $CO_2$ sorption and catalytic methanation process.

Figure 41:
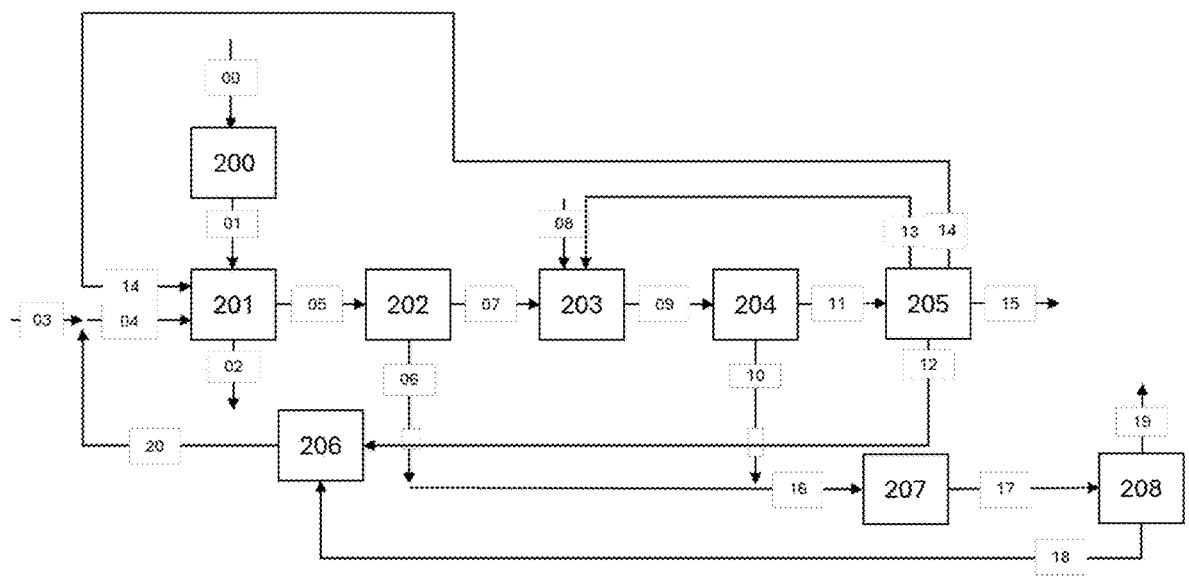
FIG. 41 is a schematic depiction of a $CO_2$ sorption and methanation process system according to one embodiment of the disclosure, including a $CO_2$ sorption and methanation reactor 201 that alternates between $CO_2$ sorption and $CO_2$ methanation modes of operation.

FIG. 41 is a schematic depiction of a $CO_2$ sorption and methanation process system according to one embodiment of the disclosure, including a $CO_2$ sorption and methanation reactor 201 that alternates between $CO_2$ sorption and $CO_2$ methanation modes of operation.

In the $CO_2$ sorption mode, a fan 200 blows air, in streams 00 to 01, containing 400-1000 ppm $CO_2$, to the reactor 201. $CO_2$-reduced air, in stream 02, is discharged from the reactor during the $CO_2$ sorption step. The temperature at which this occurs is dictated by the temperature of the feedstock air in stream 01, and the temperature of the reactor 201 at the start of the sorption step. After the adsorption step, oxygen in the reactor must be evacuated before introducing hydrogen in stream 04. This is accomplished with a vacuum purge, and alternatively can be achieved with an inert purge, with inert gas such as nitrogen.

In the methanation conversion mode, hydrogen in stream 04, as reactive gas, is introduced to the reactor 201, and the ERSC material is heated to at least 200° C. to allow for desorption and conversion of previously adsorbed $CO_2$ via the Sabatier reaction. Hydrogen in stream 03 can be supplied to the process from any of a variety of sources, with renewable or low-carbon hydrogen being preferred. Renewable and low-carbon hydrogen include hydrogen generated using a PEM electrolyzer powered with low-carbon electricity. Waste hydrogen from industrial sources can also be used and may contain trace amounts of light hydrocarbons. Recycled hydrogen or hydrogen generated onsite from recycled water 20 can also be fed into the reactor 201. The $CO_2$ methanation conversion step may be performed at atmospheric pressure, or it may be performed at elevated pressure to facilitate Sabatier kinetics. Accordingly that, hydrogen may be introduced at low or high pressure. In some embodiments, $CO_2$ in stream 18 may be co-fed with hydrogen or injected into the reactor during $CO_2$ methanation conversion.

At the conclusion of the $CO_2$ methanation conversion step, the reactor is cooled to ambient temperature. This can be achieved through passive cooling or active cooling from the interior or exterior of the reactor 201. Active cooling can be achieved by flowing air in stream 01 through the reactor to reduce the temperature of the DFM. In this case, a vacuum purge is used to evacuate the reactor of residual hydrogen before introducing air, to avoid creating a flammable mixture. Alternatively, the reactor can be cooled completely or partially with crude RNG before pulling vacuum and proceeding with the introduction of air.

In the downstream process, the reactor effluent generated during the $CO_2$ methanation conversion operating mode is flowed to a dedicated unit 202 for condensing water in stream 06 that is liberated from the DFM and/or water that is generated as a side-product of the $CO_2$ methanation conversion reaction.

Once the effluent is sufficiently dried, an optional polishing operation conducted in vessel 203 catalytically converts unreacted $CO_2$ into methane via the Sabatier reaction. The DFM can serve as the polishing catalyst in this unit. Alternatively, any commercially available methanation catalyst appropriate to the process can be used. It is preferred that the polishing catalyst operates at near-atmospheric pressure. If necessary, the polishing operation can be fed additional hydrogen in stream 08, supplied to the process or from a recycle stream or an on-site hydrogen production operation.

The effluent of the polishing methanator/reactor will be composed mainly of $CH_4$, $H_2O$, and $H_2$, and may also contain some trace $CO_2$. Subsequently, this effluent will be sent to a multistage separation process, beginning with water knock out apparatus 204, where water in stream 10 will be recovered. In a subsequent process apparatus 205, which may be composed of constituent units, unreacted $H_2$ in stream 12 will be recovered for compression by compressor 206 and used as a recycle feed in stream 20, and $CH_4$ in stream 15 will be purified and compressed for distribution. Residual, unreacted $CO_2$ in stream 13 can optionally be fed into the polishing operation or, in stream 14, to the DFM reactor to convert it to $CH_4$.

In various embodiments, a water treatment process apparatus 207 may be co-located to purify water from the water knockout operations (process units 202 and 204, and streams 06 and 10) to a suitable standard for input in stream 17 to water electrolyzer 208, whereby $H_2$ can be generated on-site for the $CO_2$ methanation conversion process. In various embodiments, renewable electricity can be used for electrolysis, whereby the product will be green $H_2$. In various embodiments, the water can be upgraded for sale as a co-product. $H_2$ generated from electrolyzer, in stream 18, can be used as a feedstock or feedstock supplement to the DFM $CO_2$ sorption and methanation conversion process.

The DFM $CO_2$ sorption and methanation conversion process thus is electrified to enable the integration of low-carbon electricity and a minimal carbon footprint, with the DFM having intrinsic heating capabilities provided by the electrically conductive carbon network, being electrified and heated by passing current through the electrically conductive structured material (ECSM) comprising the DFM material.

Figure 42:
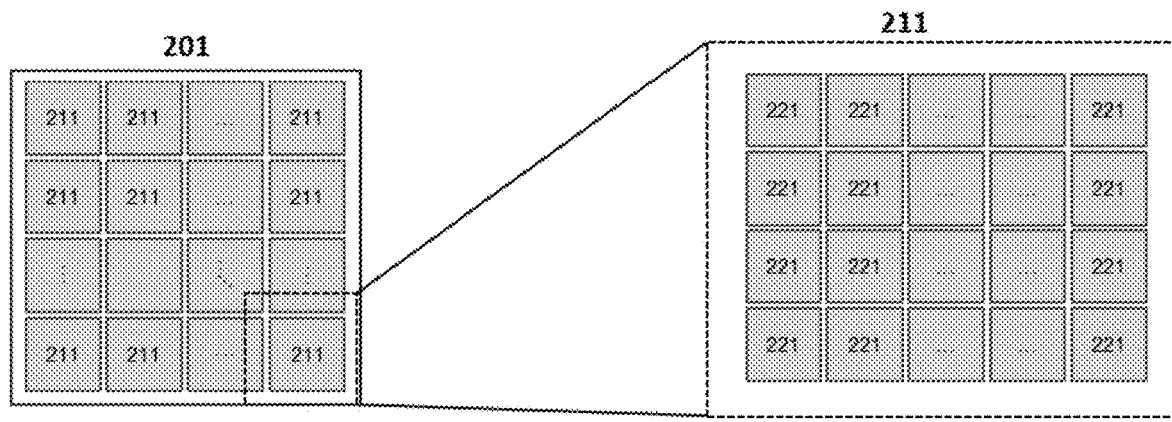
FIG. 42 is a schematic representation of DFM structured material assemblies (SMAs) in a DFM reactor, wherein the DFM structured material assemblies may optionally be constituted as comprising an array of smaller DFM structured material assemblies.

FIG. 42 is a schematic representation of DFM structured material assemblies (SMAs) 211 in the DFM reactor 201, wherein the DFM structured material assemblies 211 may optionally be constituted as comprising an array of smaller DFM structured material assemblies 221. The DFM structured material assemblies will operate in the previously described operating sequence, to carry out the successive $CO_2$ sorption and methanation conversion operations in the overall sequence of operating moods including $CO_2$ sorption, post-sorption purge, heating, methanation, cooling, post-methanation purge. To achieve continuous methane production, some DFM SMAs may be in the $CO_2$ sorption mode while others are in the $CO_2$ methanation conversion mode. In various embodiments, all DFM SMAs may be in different operating modes with at least one in the $CO_2$ methanation conversion mode.

Figure 43:
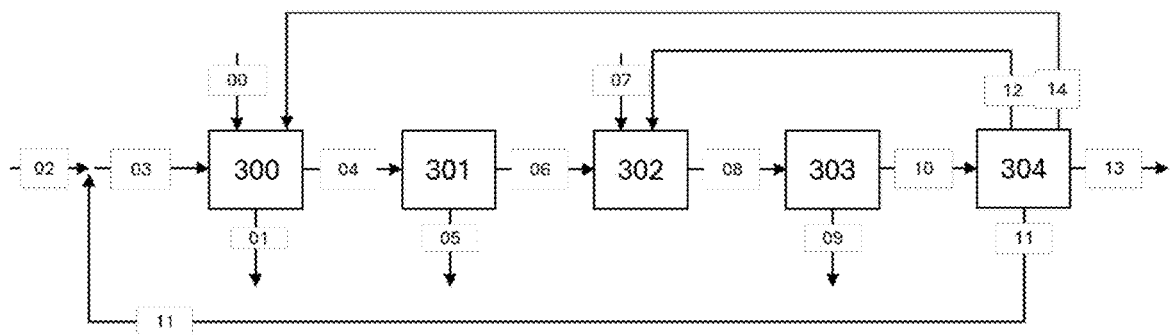
FIG. 43 is a schematic representation of a DFM process system, in which a $CO_2$-containing commercial or industrial effluent stream is fed to a DFM reactor for $CO_2$ sorption and methanation conversion.

FIG. 43 is a schematic representation of a DFM process system, in which a $CO_2$-containing commercial or industrial effluent in stream 00 is fed to the DFM reactor 300. The concentration of $CO_2$ in such effluent stream varies greatly depending on the source. By way of example, effluents derived from fossil fuel combustion for power generation may contain 3-15 vol. % $CO_2$, effluents from steel mills may contain 15 vol. % $CO_2$, bioenergy generation effluents may contain 3-8 vol. % $CO_2$, and cement production effluents may contain 20 vol. % $CO_2$). The temperature of the effluent stream will also vary depending on the upstream process from which it derives. Therefore, adsorption may be initiated within a wide range of temperatures depending on the effluent stream source, distance from the effluent stream source, and post-process treatments that the effluent stream undergoes. During adsorption, a $CO_2$-reduced exhaust stream 01 exits the reactor. It is preferred that the process is integrated with a thermal management system to control the exotherm that is generated during $CO_2$ adsorption (and $H_2O$ adsorption).

$H_2$ is provided to the system in stream 02 and is mixed with recycled $H_2$ from downstream separation in stream 11. After an inert purge or vacuum purge to evacuate the reactor of oxygen, $H_2$ in stream 03 is introduced to the reactor and the DFM bed is heated to at least 200° C. by the electrically conductive carbon network in the DFM bed so catalytic $CO_2$ methanation can proceed. In various embodiments, $H_2$ may be available from co-located process(es). For example, the $CO_2$ methanation conversion step may apply a waste $H_2$ stream available at the process site that might otherwise be burned for low-grade heat.

The DFM reactor exhaust generated during $CO_2$ methanation conversion is sent to a cooling apparatus 301 to cool the stream and condense water vapor that desorbed during heating or was produced during methanation, with the condensed water being discharged in stream 05. The resultant water-reduced mixture discharged in stream 06 contains $H_2$, $CO_2$, and $CH_4$. A polishing unit 302 may be used to convert unreacted $CO_2$ to methane. This unit can be optionally fed additional $H_2$ in stream 07 and additional $CO_2$ recovered from downstream separations in stream 12. Heat integration is necessary to manage the exotherm generated during methanation of $CO_2$ in this co-fed process. The effluent in stream 08 is fed to a subsequent separation unit 303 to condense and recover additional water generated during the polishing step, with the recovered water being discharged in stream 09. Residual $CO_2$ in stream 12, and unreacted hydrogen in stream 11, are recovered and diverted to a final separation apparatus 304, and pure methane in stream 13 is generated for sale/offtake/injection to a pipeline.

Adsorption may be curtailed to maximize the bed temperature (as afforded by the adsorption exotherm) and minimize the heat input required to reach $CO_2$ methanation conditions, although the Joule heating capability of the electrically conductive carbon network in the structured material assembly article can compensate any needed heat for the $CO_2$ desorption and methanation operations. Air containing oxygen may be used to cool the DFM after the methanation step, where the final bulk temperature may be as low as 200° C. or as high as 350° C., but higher surface temperatures may occur from localized exotherms due to catalyzed methanation at the material surface.

Example 23—Demonstration of DFM Operation with Integrated Resistive Heating

A carbon-coated monolith was washcoated with Ru, $Na_2CO_3/Al_2O_3$ DFM (washcoat loading=3.97 g/in³, 0.75 in diameter×1.5 in length, 400 cpsi, 7 mil wall thickness) and subjected to cyclic DFM cycles with cycle steps outlined in Table 7. It should be noted that the duration of $CO_2$ adsorption was restricted to 1 hour, and results demonstrated partial cyclic capacity.

TABLE 8

Example of $CO_2$ adsorption and methanation cycle conditions demonstrated in the laboratory

| Step no. | Description | Temperature (° C.) | Gas | Flow rate, dry (sccm) | Duration |
|---|---|---|---|---|---|
| 1 | Adsorption | Ambient | 400 ppm air + $H_2O(g)$ | 1000 | 1 hour |
| 2 | Purge | Ambient | $N_2$ | 100 | 10 minutes |
| 3 | Heating | 30° C./minute | $H_2$ | 200 | approximately 10 minutes |
| 4 | Methanation | 300° C. | $H_2$ | 200 | 20 minutes |
| 5 | Cool down | | $N_2$ | 100 | until 35° C. was reached |

Figure 44:
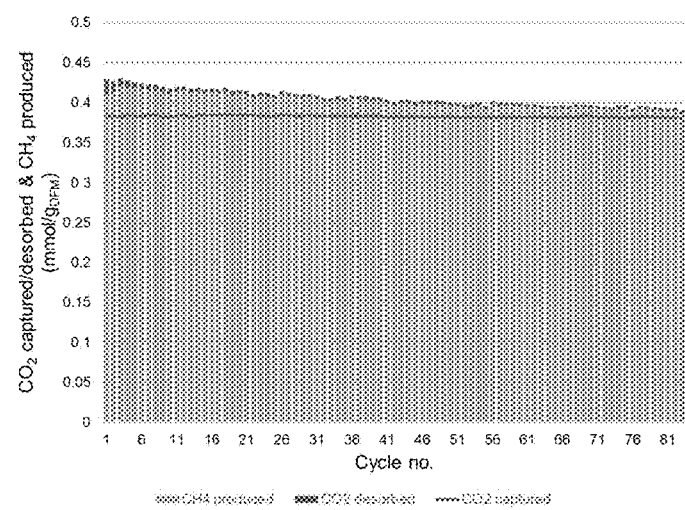
FIG. 44 is a graph of partial DFM capacity cycles with $CO_2$ adsorbed, $CO_2$ desorbed, and $CH_4$ produced in mmol/$g_{DFM}$ as a function of number of cycles.

Over 80 cycles were performed during this screening study, and results are shown in FIG. 44, which is a graph of partial DFM capacity cycles with $CO_2$ adsorbed, $CO_2$ desorbed, and $CH_4$ produced in mmol/$g_{DFM}$ as a function of number of cycles. The sample demonstrated excellent stability throughout testing. The average $CO_2$ captured during these partial capacity tests was 0.38 mmol/$g_{DFM}$ and the average $CH_4$ produced was 0.40 mmol/$g_{DFM}$ (1.76 wt % $CO_2$). Minimal $CO_2$ desorption was observed during these tests (0.005 mmol/$g_{DFM}$), resulting in a $CO_2$ conversion of nearly 99%. These data show that capture and conversion can be achieved repeatably with rapid Joule heating of 30° C./min.

These results are scalable and have been demonstrated at the bench scale using a cordierite monolith (5.25" diameter× 2.83" length) with a previous iteration of the carbon layer. The monolith was coated with Ru and $Na_2CO_3$ precursors and treated in situ to decompose the precursor salts and derive the desired DFM composition before initiating cycling. Cycle conditions are given in Table 9, and results are given in FIG. 45.

TABLE 9

Bench cycle conditions for integrated direct air capture and methanation using resistively heated DFM

| Step no. | Description | Temperature (° C.) | Gas | Flow rate, dry | Duration |
|---|---|---|---|---|---|
| 1 | Adsorption | 45 | 400 ppm air + $H_2O(g)$ | 100 SLPM | 1 hour |
| 2 | Purge | 45 | $N_2$ | 1000 sccm | 20 minutes |
| 3 | Heating | 5° C./min | $H_2$ | 1000 sccm | approximately 45 minutes |
| 4 | Methanation | 300° C. | $H_2$ | 1000 sccm | 20 minutes |
| 5 | Cool down | | $N_2$ | 1000 sccm | until 45° C. was reached |

Figure 45:
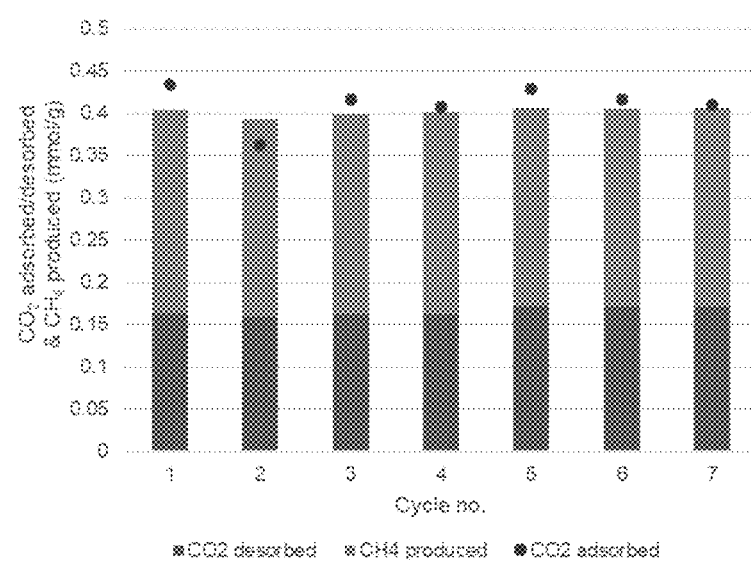
FIG. 45 shows the results of preliminary humid cycles on a bench DFM unit, in which cycles consisted of adsorption (100 SLPM air+~2% $H_2O$, 1 hr, 45° C.), purge (1000 sccm $N_2$, 20 min, 45° C.), and methanation (1000 sccm $H_2$, 30° C./min to 300° C., 1 hour isothermal hold).

FIG. 45 shows the results of preliminary humid cycles on a bench DFM unit. Cycles consisted of adsorption (100 SLPM air+~2% $H_2O$, 1 hr, 45° C.), purge (1000 sccm $N_2$, 20 min, 45° C.), and methanation (1000 sccm $H_2$, 30° C./min to 300° C., 1 hour isothermal hold).

Example 24—Operating Sequence for $CO_2$ Sorption and Methanation Embodiments (DFM)

The DFM reactor operates in a process that alternates between $CO_2$ sorption and $CO_2$ methanation conversion modes. Due to the cyclic nature of this two-mode process, a DFM facility would employ an array of fans 200 and DFM reactors 201 (FIG. 39) operating with offset cycle timing to produce a continuous product stream of renewable methane. The number of reactors and the cycle timing would depend on the production capacity of the facility, and the process cycle would contain the following steps and elements. The general ranges of process cycle conditions would typically follow those listed in Table 9. An example of specific cycle conditions that have been demonstrated in the lab is presented in the earlier Example 11.

1. In-situ material pre-treatment(s)
2. $CO_2$-containing air is flowed into the reactor and contacts the DFM. Air is flowed until the desired level of $CO_2$ sorption is reached or the maximum allowable $CO_2$ breakthrough is reached. It may be preferred to shorten the adsorption step to maximize conversion of desorbate $CO_2$ in the DFM reactor.
3. Air flow is discontinued. An inert purge or, preferably, a vacuum purge is used to reduce the $O_2$ level in the reactor.
4. Hydrogen is introduced to the reactor.
5. The reactor is electrically heated by intrinsic (Joule) heating so that selective heating of the DFM occurs. Hydrogen does not need to be flowing through the reactor, but hydrogen should be present in the reactor.
6. The reactor can be pressurized during methanation.
7. The $H_2$:$CO_2$ molar ratio fed into the reactor should be at least 4:1 to achieve minimum conversion of $CO_2$ to $CH_4$.
8. $CO_2$ that desorbs from the DFM during the methanation step, before methanation light off temperature is reached (200-300° C.), and leaves the reactor, can be recycled to the reactor inlet when the methanation light off temperature is reached. Unconverted $CO_2$ that leaves the reactor can be directed to another reactor that has reached or surpassed the methanation light off temperature. It may be held in a holding tank before being directed to the other reactor.

9. The flow of $H_2$ should be optimized to maximize $CH_4$ product purity and methanation kinetics.

10. After the conclusion of methanation, the reactor effluent is directed to downstream separation and purification processes

TABLE 10

General Ranges of Cycle timing and conditions

| Step no. | Description | Temperature (° C.) | Gas | Flow rate, dry (sccm) | Duration |
|---|---|---|---|---|---|
| 1 | Adsorption | | $CO_2$-containing air 400-1000 ppm $CO_2$ | 1000 | 1 hour |
| 2 | Purge | Ambient | $N_2$ | 100 | 10 minutes |
| 3 | Heating | 30° C./min | $H_2$ | 200 | approximately 10 minutes |
| 4 | Methanation | 300° C. | $H_2$ | 200 | 40 minutes |
| 5 | Cool down | | $N_2$ | 100 | until 35° C. is reached |

While the disclosure has been set forth herein in reference to specific aspects, features and illustrative embodiments, it will be appreciated that the utility of the disclosure is not thus limited, but rather extends to and encompasses numerous other variations, modifications, and alternative embodiments, as will suggest themselves to those of ordinary skill in the field of the present disclosure, based on the description herein. Correspondingly, the disclosure as hereinafter claimed is intended to be broadly construed and interpreted, as including all such variations, modifications, and alternative embodiments, within its spirit and scope.

What is claimed is:

1. A joule heating structure, comprising a three-dimensional substrate having an electrically conductive carbon network coated on a surface of the substrate, wherein the electrically conductive carbon network has a G/D Raman spectral intensity ratio in a range of from 1 to 6, and a resistivity in a range of from 0.8 Ω-m to 300 Ω-m.

2. The joule heating structure of claim 1, wherein the electrically conductive carbon network comprises carbon in a form selected from the group consisting of carbon black, graphitic carbon, graphene, carbon nanotubes, pyrolyzed carbon, carbon in the form of carbide compounds of metalloids or metals, and combinations thereof.

3. The joule heating structure of claim 1, comprising one or more electrical circuitry element(s) for connecting the electrically conductive carbon network with an electrical power source to flow electrical current through the electrically conductive carbon network to produce joule heating.

4. The joule heating structure of claim 3, wherein the one or more electrical circuitry element(s) comprises at least one selected from the group consisting of electrodes, electrical wires, electrical connectors, and electrical couplings.

5. The joule heating structure of claim 1, comprising a sorbent positioned to be heated by joule heating generated by the electrically conductive carbon network when electrical current is flowed through the electrically conductive carbon network.

6. The joule heating structure of claim 1, comprising elemental carbon content in the electrically conductive carbon network that is in a range of 0.5 to 30% by weight, based on weight of the three-dimensional substrate.

7. The joule heating structure of claim 5, wherein the sorbent is selected from the group consisting of oxides, carbonates, and bicarbonates of Group 1 and Group 2 elements.

8. The joule heating structure of claim 5, wherein the sorbent is selected from the group consisting of oxides, carbonates, and bicarbonates of sodium, calcium, potassium, barium, cesium, lithium, magnesium, and combinations thereof.

9. The joule heating structure of claim 1, comprising a catalyst positioned to be heated by joule heating generated by the electrically conductive carbon network when electrical current is flowed through the electrically conductive carbon network.

10. The joule heating structure of claim 9, wherein the catalyst comprises at least one selected from the group consisting of Ni, Fe, Co, Ru, Rh, Pd, Pt, Cu, Mo, W, Au, Ag, Cr, Re, Os, Ir, V, Zn, Mn, Ga, Ce, and La, wherein the catalyst is supported on at least one selected from the group consisting of $Al_2O_3$, $SiO_2$, MgO, CaO, $ZrO_2$, $CeO_2$, $TiO_2$, $La_2O_3$, $Cr_2O_3$, $Y_2O_3$, activated carbon, spinels, perovskites, hydrotalcites, zeolites, cordierite, SiC, graphene oxide, metal-organic framework (MOFs), boron nitride, $AlPO_4$, BaO, and SrO.

11. The joule heating structure of claim 1, comprising a sorbent and a catalyst co-located with one another in the joule heating structure, and arranged so that they receive joule heat from the electrically conductive carbon network when an electrical current is flowed through the electrically conductive carbon network.

12. The joule heating structure of claim 11, wherein the sorbent is sorptively selective for carbon dioxide, and the catalyst is catalytically effective for chemical reaction of carbon dioxide.

13. The joule heating structure of claim 12, wherein the catalyst is catalytically effective for conversion of carbon dioxide to a hydrocarbon product.

14. The joule heating structure of claim 9, wherein the catalyst is catalytically effective for reverse water gas shift reaction.

15. The joule heating structure of claim 9, wherein the catalyst is catalytically effective for methane pyrolysis.

16. The joule heating structure of claim 9, wherein the catalyst is catalytically effective for hydrocarbon or ammonia cracking.

17. The joule heating structure of claim 9, wherein the catalyst is catalytically effective for methane reforming.

18. The joule heating structure of claim 1, wherein the three-dimensional structure comprises a support, carrier, substrate, or continuous phase material.

19. The joule heating structure of claim 1, wherein the three-dimensional substrate comprises a porous monolith.

20. The joule heating structure of claim 19, wherein porosity of the porous monolith has a pore size distribution with a pore size $d_{50}$ in a range of from 1 μm to 100 μm.

21. The joule heating structure of claim 19, wherein the porous monolith has a cell density in a range of from 200 to 1000 cells per square inch.

22. The joule heating structure of claim 19, wherein the porous monolith has a wall thickness in a range of from 2 to 12 mils.

23. The joule heating structure of claim 1, wherein the three-dimensional substrate comprises a laminate or sheet-form structure.

24. The joule heating structure of claim 1, wherein the three-dimensional substrate comprises a foam material.

25. The joule heating structure of claim 1, wherein the three-dimensional substrate comprises a non-woven sheet.

26. A joule heating structured material assembly, comprising a porous monolith channelized with a multiplicity of substantially aligned channels extending therethrough to open ends at opposite faces of the porous monolith, wherein each channel is bounded by channel walls defining interior wall surfaces of the channel, wherein the channel walls have an electrically conductive carbon network coated on said interior wall surfaces, and wherein the electrically conductive carbon network has a G/D Raman spectral intensity ratio in a range of from 1 to 6, and a resistivity in a range of from 0.8 $\Omega$-m to 300 $\Omega$-m.

27. An apparatus for conducting a heat-mediated transformation of a material, comprising a vessel having an inlet to receive the material in an interior volume of the vessel, and an outlet for discharging a product of the heat-mediated transformation of the material, and a joule heating structure disposed in the interior volume of the vessel, the joule heating structure comprising a three-dimensional substrate having an electrically conductive carbon network coated on a surface of the substrate, wherein the electrically conductive carbon network has a G/D Raman spectral intensity ratio in a range of from 1 to 6, and a resistivity in a range of from 0.8 $\Omega$-m to 300 $\Omega$-m, and is arranged to provide joule heat for the heat-mediated transformation of the material upon flow of electrical current through the electrically conductive carbon network.

28. A process for carrying out a heat-mediated transformation of a material, comprising:
flowing electrical current through an electrically conductive carbon network coated on a surface of a three-dimensional substrate to cause the electrically conductive carbon network to responsively generate joule heating; and
transmitting joule heat from the joule heating to effect the heat-mediated transformation of the material, wherein the electrically conductive carbon network has a G/D Raman spectral intensity ratio in a range of from 1 to 6, and a resistivity in a range of from 0.8 $\Omega$-m to 300 $\Omega$-m.

29. A method of making the joule heating structure according to claim 1, comprising: preparing a carbon precursor solution comprising (i) a phenolic resin or polymer, and (ii) a graphitization promoter that is effective to catalyze graphitization of carbon produced by heat treatment of the carbon precursor solution;
applying the carbon precursor solution to a surface of the three-dimensional substrate; and
heat treating the carbon precursor solution applied to the surface of the three-dimensional substrate to form the electrically conductive carbon network coated on the surface of the three-dimensional substrate.

30. The method of claim 29, wherein the electrically conductive carbon network has an elemental carbon content in a range of 0.5 to 30% by weight, based on weight of the three-dimensional substrate.

* * * * *

UNITED STATES PATENT AND TRADEMARK OFFICE
CERTIFICATE OF CORRECTION

| | | |
|---|---|---|
| PATENT NO. | : 12,409,446 B2 | Page 1 of 1 |
| APPLICATION NO. | : 18/810367 | |
| DATED | : September 9, 2025 | |
| INVENTOR(S) | : Jian Ping Shen et al. | |

It is certified that error appears in the above-identified patent and that said Letters Patent is hereby corrected as shown below:

In the Specification

Column 7, Line 13, "air+~2%" should be -- air + ~2% $H_2O$ --.

Signed and Sealed this
Twenty-fifth Day of November, 2025

John A. Squires
*Director of the United States Patent and Trademark Office*